United States Patent
Bartfai-Walcott et al.

(10) Patent No.: US 12,141,620 B2
(45) Date of Patent: Nov. 12, 2024

(54) MICROSERVICE PROVISION AND MANAGEMENT

(71) Applicant: Intel Corporation, Santa Clara, CA (US)

(72) Inventors: Katalin Bartfai-Walcott, El Dorado Hills, CA (US); Peggy Jo Irelan, Chandler, AZ (US); Hassnaa Moustafa, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/139,058

(22) Filed: Apr. 25, 2023

(65) Prior Publication Data

US 2023/0409407 A1 Dec. 21, 2023

Related U.S. Application Data

(63) Continuation of application No. 17/698,418, filed on Mar. 18, 2022, now Pat. No. 11,663,047, which is a continuation of application No. 16/478,593, filed as application No. PCT/US2017/039438 on Jun. 27, 2017, now Pat. No. 11,281,499.

(60) Provisional application No. 62/454,891, filed on Feb. 5, 2017.

(51) Int. Cl.
*G06F 9/50* (2006.01)
*H04L 67/10* (2022.01)
*H04L 67/12* (2022.01)

(52) U.S. Cl.
CPC .......... *G06F 9/5061* (2013.01); *G06F 9/5083* (2013.01); *H04L 67/10* (2013.01); *H04L 67/12* (2013.01)

(58) Field of Classification Search
CPC ...... G06F 9/5061–9/5083; H04L 67/10–67/12
See application file for complete search history.

(56) References Cited

U.S. PATENT DOCUMENTS

| | | | | |
|---|---|---|---|---|
| 5,499,182 A | * | 3/1996 | Ousborne | G06F 11/34 701/33.9 |
| 6,330,499 B1 | * | 12/2001 | Chou | G07C 5/08 701/32.7 |
| 6,609,051 B2 | * | 8/2003 | Fiechter | G05B 23/0243 714/E11.158 |
| 7,715,961 B1 | * | 5/2010 | Kargupta | G06Q 10/08 701/33.2 |
| 8,005,860 B1 | | 8/2011 | Nadel et al. | |

(Continued)

FOREIGN PATENT DOCUMENTS

| | | |
|---|---|---|
| WO | 2018038896 | 3/2018 |
| WO | 2018144060 | 8/2018 |

OTHER PUBLICATIONS

Final Office Action from U.S. Appl. No. 17/494,473 notified May 1, 2023, 9 pgs.

(Continued)

*Primary Examiner* — Clayton R Williams
(74) *Attorney, Agent, or Firm* — Essential Patents Group, LLP; Christopher K. Gagne

(57) ABSTRACT

A compute system that includes an Internet of things (IoT) device is provided. The IoT device includes a common services interface (CSI) to create a self-managing network of devices with other nodes comprising the CSI.

15 Claims, 33 Drawing Sheets

(56) References Cited

U.S. PATENT DOCUMENTS

| | | | |
|---|---|---|---|
| 9,021,310 | B1 | 4/2015 | McCabe et al. |
| 9,323,599 | B1 * | 4/2016 | Iyer .................. G06F 11/30 |
| 10,101,244 | B2 | 10/2018 | Mankovskii et al. |
| 10,181,978 | B1 | 1/2019 | Argenti |
| 10,460,332 | B1 * | 10/2019 | Kujat ................ G06Q 30/0202 |
| 10,503,581 | B2 | 12/2019 | Justin et al. |
| 11,144,382 | B2 | 10/2021 | Justin et al. |
| 2009/0100178 | A1 | 4/2009 | Gonzales et al. |
| 2012/0060165 | A1 | 3/2012 | Clarke |
| 2012/0192016 | A1 | 7/2012 | Gotesdyner et al. |
| 2013/0007234 | A1 | 1/2013 | Bartfai-Walcott et al. |
| 2015/0052122 | A1 | 2/2015 | Landry et al. |
| 2015/0121470 | A1 | 4/2015 | Rongo et al. |
| 2015/0130957 | A1 | 5/2015 | Berelejis et al. |
| 2015/0195296 | A1 | 7/2015 | Vasseur et al. |
| 2016/0037436 | A1 | 2/2016 | Spencer et al. |
| 2016/0258845 | A1 | 9/2016 | Mankovskii et al. |
| 2016/0259699 | A1 | 9/2016 | Greenspan et al. |
| 2016/0322120 | A1 | 11/2016 | Burke et al. |
| 2017/0005874 | A1 | 1/2017 | Banerjee et al. |
| 2017/0011298 | A1 | 1/2017 | Pal et al. |
| 2017/0102978 | A1 | 4/2017 | Pallath et al. |
| 2017/0155710 | A1 | 6/2017 | Quinn et al. |
| 2017/0171607 | A1 | 6/2017 | Britt |
| 2017/0187585 | A1 | 6/2017 | Yew et al. |
| 2017/0195318 | A1 | 7/2017 | Liu et al. |
| 2017/0257664 | A1 | 9/2017 | Tam et al. |
| 2017/0316050 | A1 | 11/2017 | Hill et al. |
| 2017/0322120 | A1 | 11/2017 | Wang |
| 2017/0372212 | A1 | 12/2017 | Zasadzinski et al. |
| 2018/0060153 | A1 | 3/2018 | Innes et al. |
| 2018/0060159 | A1 | 3/2018 | Justin et al. |
| 2018/0219889 | A1 | 8/2018 | Oliner et al. |
| 2018/0359597 | A1 | 12/2018 | Lazar et al. |
| 2020/0183774 | A1 | 6/2020 | Justin et al. |
| 2022/0083414 | A1 | 3/2022 | Tran Van et al. |
| 2024/0146601 | A1 | 5/2024 | Paini et al. |

OTHER PUBLICATIONS

International Preliminary Report on Patentability for PCT Application No. PCT/US2017/045520, dated Mar. 7, 2019.
International Preliminary Report on Patentability from PCT/US2017/039438 notified Aug. 15, 2019, 10 pgs.
International Search Report and Written Opinion for PCT Application No. PCT/US2017/045520, dated Nov. 15, 2017.
International Search Report from PCT Application No. PCT/US2017/039438 notified Jan. 29, 2018, 4 pgs.
Non-Final Office Action from U.S. Appl. No. 16/478,593 notified Apr. 29, 2021, 10 pgs.
Non-Final Office Action from U.S. Appl. No. 17/698,418 notified Oct. 5, 2022, 7 pgs.
Notice of Allowance for U.S. Appl. No. 15/638,616, dated Jul. 22, 2019.
Notice of Allowance for U.S. Appl. No. 16/708,332, dated Jun. 10, 2021.
Notice of Allowance from U.S. Appl. No. 16/478,593 notified Nov. 15, 2021, 9 pgs.
Notice of Allowance from U.S. Appl. No. 17/494,473 notified Jul. 20, 2023, 5 pgs.
Notice of Allowance from U.S. Appl. No. 17/698,418 notified Jan. 19, 2023, 7 pgs.
Office Action for U.S. Appl. No. 15/638,616, dated Feb. 6, 2019.
Office Action for U.S. Appl. No. 16/708,332, dated Jan. 25, 2021.
Office Action for U.S. Appl. No. 17/494,473, dated Nov. 18, 2022.
Restriction Requirement from U.S. Appl. No. 16/478,593 notified Nov. 27, 2020, 6 pgs.
Choi, Hyon-Young, et al., "Making DDS Really Real-Time with OpenFlow", EMSOFT'16, Oct. 1-7, 2016, Pittsburgh, PA, USA, 10 pgs.
Non-Final Office Action from U.S. Appl. No. 18/126,796 notified May 31, 2024, 26 pgs.

* cited by examiner

300

300

2400

2500

MICROSERVICE PROVISION AND MANAGEMENT

CROSS REFERENCE TO RELATED APPLICATION

The present application claims the benefit of the filing date of U.S. Patent Provisional Application Ser. No. 62/454,891, by Bartfai-Walcott et al., entitled "MICROSERVICE PROVISION AND MANAGEMENT," filed Feb. 5, 2017, and which is incorporated herein by reference.

TECHNICAL FIELD

The present techniques relate generally to relate to the Internet of Things (IoT). More specifically the present techniques relate to obtaining micro-services in an IoT environment.

BACKGROUND

A current view of the Internet is the connection of clients, such as personal computers, tablets, smart phones, servers, digital photo-frames, and many other types of devices, to publicly-accessible data-centers hosted in server farms. However, this view represents a small portion of the overall usage of the globally-connected network. A very large number of connected resources currently exist, but are not publicly accessible. Examples include corporate networks, private organizational control networks, and monitoring networks spanning the globe, often using peer-to-peer relays for anonymity.

It has been estimated that the internet of things (IoT) may bring Internet connectivity to more than 15 billion devices by 2020. For organizations, IoT devices may provide opportunities for monitoring, tracking, or controlling other devices and items, including further IoT devices, other home and industrial devices, items in manufacturing and food production chains, and the like. The emergence of IoT networks has served as a catalyst for profound change in the evolution of the Internet. In the future, the Internet is likely to evolve from a primarily human-oriented utility to an infrastructure where humans may eventually be minority actors in an interconnected world of devices.

In this view, the Internet will become a communications system for devices, and networks of devices, to not only communicate with data centers, but with each other. The devices may form functional networks, or virtual devices, to perform functions, which may dissolve once the function is performed. Challenges exist in enabling reliable, secure, and identifiable devices that can form networks as needed to accomplish tasks.

The initial rollout of IoT devices and networks into home, industrial, automotive, and other usages, has been highly verticalized. For example, individual vendors typically provide end-to-end solutions that involve highly integrated and, in many cases, fixed-function devices and groups of devices. Fixed-function devices may be constrained in computing power, memory, or other resources, limiting the adaptability of the IoT networks. New functional models for coordinating the use of dynamic and distributed resources may make IoT networks more adaptable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
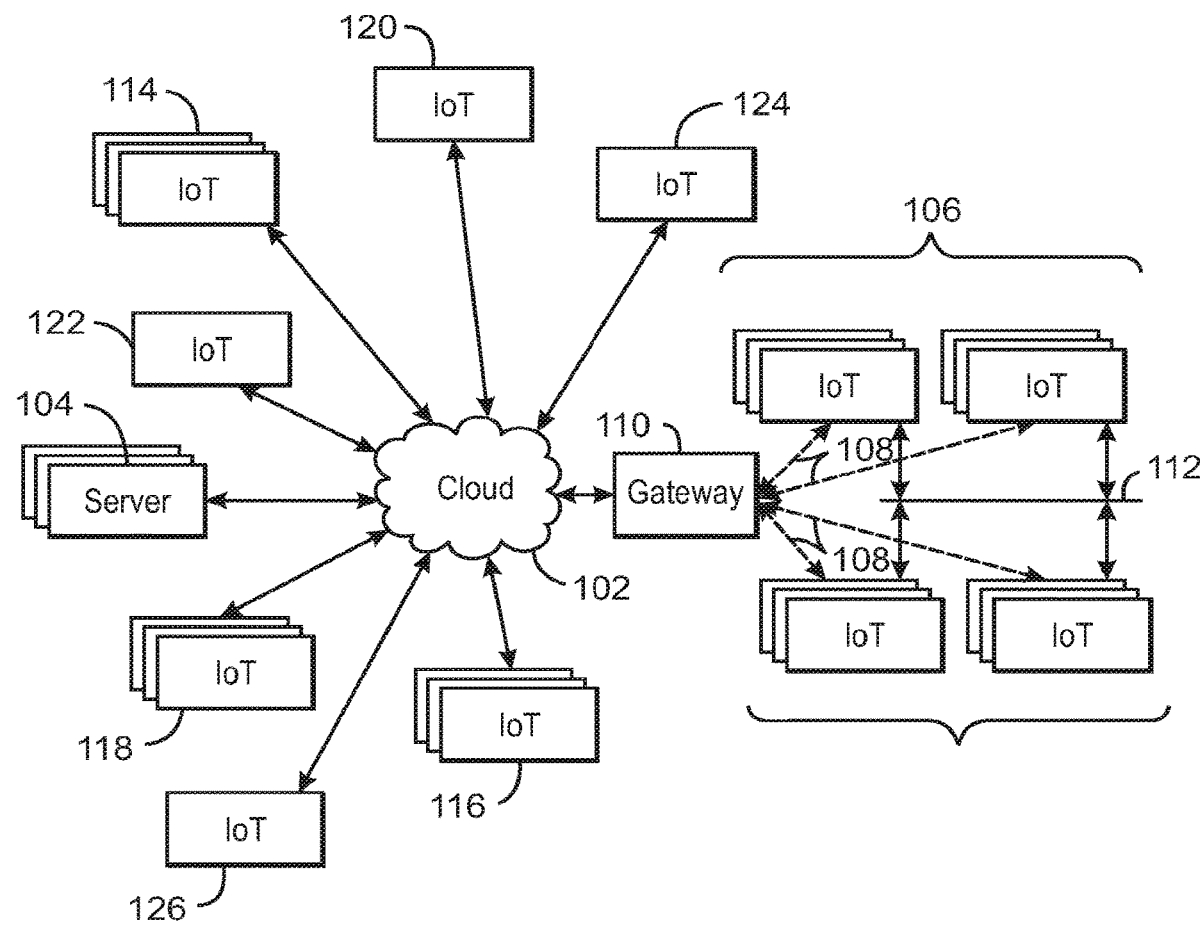
FIG. 1 is a drawing of a cloud computing network, or cloud, in communication with a number of Internet of Things (IoT) devices in accordance with some embodiments.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, to avoid obscuring the present invention.

Many management and manageability models approach IoT with the traditional concepts of Data Center resource management. However, IoT presents several unique and complex resource and service interactions, which traditional methods, software architectures and service delivery models do not yet comprehend. As used herein, in IoT things such as software or hardware resources, are rarely stationary, they may have direction, velocity, vector and motion. Regardless of where they are located they may be managed by their controllers within the policies and rules outlined in the service management domain.

In IoT, things may be encapsulated, related, managed directly or indirectly, or retained through a temporary or permanent chain or authority, termed custody. Change of custody or encapsulation for resources within IoT is a common concept. Things, also termed objects herein, may be directly accessible or be managed indirectly through a parent or alternative responsible device for a short duration or for its entire lifecycle.

A proper service delivery architecture may include the ability to manage and control all things with the consideration of this type of hierarchy. Further, things may have a classification, and based on that classification, they may have management, manageability, and control limitations.

Things may be offline or in a low power state or sleep mode. Thus, techniques to identify and provide ways for Out-Of-Band (OOB) access to wake things. In some examples, things may not have the ability to provide In-Band (IB) or Out-of-Band access. In these cases, access may be obtained using Side-Band (SB) accessibility, in which the management engine is enabled through an SoC, FPGA, or other manageability coprocessor solutions placed inside of a connector for the available interfaces for that device. Examples may include universal serial bus (USB), enhanced network connectors, radio interfaces, NIC adaptors, lighting adaptors, and the like.

Further, things may be inaccessible or have restricted access, or the access may be compromised or cost prohibitive. Not all IoT devices are accessible through the Internet or through private networks. In addition, when network transports go down or change, the service policies may need to provide alternative analytics and service delivery mechanisms within constraints, such as privacy or cost considerations. Things may not have access to a management network, so the production (data) network and management (control) network may be shared among devices and networks. In these examples, the network systems provide support for both data streams, while ensuring data separation, and privacy. This may require separate security, encapsulation, authentication and authorization systems. Furthermore, the data streams may use time-coordination to help to ensure that both production data and control data arrives at destinations at substantially the same time. This may be performed by buffering and synchronization at the data origin.

Things may be thinly provisioned at the edge and systems may have constrained computational capability. To support the service delivery policies of the user of IoT, the architecture may include the ability to cluster the edge resources to provide analytics at the edge or fog. The systems herein provide the ability for these resources to auto-aggregate, for example, to form a fog, to establish a loosely coupled cluster based on the service's requirements.

Under current models, things may interfere with existing IoT services and service delivery models. For example, discovery services may beacon, broadcast, or have hard coded DNS or DHCP registry services, taking bandwidth. Further, things may not be able to manage themselves or respond to external requests and stimulus with an understanding of the impact of the response on their own operations and service homeostasis.

In the techniques described herein, things may be aware of aware of their surroundings, and peers within their proximity to coordinate work, enable orchestration (service) management, elect a leader, or share features to accomplish their tasks. The IoT based solution may be implemented in different ways, various geographies, regions or use cases. The architecture may account for implementation based variations on accessibility for management, data upload, and analytics.

Mechanisms and infrastructure described herein may allow applications to be developed, dynamically deployed, and managed across IoT devices, creating a software definable IoT infrastructure that adapts to the changing environment, which may include software that is re-definable to meet the needs of the users or business. In the IoT infrastructure, IoT applications may be composed of a set of code modules, termed micro-services herein, that may be dynamically deployed onto physical resources to meet a given user or business goal. The micro-services may be built to be deployable across the compute stack, for example, into IoT nodes, compute nodes, gateways, local fog devices, and the cloud, among others. Deployment may be in the form of containers, code in virtual machines, or firmware programmed directly onto hardware. Where and how each component is deployed may be dynamically controlled by an orchestration mechanism.

As described herein, the techniques include a software delivery system, termed a distributed service framework (DSF) herein, and a management structure, termed a common services interface (CSI) herein. As used herein, the DSF is a service delivery network structure that may provide a reference point for how IoT resources are managed to ensure proper and continuous service delivery at the edge or via the cloud. This enhanced architecture may include several of the resource basic services within its framework, without using an agent or middleware capability.

The manager or owner of the resource domain may ensure adherence to contractual service delivery, such as service-level agreements (SLAs), using DSF for orderly resource discovery, registration and certification, object management and micro-service placement. This may help to meet real-time needs and network resources optimization. DSF may enable the aggregation, composition and context management of IoT resources, such as devices, traditional or legacy servers, cloud resource, infrastructure components, and the like, in a way that may be cost effective, dynamic, and resistant to failure.

Further, the CSI, acting as a virtual data bus, may enable resource autonomy by enabling a thing to be self-describing, self-aware, and autonomous, among others. The CSI may also provide a local/edge level self-orchestration. Further, under CSI, a resource node may describe its own capability, financial value, user and policy allocation, retention, allocation and functionality. The description may utilize standard service level and service delivery nomenclature via an application programming interfaces (API) or data distribution service (DDS), such as publish/subscribe (Pub/Sub) or other subscription models. Additionally, the CSI may use embedded policies to couple the management, control, and invocation of resources to the resource interface itself, which may reduce latency of response in online, offline, and low-power conditions. The CSI expresses itself as a smart object, for example, to support new protocols for representational state transfer (REST), such as constrained application protocol (CoAP), and to provide static metadata, dynamic metadata, and service aware telemetry.

As used herein, the CSI is an intelligent system, which may enable a thing with self-awareness, authority and autonomy. This provides the primary interface for communication with the DSF, and provides the capability for self-management to prioritize and respond to multiple events at the same time and help to ensure an organized, validated and reasonable response from the resource or thing. The CSI may include all the of the resource related information, for example, information ascertained from external references such as a reputation calculation or feedback on meeting service level objectives. The CSI also provides the ability to be part of a service, provide the context level information for the service session and understand the connections into and out of a subnet for the service session, which may be termed North and South side connections herein. It may also understand and manage the connections and capabilities of peer devices in the subnet, which may be termed East and West connections herein, for example, to ensure a proper response for an orchestration request, a service management request, or a remediation request, such as when a thing fails a local service level objective.

The DSF and CSI may provide a new architecture and paradigm for IoT software defined infrastructure (SDI), which may include a network infrastructure that allows awareness and adaptability to a dynamic, changing environment. In this SDI, things may be self-aware and self-describing, and may automatically peer, communicate and coordinate actions with nearby similarly equipped resources. Services may be independent and routed in a way that match the requirements of the end-to-end services and associated SLAs. Devices may also have awareness of their edge network status, in which the devices that host micro-services are not servers in data centers. The micro-services may be dynamically encapsulated in containers for target resources. Further, the devices themselves may also be consumers of other micro-services from other devices.

FIG. 1 is a drawing of a cloud computing network, or cloud 102, in communication with a number of Internet of Things (IoT) devices in accordance with some embodiments. The cloud 102 may represent the Internet, or may be a local area network (LAN), or a wide area network (WAN), such as a proprietary network for a company. The IoT devices may include any number of different types of devices, grouped in various combinations. For example, a traffic control group 106 may include IoT devices along streets in a city. These IoT devices may include stoplights, traffic flow monitors, cameras, weather sensors, and the like. The traffic control group 106, or other subgroups, may be in communication with the cloud 102 through wireless links 108, such as low-power wide area (LPWA) links, and the like. Further, a wired or wireless sub-network 112 may allow the IoT devices to communicate with each other, such as through a local area network, a wireless local area network, and the like. The IoT devices may use another device, such as a gateway 110 to communicate with the cloud 102. In some examples, the sub-network 112 may couple one or more of the IoT devices to the gateway 110 using a wired network.

Moreover, any of the IoT devices may also use one or more servers (not shown) operationally disposed along the gateway 110, or between the group 106 and the gateway 110, to facilitate communication of the group 106 with the cloud 102 or with the gateway 110. For example, the one or more servers may operate as an intermediate network node to support a local edge cloud or fog implementation among a local area network.

The network topology may include various types of IoT networks, such as a mesh network via Bluetooth® low energy (BLE) links. Other types of IoT networks may include a wireless local area network (WLAN) network to communicate with IoT devices through IEEE 802.11 (Wi-Fi®) links, a cellular network to communicate with IoT devices through an LTE/LTE-A (4G) or 5G cellular network, and a LPWA network. An LPWA network may be compatible with the long range wide area network (LoRaWAN™) specification promulgated by the LoRa alliance. The network topology or IoT network(s) may include IPv6 over Low Power Wide-Area Networks (LPWAN) network compatible with a specification promulgated by the Internet Engineering Task Force (IETF). Further, the respective IoT networks may communicate with an outside network provider, such as a tier 2 or tier 3 provider in the Internet, via a variety of communications links. The communications links may include an LTE cellular link, an LPWA link, or a link based on the IEEE 802.15.4 standard, such as Zigbee®, and so on. The respective IoT networks may also operate by network and internet application protocols such as Constrained Application Protocol (CoAP). The respective IoT networks may also be integrated with coordinator devices that provide a chain of links that forms cluster tree of linked devices and networks.

Although wireless networks and wired networks are described, such as LPWA links, optical links, and the like, it may be noted that any type of network may be used to couple the devices to each other or to a gateway 110. A network or assembled group of devices may have both wired and wireless connections, and may use both simultaneously between nodes, peers, and gateway devices. Further the network or assembled group of devices may use wired networks, wireless networks, or both, to communicate with the cloud, and any higher performance computing devices that may be participating to deliver services or support to what is disclosed herein. Thus, any link 108 or network 112 may utilize a wired connection or a wireless connection. Further, IoT devices may be in direct communications with other devices in the cloud 102 without the use of a gateway 110. Additionally, the links 108 may use optical signal paths among both IoT devices with the cloud 102 and the gateway (s) 110, including the use of MUXing/deMUXing components that facilitate interconnection of the various devices.

Other groups of IoT devices may include remote weather stations 114, local information kiosks 116, alarm systems 118, automated teller machines 120, alarm panels 122, or moving vehicles, such as emergency vehicles 124 or other vehicles 126, among many others. Each of these IoT devices may be in communication with other IoT devices, with data centers, including servers 104, or both.

As can be seen from FIG. 1, a large number of IoT devices may be communicating through the cloud 102. This may allow different IoT devices to request or provide information to other devices autonomously. For example, the traffic control group 106 may request a current weather forecast from a group of remote weather stations 114, which may provide the forecast without human intervention. Since every CSI enabled device may be automatically connected to the DSF, the cloud can enable various "service frequencies" onto which these resources can subscribe.

Furthermore, as moving IoT devices enter, or are approached by, management domains, they may receive new policies which may be relevant to their operation. For example, as an ambulance approaches a vehicle from behind, relevant metadata and telemetry may be sent to the vehicle to ensure full awareness of the environment and initiation of operational changes, such as pulling off the road and coming to a stop. In another example, an automobile leaving California and entering Nevada may receive policies, such as speed limits, relative to Nevada.

In another example, an emergency vehicle 124 may be alerted by an automated teller machine 120 that a burglary is in progress. As the emergency vehicle 124 proceeds towards the automated teller machine 120, it may access the traffic control group 106 to request clearance to the location, for example, by turning lights red to block cross traffic at an intersection in sufficient time for the emergency vehicle 124 to have unimpeded access to the intersection. Further, the emergency vehicle 124 may change the information it is broadcasting about itself on the DSF to help ensure that other IoT systems, such as autonomous vehicles, street lights and crossing signals are aware that a high priority vehicle is approaching and to clear the way.

As described herein, the IoT devices of the traffic control group 106 may not include the functionality for the emergency vehicle 124 to request clearance. In this example, when the emergency vehicle 124 requests the clearance service, an IoT device in the traffic control group 106 or the gateway 110 may request the clearance service be downloaded over a distributed services framework (DSF). The IoT devices may then orchestrate the location for the clearance service, and activate the clearance service at a location in the traffic control group 106.

As described herein, as conditions change, some of the IoT devices may experience higher loadings, leading to higher latency, reduced performance, or lost data. For example, as the emergency vehicle 124 approaches the intersection, the increased communications between lights may overload controllers in the lights. Accordingly, the traffic control group 106 may shift operations, such as light control, from the lights to other devices in the traffic control group 106, such as data aggregators, servers, or other devices, to allow the clearance service to operate in the lights. These devices may be located locally to the traffic control group 106, or may be accessed over a network. The devices used implement the application may include the systems on the emergency vehicle 124 itself.

Clusters of IoT devices, such as the remote weather stations 114 or the traffic control group 106, may be equipped to communicate with other IoT devices as well as with the cloud 102. This may allow the IoT devices to form a cluster of devices, allowing them to function as a single device, which may be termed a fog device. The fog device is discussed further with respect to FIG. 2.

Figure 2:
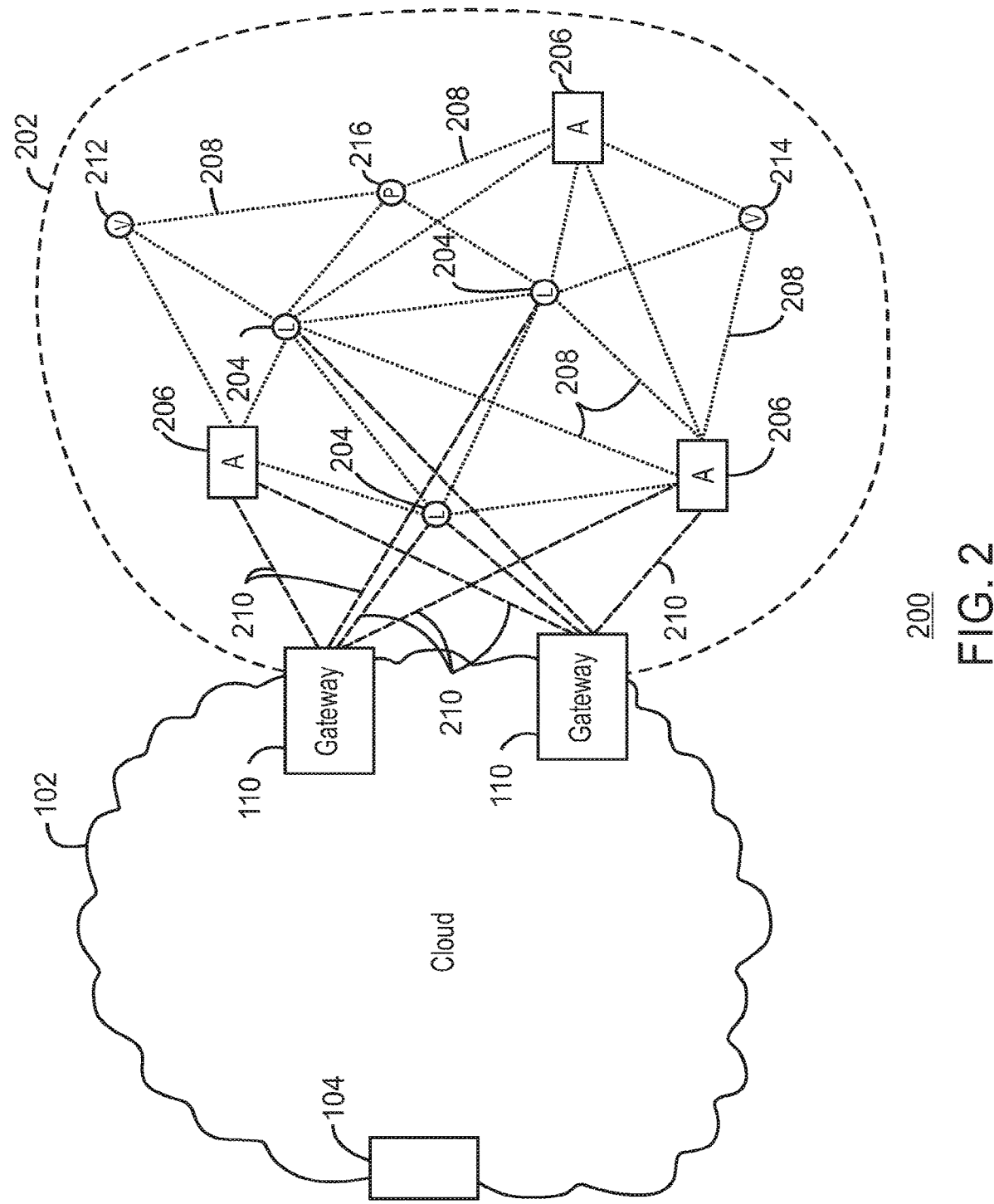
FIG. 2 is a drawing of a cloud computing network, or cloud, in communication with a mesh network of IoT devices, which may be an example of a fog device, operating at the edge of the cloud in accordance with some embodiments.

FIG. 2 is a drawing 200 of a cloud computing network, or cloud 102, in communication with a mesh network of IoT devices, which may be an example of a fog device 202, operating at the edge of the cloud 102 in accordance with some embodiments. Like numbered items are as described with respect to FIG. 1. As used herein, a fog device 202 is a cluster of devices that may be grouped to perform a specific function, such as traffic control, weather control, plant control, home monitoring, and the like.

Although the fog device 202 in this example is shown as a mesh network, e.g., with interactive communication links between each pair of devices, a fog device 202 may be formed by devices joint to a more standard network. For example, the devices may be placed along network communications and communicate through the gateways 110, as shown in FIG. 1. In this example, the fog device 202 may be a virtual device implemented through identity credentials issued to each device, as described herein.

Objects such as the IoT devices, may interact to accomplish a larger function, goal or workflow, for example, to form a fog device. Objects may be identified in terms of their type, e.g., the function performed, and instance, e.g., presence. Multiple object instances of objects may have the same type identity, but may have unique instance identities. Further, multiple object instances may be organized into groups where an instance of the grouping may have an identity. A group of things that interact in a particular way, given their type, for example, function, state and interface semantics, may represent a composite object. The composition itself may have a type and instance abstraction. Hence, composite objects follow the same identity rules as atomic objects. Composition with type and instance properties allows object extensibility through composition.

The thing or object may last as long as a single device, such as a refrigerator, or only until a current function is completed. For example, a refrigerator may be regarded as a composite object, or fog device 202, consisting of multiple other objects, such as a light, a compressor, a temperature sensor, a thermostat, a water dispenser, an ice maker, and the like. The other objects may each be atomic, or may themselves be composite objects. For example, and ice maker may be composite object formed from atomic objects, such as a temperature sensor, a thermostat, a solenoid-operated water valve, a timer, an ice tray, and the like. An example of a virtual composite object, or fog device 202, made up of a number of physical devices is the intersection and the emergency cluster, described herein.

Accordingly, object identity may be understood in context of three abstractions: object instance, object type, and meta-identity. An object instance is a computational element that occupies finite resources, such as memory, CPU, bandwidth, status, and the like. Object instantiation has a lifecycle that involves creation, mutation, and deletion. An object type is a logical construct that declares expected or possible behavior, states, and composition. The object type can place constraints on how objects behave and interact when instantiated. The object type can also indicate the types of requests the object can respond to, for example, the interface.

Meta-identity is a way of defining a meta-data context in which the object may exist. An object may not be aware of encapsulating meta-identity. Object instances may dynamically apply stereotyping information by defining a group having desired meta-data context then enrolling the object into the group.

Authentication and identity are collated issues. An object identity cannot be believed if not authenticated. However, authentication without identity has limited utility. Asymmetric key signing, such as ECDSA (Elliptic Curve Digital Signature Algorithm), RSA, or the like, is useful for authentication under the expectation that the ability to replicate and distribute the private key is restricted. The use of the key establishes proof a principal or agent has access to the key though restricted. Hence, the principal or agent must be authentic.

The semantics of authentication, when applied to object identities, also follows the three abstractions of object instance, object type, and meta-identity. For an object instance, the authentication challenge-response establishes that the current interaction can only be with a particular instantiation of the object. For an object type, the authentication challenge-response attests that the current interaction is constrained by the semantics of type identification. For the meta-identity, the authentication challenge-response categorizes the current interaction according to the defined context.

Blockchains may be used to provide the information both for authentication and for formation of the devices. Blockchains may be used to decentralize identification as they may provide agreement between devices regarding names and identities that are in current use. As used herein, a blockchain is a distributed database of identity records that is made up of data structure blocks. Further, as used herein, the term blockchain may include any one or more of other distributed ledger systems. Other distributed ledger approaches include Ripple, Hyperledger, Multichain, Keyless Signature Infrastructure, and the like. Each data structure block is based on a transaction, where the issuance of a new name to a device, composite device, or virtual device is one example of a transaction.

Using blockchains for identification, impersonation may be detected by observing re-issuance of names and identities without a corresponding termination. Public blockchains may be most useful, as they can enable a diverse community of observers to detect misnaming, malicious naming, or failure of a naming infrastructure. Thus, trustworthy identity infrastructure may be central to trusting IoT networks.

Although the fog device 202 is this example is shown as being made up of devices in a single location, fog devices can include devices in multiple locations, formed to provide specific services. For example, the fog device 202 may include remote weather stations located in the cloud 102. Further, a server 104 located in a data center may be included in the fog device 102 for data analysis, and other services. The formation of the fog device 202 may be as simple as sharing naming, type, and identification information, for example, group identity credentials, between the different devices forming the fog device.

In this example, the fog device 202 includes a group of IoT devices at a traffic intersection. The fog device 202 may be established using the common services interface (CSI) described herein. Other techniques may be used in addition to the CSI, for example, the fog device 202 may be formed in accordance with specifications released by the OpenFog Consortium (OFC), among others. These specifications allow the formation of a hierarchy of computing elements between the gateways 110 coupling the fog device 202 to the cloud 102 and to endpoint devices, such as the traffic lights 204 and data aggregators 206, in this example. The fog device 202 can leverage the combined processing and network resources that the collective of IoT devices provides. Accordingly, a fog device 202 may be used for any number of applications including, for example, plant control, financial modeling, weather forecasting, traffic analyses, and the like. For every device controlled by the CSI for the duration of the service, the CSI assumes the Service Level Objective (SLO) for that resource to ensure the achievement of the overall Service Level Agreement (SLA) for the service session.

For example, traffic flow through the intersection may be controlled by a traffic lights 204. Analysis of the traffic flow and control schemes may be implemented by aggregators 206 that are in communication with the traffic lights 204 and each other. The implementation of the traffic flow applications may take place in the traffic lights 204, themselves. Data may be uploaded to the cloud 102, and commands received from the cloud 102, through gateways 110 that are in communication with the traffic lights 204 and the aggregators 206. Remote devices in the cloud 102 that are joined to the fog device 202 may be accessed through the gateways 110.

Any number of communications links may be used in the fog device 202 for communications with local devices. Shorter-range links 208, for example, compatible with IEEE 802.15.4 may provide local communications between IoT devices that are proximate to the intersection. Longer-range links 210, for example, compatible with LPWA standards, may provide communications between the IoT devices and the gateways 110. To simplify the diagram, not every communication link 208 or 210 is labeled with a reference number.

In this example, the fog device 202 may be considered to be a massively interconnected network wherein a number of IoT devices, and other devices, are in communications with each other, for example, by the communication links 208 and 210, and through the gateways 110. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N.), among many others. As described herein, the CSI provides a networking communication and protocol that may be used to establish the fog device 202.

In some aspects, communications from one IoT device may be passed along the most convenient path to reach the gateways 110, for example, the path having the fewest number of intermediate hops, or the highest bandwidth, among others. In these networks, the number of interconnections provides substantial redundancy, allowing communications to be maintained, even with the loss of a number of IoT devices.

In some aspects, the fog device 202 can include temporary IoT devices. In other words, not all of the IoT devices may be permanent members of the fog device 202. For example, in the exemplary system 200, three transient IoT devices have joined the fog device 202, a first vehicle 212, a second vehicle 214, and a pedestrian 216. In these cases, the IoT device may be built into the vehicles 212 and 214, or may be an app on a smart phone carried by the pedestrian 216. Other IoT devices may also be present, such as IoT devices in bicycle computers, motorcycle computers, drones, and the like. Further, services located in data centers, such as traffic analysis services, may be joined to the fog device 202 on a temporary or permanent basis. As described herein, these services may be shifted back and forth from the data center to the fog device 202, such as to the data aggregators 206, for example, depending on the location that the data provided is used.

As described herein, the applications controlling the fog device may operate at any number of levels depending on a number of factors, such as the purpose of each device and the loading on the systems. For example, the traffic lights 204 may monitor sensors to identify approaching traffic, such as vehicles, pedestrians, bicycles, and the like, to implement a traffic control application. The sensors may be cameras that capture streaming video of the roadways and pass the streaming video to the traffic lights 204 for analysis. Under normal operations, the traffic lights 204 may cooperate with each other to determine which roadways have green lights and which roadways have red lights.

However, during periods when traffic is particularly heavy the traffic lights 204 may be overloaded. Accordingly, the analysis of the traffic may be shifted to the data aggregators 206, or the gateways 110. Further, portions of the analysis may be shifted to other devices in contact with the traffic lights 204 as part of the fog device 202, such as the vehicles 212 and 214, depending on contact time, vehicle 212 or 214 capability, and the like. Once the loading returns to normal, the analysis may be shifted back to the traffic lights 204.

The fog device 202 formed from the IoT devices may be presented to clients in the cloud 102, such as the server 104, as a single device located at the edge of the cloud 102. In this example, the control communications to specific resources in the fog device 202 may occur without identifying any specific IoT device within the fog device 202. Accordingly, if one IoT device within the fog device 202 fails, other IoT devices in the fog device 202 may be able to discover and control a resource, such as an actuator, or another device attached to an IoT device. For example, the traffic lights 204 may be wired to allow any one of the traffic lights 204 to control lights for the other traffic lights 204. The aggregators 206 may also provide redundancy in the control of the traffic lights 204 and other functions of the fog device 202. The capability of the device may be contained in and accessible through the CSI.

In some examples, the IoT devices may be configured using an imperative programming style, e.g., with each IoT device having a specific function and communication partners. However, the IoT devices forming the fog device 202 may be configured in a declarative programming style, allowing the IoT devices to reconfigure their operations and communications, such as to determine desirable resources in response to conditions, queries, and device failures. This may be performed as transient IoT devices, such as the pedestrian 216, join the fog device 202. The ability, capability and willingness of an IoT device to collaborate or cooperate with an ad-hoc system is defined by the local policies and controls, as designated by the owner of that device. This information may be contained in the CSI and may be accessed through an open standard interface. It can be noted that the term open does not imply that the CSI may be accessed without credentials. The determination of how the CSI may be discovered, accessed, or communicated with, may be determined by security policies implemented by a system manager, by peer devices upon connection, or by a manufacturer, among others. The security policies may allow the CSI to be accessed from trusted domains, more open domains, or a hybrid of both, as determined by the system architect. Thus, trust and security may be a part of the formation of the fog device 202.

A combination of IoT objects using an imperative programming style and objects using a declarative programming style may be used in applications. For example, more general purpose IoT devices may have the power to operate a declarative programming style to adapt to conditions that are changing. More constrained IoT devices, such as sensor devices, may not have the programming power to include more adaptive software.

As the pedestrian 216 is likely to travel more slowly than the vehicles 212 and 214, the fog device 202 may reconfigure itself to ensure that the pedestrian 216 has sufficient time to make it through the intersection. This may be performed by forming a temporary group of the vehicles 212 and 214 and the pedestrian 216 to control the traffic lights 204. If one or both of the vehicles 212 or 214 are autonomous, the temporary group may instruct the vehicles to slow down prior to the traffic lights 204. The temporary group may download or implement a micro-service, for example, called pedestrian, to control traffic speeds in the intersection while the pedestrian is present.

As the transient devices 212, 214, and 216, leave the vicinity of the intersection the fog device 202, the fog device 202 may reconfigure itself to eliminate those IoT devices from the network. Any micro-services temporarily in use for controlling the intersection as the transient devices 212, 214, and 216, pass-through may be deactivated, shifted to other devices, or placed in a data store. As other transient IoT devices approach the intersection, the fog device 202 may reconfigure itself to include those devices an may access micro-services as needed.

The fog device 202 may include the traffic lights 204 for a number of intersections, such as along a street, along with all of the transient IoT devices along the street. The fog device 202 may then divide itself into functional units, such as the traffic lights 204 and other IoT devices proximate to a single intersection. This type of combination may enable the formation of larger IoT constructs, e.g., groups of IoT devices that perform a particular function, in the fog device 202.

For example, if an emergency vehicle joins the fog device 202, an emergency construct, or virtual device, may be created that includes all of the traffic lights for the street. The IoT devices of the emergency construct may access and download micro-services for controlling the traffic lights along the street. The emergency construct may include a number of micro-services activated from a task image repository in the fog device 202, or downloaded to the fog device 202 from the server 104 or other devices in the cloud 102. Further, the task images may be downloaded from an emergency vehicle that joins the fog device 202.

The emergency construct may use the deployed workloads to determine the location and roadway for the emergency vehicle. The workloads may then instruct the traffic lights 204 along the street to stay red for opposing traffic and green for the emergency vehicle, and thus, expediting the passage of the emergency vehicle.

As illustrated by the fog device 202, the organic evolution of IoT networks is central to improving or maximizing the utility, availability and resiliency of IoT implementations. The use of applications that are shifted to different computing devices may increase the adaptability of the fog device 202, for example, providing easier incorporations of new functions. This is discussed further with respect to FIGS. 3 and 4.

FIGS. 3(A) to 3(E) are schematic diagrams of an example of an Internet-of-Things (IoT) system discovering other devices, downloading micro-services, and managing service provision in accordance with some embodiments. Some micro-services are sticky, meaning that they are to remain on a single device. These micro-services, which may generally be single purpose functions, may be compressed and decompressed based on the requirements from the overall service request.

Figure 3A:
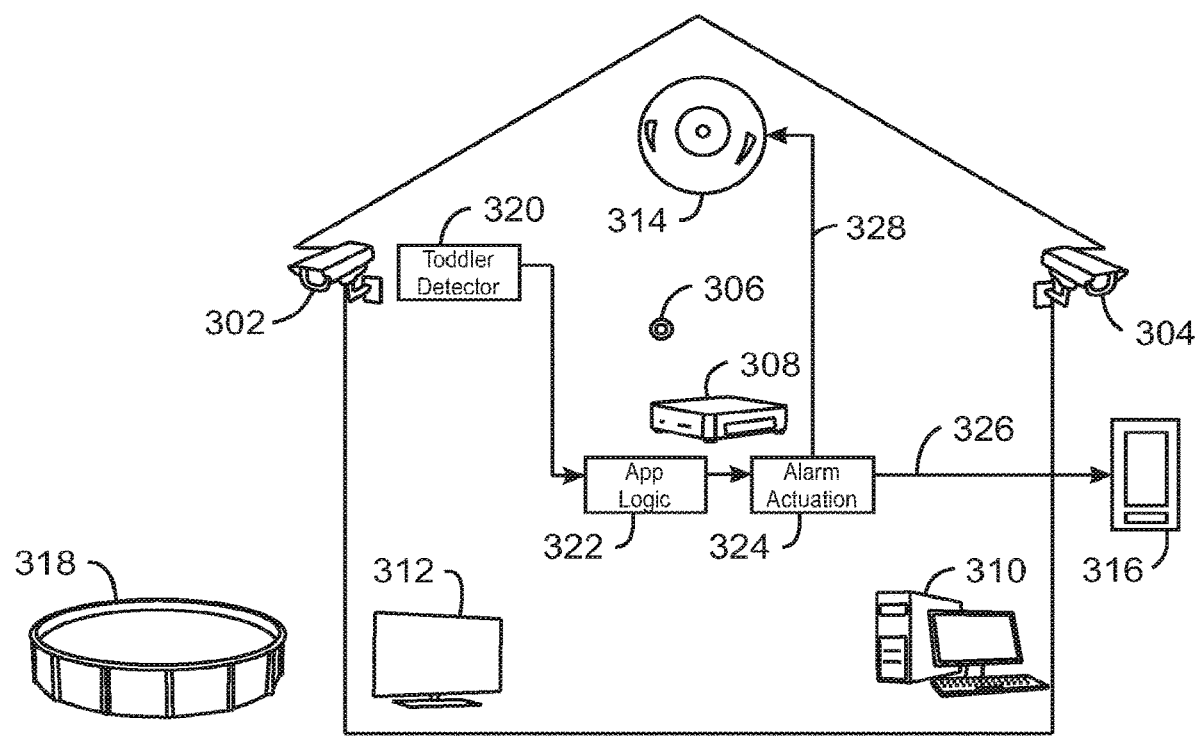
FIGS. 3(A) to 3(C) are schematic diagrams of an example of an Internet-of-Things (IoT) system discovering other devices, downloading micro-services, and managing service provision in accordance with some embodiments.

FIG. 3(A) is a schematic drawing of an example of a smart home environment 300 that includes sensing nodes, compute nodes, and actuation nodes. The sensing nodes may include cameras 302 and 304, microphones 306, and the like. The compute nodes may include a gateway 308, a personal computer (PC) 310, and the like. The actuation nodes may include a TV 312, and alarm 314, a mobile phone 316, and the like. The mobile phone 316 may be in communication with the gateway 308 via a service provider, via a radio signal, or both. The radio signal may include a Wi-Fi® signal, a Bluetooth® signal, or both.

In this example, a homeowner may decide to install a pool monitor application to identify unauthorized entry around a pool 318. The pool monitor application may include micro-services requested from an IoT service provider by IoT devices in the home network over DSF. The IoT devices may automatically deploy various micro-services for the pool monitor application to various nodes in home.

For example, a computer vision micro-service, termed a toddler detector 320, may be installed onto the backyard camera 302. The toddler detector 320 may identify the presence of people and children in the vicinity of the pool 318. An application micro-service 322 may be installed on the gateway 308 to determine that a child is in the backyard and an adult is not present. An alarm actuation micro-service 324 may be installed on the gateway 308 to activate an alert, for example, sending an alert message 326 to the mobile phone 316, sending an actuation signal 328 to the alarm 314, or both.

Figure 3B:
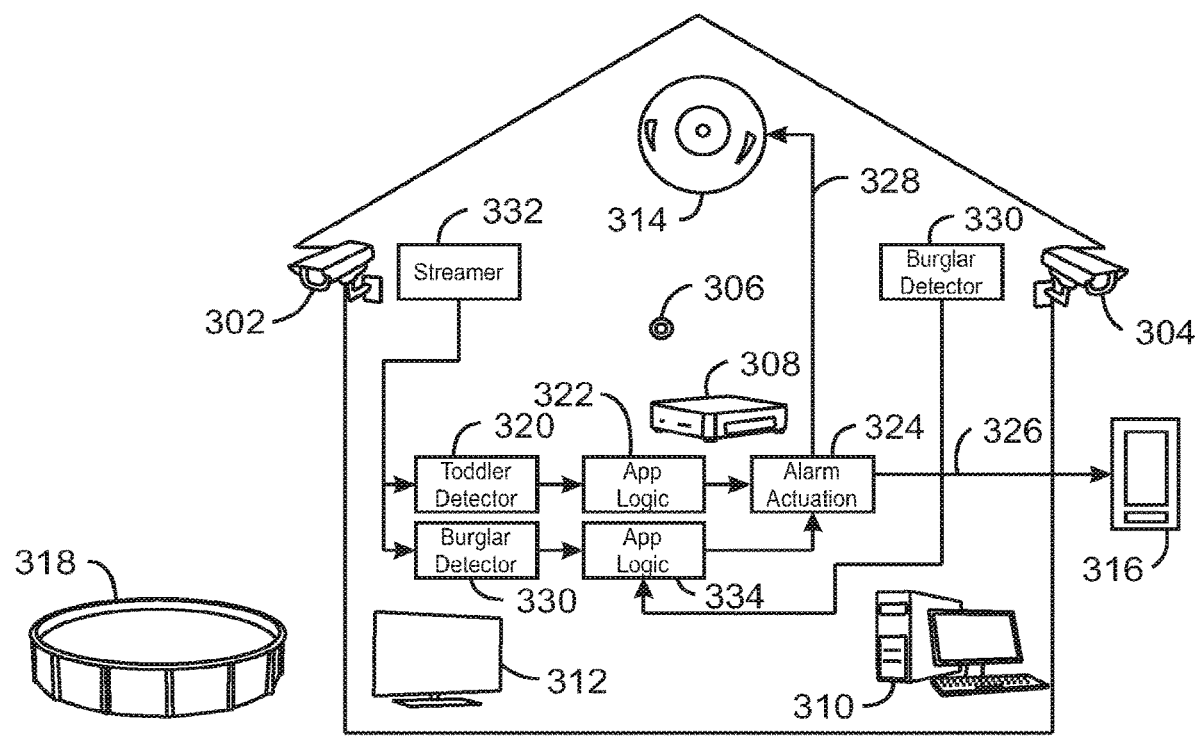

As illustrated in FIG. 3(B), a home security application may be activated. Scene analysis algorithms, termed a burglar detector 330, may be deployed to analyze the front and backyard camera feeds to determine if an unauthorized person is present. The burglar detector 330 may be deployed on the front yard camera 304. However, the backyard camera 302 may not be able to accommodate both the toddler detector 320 and the burglar detector 330 without a significant drop in service metrics.

The inability to provide both micro-services on the backyard camera 302, while maintaining an SLA (service level agreement), may be detected by analytics deployed on IoT devices throughout the network. Accordingly, the pool monitor application may be redeployed. A streamer micro-service 332 may be downloaded from the IoT service provider and deployed to the backyard camera 302, and both video analysis micro-services 320 and 330 may be deployed on the gateway 308. The application micro-service 334 for the home security application may also be deployed on the gateway 308, activating the alarm actuation logic 324 to send an alert message 326, sound the alarm 314, or both, for example, if an unauthorized person is detected or an unaccompanied child is in the vicinity of the pool 318. Although the deployment reduces the available bandwidth of the home network, it allows the desired result to be achieved.

Figure 3C:
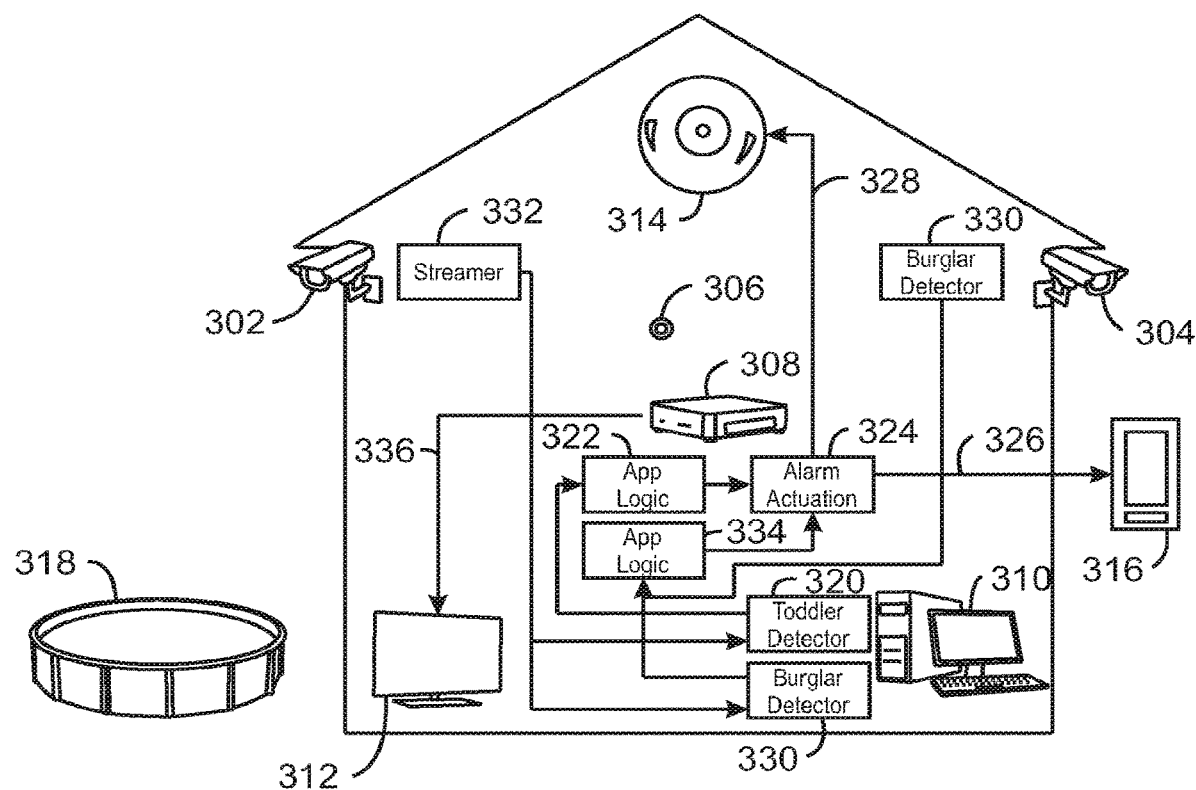

As illustrated in FIG. 3(C), a video stream 336 may be transcoded and sent from the gateway 308 to a TV 312 for viewing. The extra load may be too much for the gateway 308 to perform while maintaining an SLA. This may be detected by analytics on the IoT devices in the network, and the video analysis micro-services 320 and 330 may be automatically redeployed to the PC 310.

When the video streaming is completed, the video analysis micro-services 320 and 330 may be redeployed to the gateway 308, allowing the PC 310 to be used for other purposes or powered down. When the home security application is deactivated, the analytics on the IoT devices may determine that the toddler detector 320 may be redeployed to the backyard camera 302 and the streamer 332 may be saved for future use, or discarded. This improves the metrics for the network, moving all systems closer to optimum performance.

Figure 4:
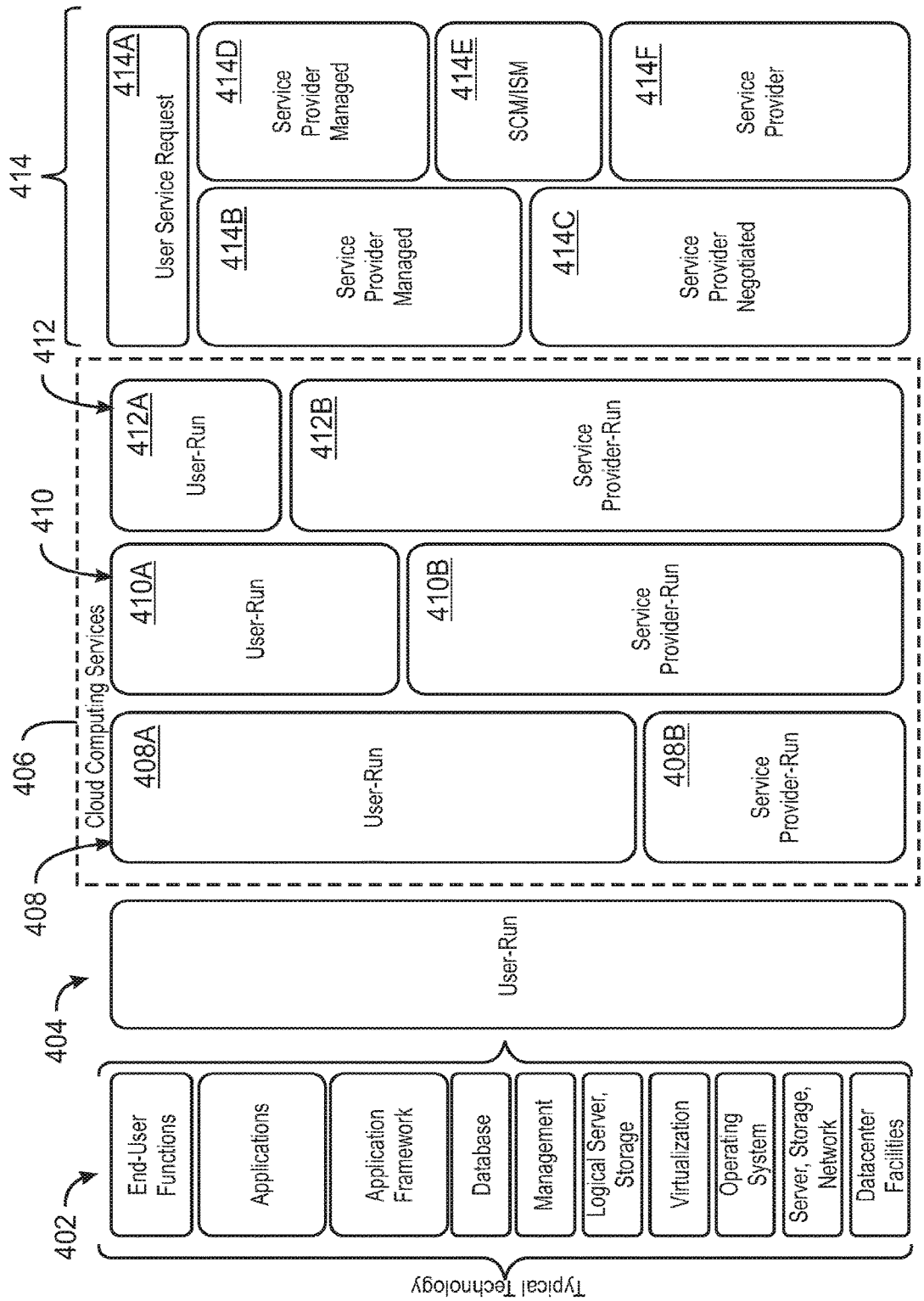
FIG. 4 is a schematic diagram of the changes to cloud data centers and networks that may be made to accommodate the current techniques described herein in accordance with some embodiments.

FIG. 4 is a schematic diagram 400 of the changes to cloud data centers and networks that may be made to accommodate the techniques described herein in accordance with some embodiments. In this example, as the techniques are implemented the need for user run services is decreased, lowering infrastructure costs and maintenance costs. Services 402 that may be involved include, for example, end user functions, applications, application frameworks, databases, system management, logical servers and storage, virtualization, operating system maintenance, physical server and storage networks, and data center facilities among others.

For example, an in-house IT infrastructure 404 may be completely user run and user maintained. This may correspond to a company building its own data center, purchasing servers, and maintaining them. The company configures the server and runs its own custom built business applications.

However, lower costs may be achieved, with greater reliability, as services are shifted to service providers in the cloud. This may be performed at a number of hierarchical levels, for example, a company may decide to install fewer physical facilities and take advantage of infrastructure as a service (IaaS) 408. In IaaS 408, the amount of user run processes 408A compared to the service provider run processes 408B is decreased. For example, a retailer may rent storage space in a cloud service for implementation of a project to store employee expenses in the cloud.

The amount of services run by the service provider may be further increased using platform as a service (PaaS) 410. As an example, in the user run portion of the service 410A, a user may write a custom application that uses vendor application programming interfaces (APIs) to access common services. In the service provider portion 410B, the service provider develops cloud platforms that allow the user to write custom-built applications using the APIs.

Still greater gains may be achieved using software as a service (SaaS) or business processes as a service (BPaaS) 412. In this implementation, the user run portion 412A of the service may merely be providing access to data, while the service provider run portion 412B of the system may handle all other functions, such as external accesses, maintenance, and the like.

In the techniques described herein, cloud computing 414 maintained by service providers is used to provide most of the functionality. The user provides a service request 414A, which is acted upon by the service provider.

For example, the service provider may manage services 414B requested by the customer according to a contractual agreement. Further, the service provider may obtain negotiated services 414C, in which the provider negotiates with other providers for delivery of services requested by the customer. Data center capability, service level agreements (SLA), and quality of service (QoS) parameters may be accounted for in the negotiated services 414C. Other service provider managed services 414D may include service aggregation portals with multiple service providers advertising their capabilities. Supply chain management/infrastructure service management (SCM/ISM) services 414E may include service portals with multiple service providers advertising capabilities. The service provider may manage an autonomic infrastructure 414F, for example, where the infrastructure aggregates automatically based on the service requirements. As the services, such as the in-house IT services 404, migrate to the cloud computing services 414, the upfront costs decrease where the scalability and customization increase.

As described herein, services may be provided from a service provider, which abstracts the business services and associated workflows from the infrastructure, enabling these services to be instantiated on available and reputable infrastructure components. For example, forming a services defined data center that may include both cloud computing components and IoT networks. The provision of services from the service providers may help to ensure resiliency and continuous operations. As described herein, the services defined data center may provide an elastic infrastructure that can be adapted to the size required for particular customer needs. The services may be managed from end to end to control the service delivery and support service resilience. The services defined data center may also adhere to the service level agreements (SLA) and quality of service (QoS) expectations that are pride across business services and their associated workflows.

Figure 5:
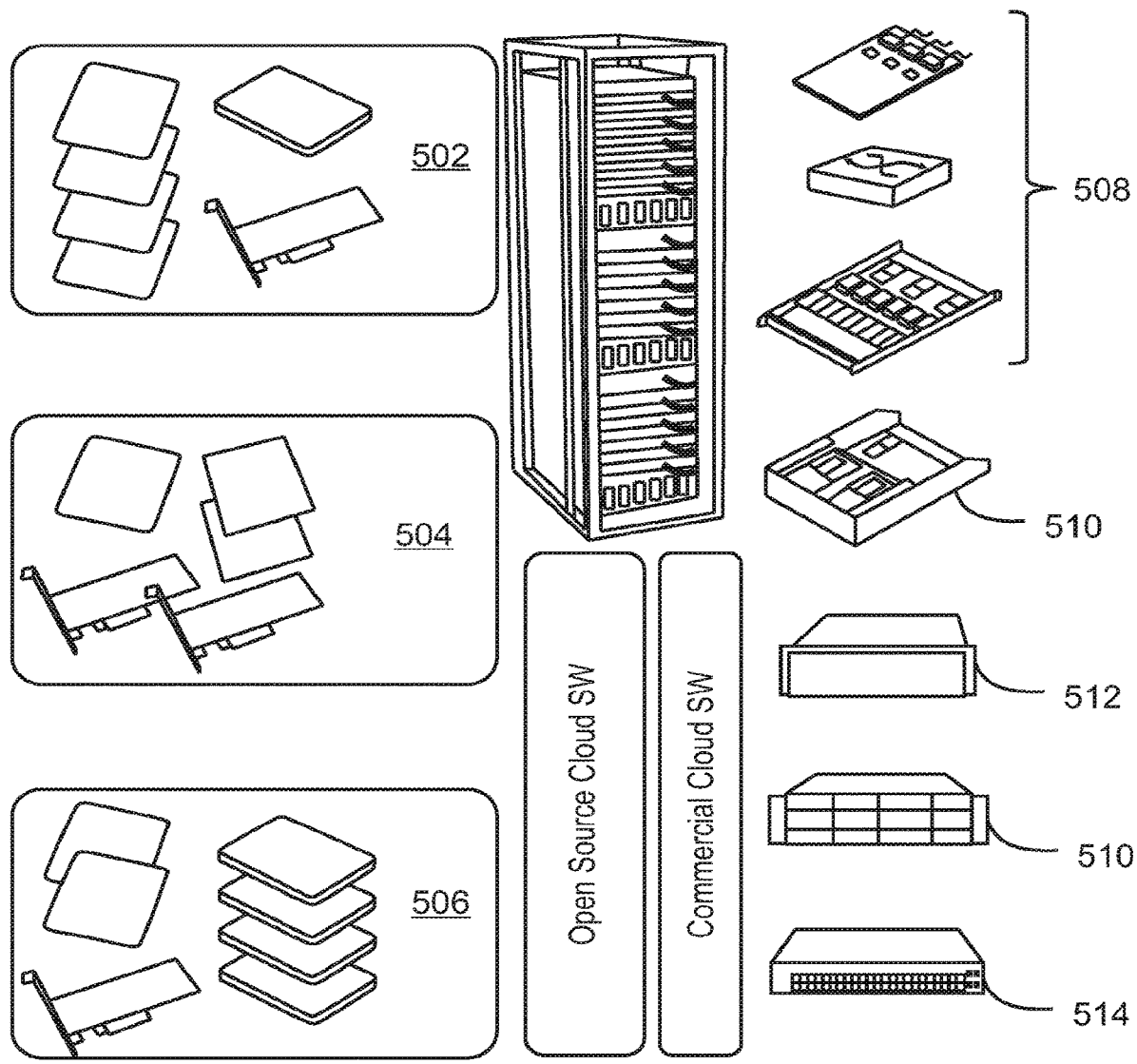
FIG. 5 is a schematic diagram of a services-oriented, cloud data center in accordance with embodiments.

FIG. 5 is a schematic diagram of a services-oriented, cloud data center 500 in accordance with embodiments. The services-oriented, cloud data center 500 may provide pools of programmable servers 502, networks 504, and storage equipment 506 supporting both converged and disaggregated platform architectures, IoT resources and Fog systems providing standard high volume building blocks optimized for cloud and IoT applications, such as providing microservices. Such pools may include individual compute nodes 508, storage nodes 510, server nodes 512, and network nodes 514.

The software implementing the services-oriented, cloud data center 500 may include open-source cloud software 516, commercial cloud software 518, or combination of both. The services-oriented, cloud data center 500 may provide a number of services and analytics, including quality of service, service capacity management, orchestration, and workload steering. The service capacity management may include, for example, service domain control and workload domain control.

The workload steering may be provided for discrete resource reservation, shadow resource reservation, and workload fingerprints. These fingerprints may be enumerated as workload objects, which describe the resource requirements for the workload to match them with the appropriate edge, fog or datacenter resources for fulfillment. The data provided by the services and analytics may be displayed to a user in any number of ways. For example, a control or configuration console may display the service result and analytical results. In other examples, an IoT device may include a display and input as described herein, and may be used to display this data. The display device may include user interaction options if permitted by the system configuration and policies. The quality of service measurements may provide infrastructure reputation and historical usage, such as reputation analytics, leading to reputation aggregation and then workflow and service delivery QoS metrics.

The service capacity management may provide the evaluation of run time and available cloud infrastructure capacity, including associated services as well as reservation processing. This includes all data center elements, from physical facilities through the operating systems, for the goal of delivering continuous infrastructure. The service capacity management may include the service domain control, which provides consistent identification, deployment, and configuration of infrastructure services via the network. The information of service capacity may be available through a standard interface on the DSF for the management domain, and may be provided for federated/associated management domains as well. Services include items such as security, indemnification, entitlement, licensing policies and governance, scheduling, and availability, among many others. The workload domain control may provide consistent and coordinated workload placement, for example, assigning workloads near the edge of a fog or cloud to a lowest level device capable of providing the capacity to implement the workload.

The orchestration may provide workflow awareness, infrastructure capability, and environment services assessment based workload placement. Further the orchestration may provide service and workload domain coordination, including a number of protocols, such as SOAP (simple object access protocol), RESTful (representational state transfer), S3 (simple storage service from Amazon Web services), CDMI (cloud data management interface), HDFS (The Hadoop distributed file system from Apache), GPFS (the general parallel file system from IBM, currently known as IBM spectrum scale), and Lustre (a Linux cluster computing protocol available under the GNU general public license), among many others.

As used herein, workload steering includes the determination, identification, allocation, reservation, and logical aggregation of infrastructure components, among others. This may be based on the workload requirements as defined by the workload template and anticipated load based on the historical and time-based factors. Discrete resource reservation may include the allocation of physical resources based on the initial load requirements. This type of reservation may use all infrastructure resources for the workload. As used herein, shadow resource reservation is the allocation of physical resources based on the total load requirements. This type of reservation may identify the resources, but allows lower service level workloads to be executed until the original workload requests the resources. As used herein, the workload fingerprints are the identifications of initial workload modeling, past workload instances and run time success or failure events.

In order to support IoT specific requirements, with unique and complex resource and service interactions, a new, lightweight service delivery structure, the DSF, is described herein. This enhanced architecture may inherently address several of the resource basic services within its framework, instead of through an agent or middleware. Services provided may include locate, find, address, trace, track, identify, and register, among others. These services may be in effect as soon as resources appear on the framework. The manager or owner of the resource domain May use management rules and policies to ensure orderly resource discovery, registration, and certification. This mechanism may simplify an existing hub-spoke or centralized management approach, and place the resource management functions on the network.

The resource management system may be constantly aware and can relay information about the motion, vector, and direction of resources, as well as describing these features in telemetry and metadata associated with the devices. This native IoT service framework function may be used for resource management, billing and metering, and security, among others. Things that are managed via this framework do not need to be re-discovered or re-registered, since the absolute and relative locations are always available through the resource association with the service domain and enumerated/enhanced via the data accessibility available from the CSI.

The same functionality may also be applied to related resources, where a less intelligent device, such as a sensor, is attached to a more manageable resource, such as an IoT Gateway. The framework may be aware of change of custody or encapsulation for resources. Since things may be directly accessible or be managed indirectly through a parent or alternative responsible device, this type of structure may be relayed to the service framework through its interface and made available to external query mechanisms.

Additionally, the framework may be service aware and balances the service delivery requirements with the capability and availability of the resources, and the access for the data upload from the data analytics systems. If the network transports degrade, fail, or change to a higher cost or lower bandwidth function, the service policy monitoring functions may provide alternative analytics, and service delivery mechanisms within the privacy or cost constraints of the user. With this feature, the policies may trigger the invocation of analytics and dashboard services at the edge ensuring continuous service availability at reduced fidelity or granularity. Once network transports are re-established, regular data collection, upload, and analytics services, for example, under regular SLAs, can resume. As described herein, the data may be presented to a user on a control console, an IoT device, or through a proxy server, for example, that has no permitted control functions.

Figure 6:
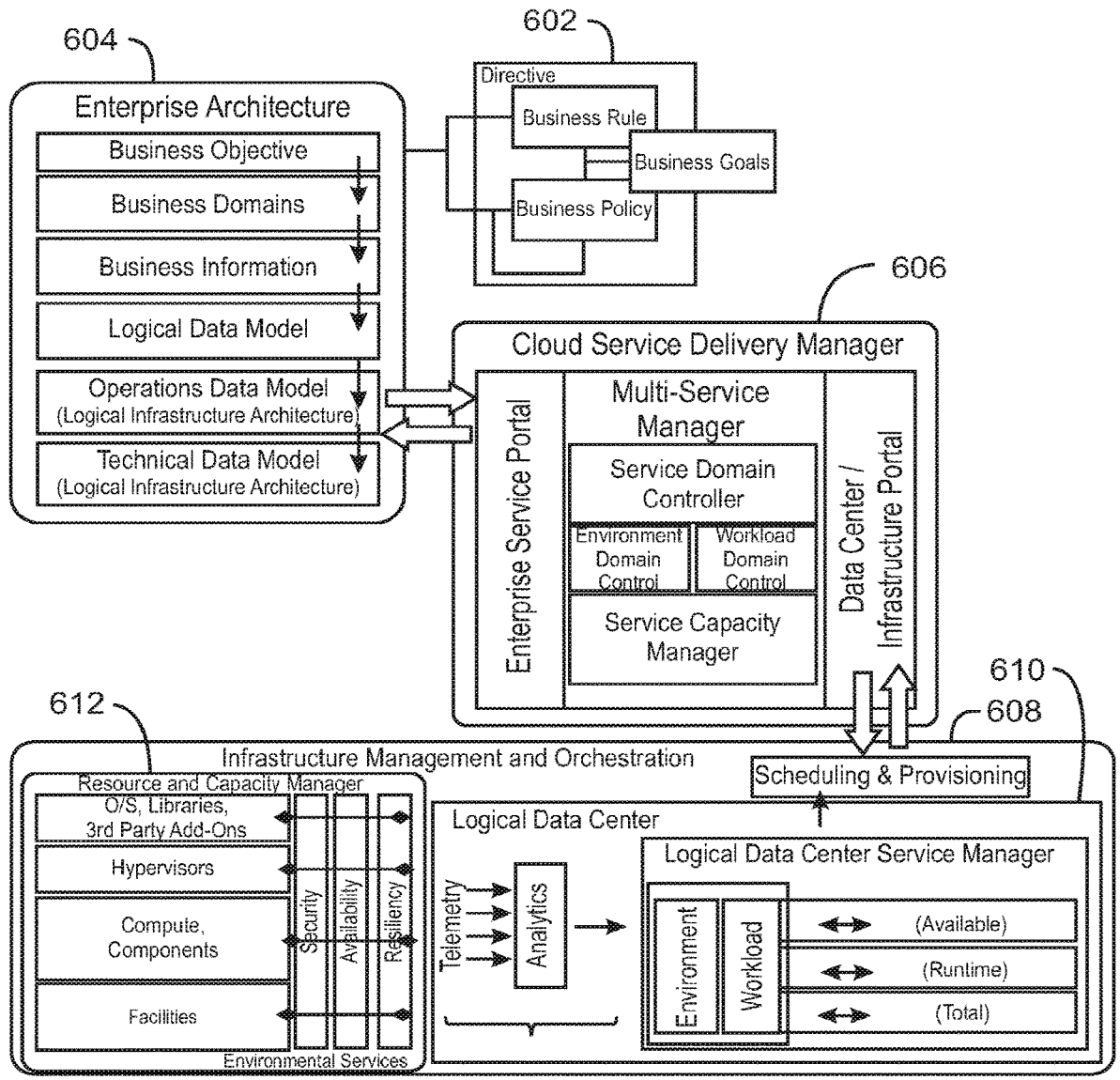
FIG. 6 is a schematic drawing of an infrastructure and orchestration system in accordance with embodiments.

FIG. 6 is a schematic drawing of an infrastructure and orchestration system in accordance with embodiments. The system includes a business directive 602 which includes business rules, business goals, and business policies. The business goals may be measured by the business rules in the business policy. The business rule and the business policy guide a business objective and service in an enterprise architecture 604.

In the enterprise architecture 604, the business objective and service may be mapped to business domains both internal and external in an organization. The business service requirement identifies the service level agreement (SLA) to be met to support the line of business. As used herein, an SLA is a contract between a service provider and a customer that specifies, in measurable terms, what services the provider will furnish and what penalties will be assessed if the provider cannot meet the established goals. The SLA may be a formal agreement that includes cost reductions if established goals are not met, or an informal agreement, such as between a consumer and local devices that instructs the local devices what changes may be needed if the SLA cannot be met.

The business domains may allow the creation of a business information architecture. The business information architecture defines the interaction between the service elements and defines the workflow. Thus, the business information architecture may allow the development of a logical infrastructure architecture including a logical data model.

The logical data model describes the SLA in terms of service level specifications (SLS). As used herein, the SLSs are the technical specifications deriving from the SLA. An SLS may be used to define the variables that will be monitored and results in thresholds that can be used to alert and proactively manage the service domain infrastructure.

An operations data model may be derived from the logical data model, and is also part of the logical infrastructure architecture. From the operations data model, a technical data model may be derived. Thus, the business service requirement is decomposed into a technical data model to identify all the business domains and associated infrastructure elements, connections, and technical data models for deployment. The logical infrastructure architecture, including the logical data model, the operations data model, and the technical data model, may be provided to a cloud service delivery manager (CSDM) 606, for example, through an enterprise service portal.

The CSDM 606 provides the management structure to connect, negotiate, and orchestrate the business SLA requirements and the infrastructure service capabilities. In some examples, the CSDM may use iterations to match resources to requirements. The multiservice manager in the CSDM 606 provides the orchestration and management, optimization, isolation, and sharing of services running under multiple tenants. The service domain controller manages the logic for pre-plow architecture, and the separation for the environment and workload requirements from the enterprise architecture output. The service domain controller coordinates with the service capacity manager and controls local and real time updates. The service capacity manager maintains communication with the logical data center manager to understand the data center service capability and availability. The service capacity manager may also report and manage the entitlement, enforcement, indemnification, and run time policies for the services. The environment domain controller and workload domain controller maintain communications with the environment and workload infrastructure controllers, respectively, to understand and coordinate data center service allocation. The CSDM 606 may provide information to an infrastructure management and orchestration system 608 through a data center/infrastructure portal.

The infrastructure management and orchestration system 610 may have a logical data center manager (LDCM) to provide a services capability, run time, and availability view of the physical infrastructure. The LDCM may provide the cloud scheduling and provisioning infrastructure with the best route, closest neighbor, available environment, and available performance metrics. The LDCM may utilize infrastructure telemetry and other facilities, including OS-based measurements, to accurately represent the capability the data center for service delivery. The LDCM may also include data from the CSI, to help ensure that all resources, edge, fog or datacenter may be managed through the LCDM structure. This may include risk assessment and infrastructure level QoS aggregation and rollup. The LDCM may provide a real-time view of the data center that they may dynamically adjust to changing conditions.

A resource and capacity manager 612 may include the physical resources of the data center. The physical resources may include software such as, for example, operating systems, libraries, and third-party add-ons, among others. Hypervisors may be included to control virtual machines, secure booting, and other functions. The compute components may include computing nodes, storage nodes, network nodes, distinct nodes, and disaggregated components. For example, the compute components may include servers and other data center components, IoT devices located either proximate to or distant from the data center, or both.

The physical resources may also include the facilities, for example, the racks, rows, trays, sled, HVAC, environmental, access, power, and location, among many others. The resource and capacity manager 612 may perform functions such as asset and inventory discovery, asset utilization, management of facilities, typology management, and central reporting, among many others. Event management services may be included to leverage monitoring a task architecture, including functions such as heartbeat services, task library, task scripts, and others.

Figure 7:
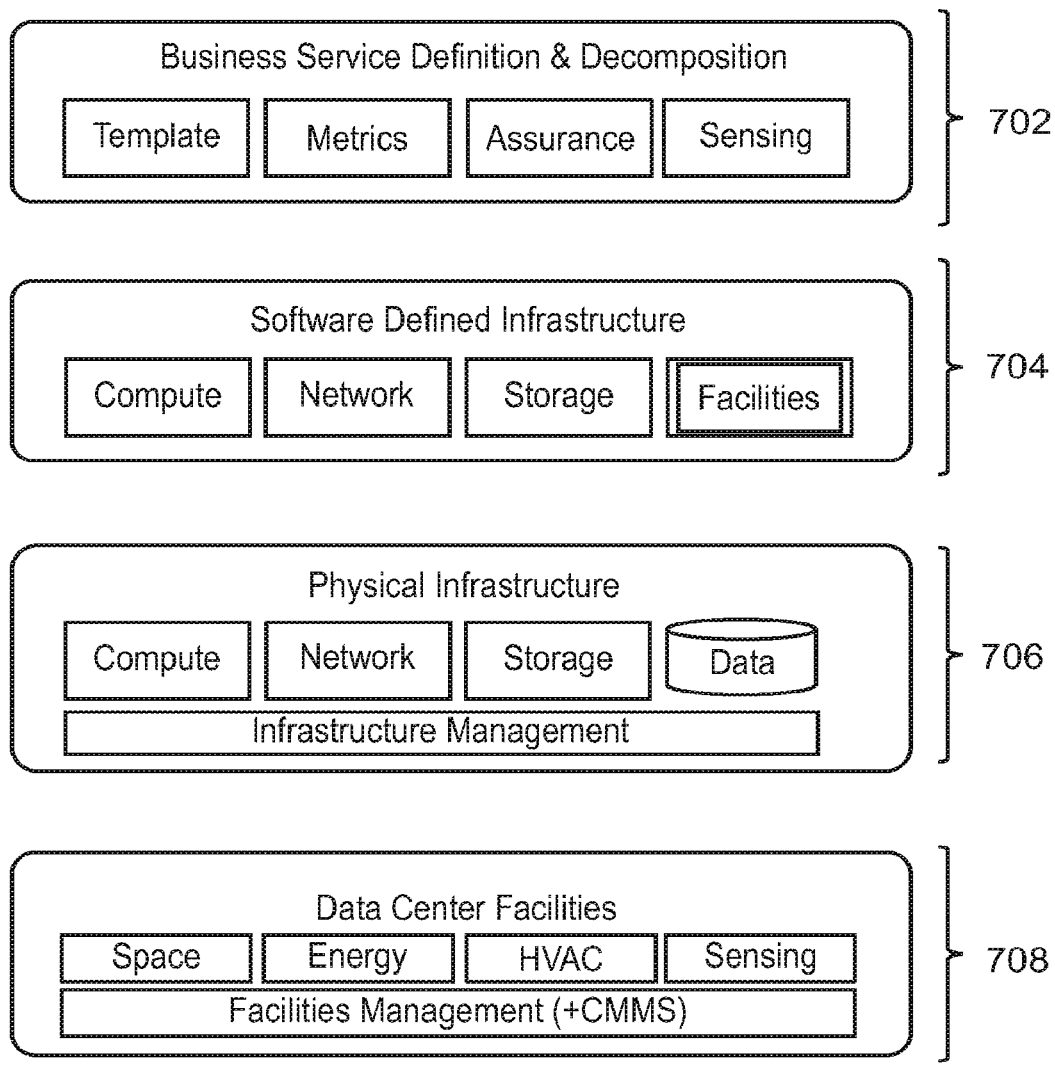
FIG. 7 is a block diagram illustrating layers of a data center federation system that may provide micro-services to other systems, including IoT networks, in accordance with embodiments.

FIG. 7 is a block diagram illustrating layers of a data center federation system 700 that may provide micro-services to other systems, including IoT networks, in accordance with embodiments. The data center federation system 700 may include a service orchestration layer 702 that defines the business service request and the SLA/QoS parameters. The service orchestration layer 702 may manage the service request, and adhere to the SLA/QoS parameters per agreements with software providers. The service orchestration layer 702 may include, for example, templates for services. Metrics for the services may be defined by the SLA/QoS parameters. Assurance functions may be included to determine what actions to take if the metrics are not met. Sensing functions may work with other layers to obtain telemetry data to determine if the metrics are being met.

A workload orchestration layer 704 may decompose the requested application, or service, and define the applications, workflows, and key performance indicators (KPIs) against the SLA/QoS parameters and service capacity metrics to meet the request. The workload orchestration layer 704 may provide a software defined infrastructure that includes, for example, virtual computing resources, virtual networking resources, virtual storage resources, and virtual facilities, among others.

An infrastructure orchestration layer 706 may control the physical infrastructure. The infrastructure orchestration layer 706 may provide infrastructure fulfillment elements and determine an optimum location and placement for the workloads and applications. The infrastructure orchestration layer 706 may be aware of the infrastructure capability and availability, for example, including the physical infrastructure such as computing resources, network resources, storage resources, and data placement. Further, the infrastructure orchestration layer 706 may include infrastructure management functionality to coordinate the use of the physical infrastructure.

A facilities management layer 708 may manage specific data center facilities used by the other layers. In addition to facilities management functions, the facilities management layer may manage facility spaces, energy demand, HVAC, and sensing or telemetry functions.

Figure 8:
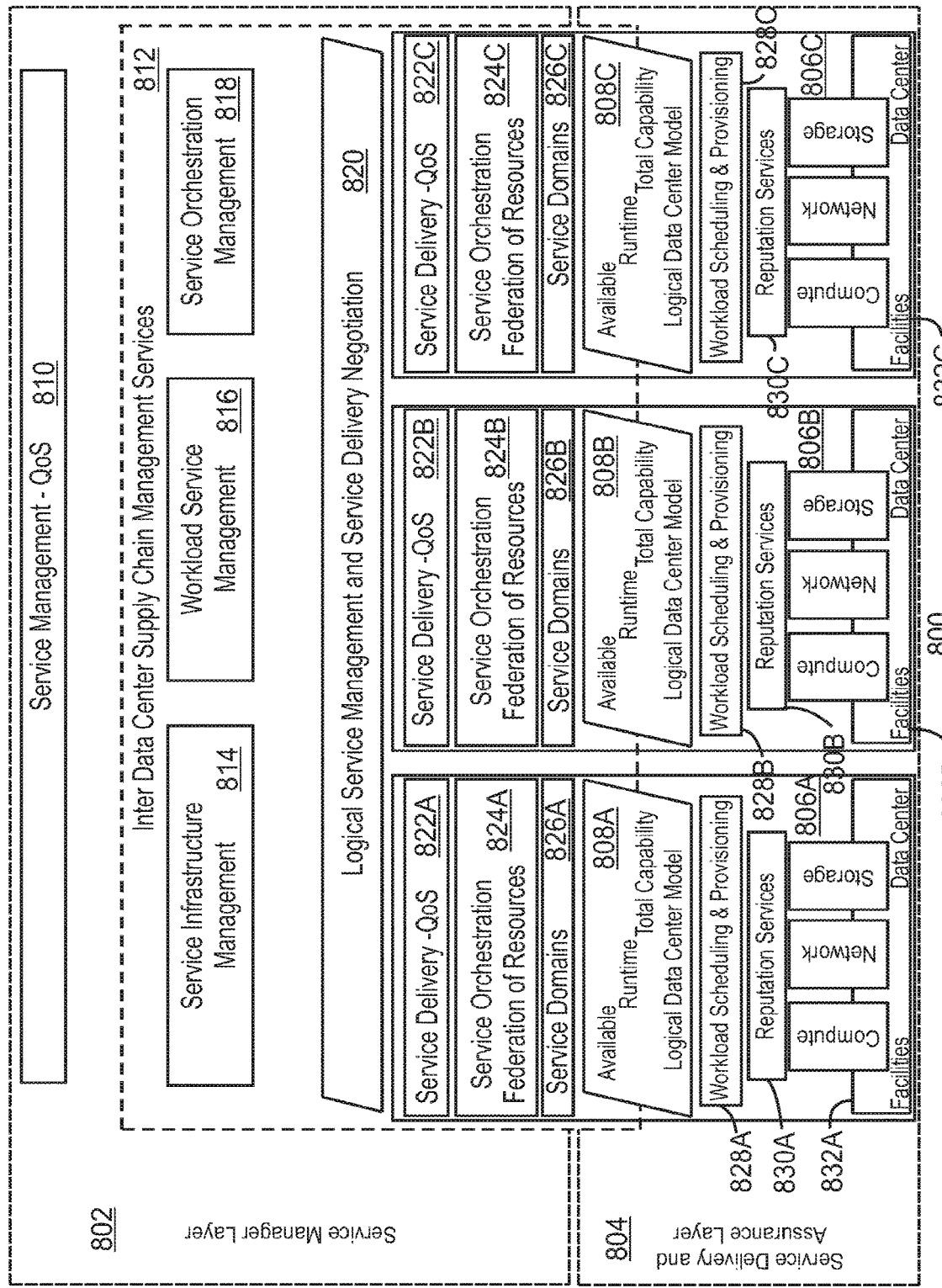
FIG. 8 is a schematic diagram of a supply chain to provide service management, orchestration, and federated cloud services in accordance with embodiments.

FIG. 8 is a schematic diagram of a supply chain 800 to provide service management, orchestration, and federated cloud services in accordance with embodiments. The supply chain 800 may include two layers. A service manager layer 802 may include the functions used to provide the services. A service delivery and assurance layer 804 may interface with other systems 806A to 806C, for example, through logical data center models 808A to 808C. In the service manager layer 802 a service management function 810 may track the QoS for the services provided to determine if they are meeting the SLAs.

The service manager layer 802 may include supply chain management services 812, for example, as described with respect to FIG. 7. These may include a service infrastructure management system 814, a workload service management system 816, and a service orchestration management system 818, among others. A logical service management and service delivery negotiation service 820 may work with lower level systems, such as a service delivery QoS function 822A to 822C. Other functions, such as federation of resources services 824A to 824C and service domain controls 826A to 826C, may be used with the service orchestration.

The service delivery and assurance layer 804 may include workload scheduling and provisioning functions 828A to 828C to determine the placement or activation (decompression and loading) of workloads, such as micro-services. Reputation services 830A to 830C may track the operations of the workloads on particular physical systems, or facilities 832A to 832C, to determine if the workloads are being executed in a manner consistent with SLA/QoS metrics. The reputation services 830A to 830C may also provide telemetry of the metric measurements to the service management layer 802, for example, for tracking by the service management function 810. The data provided by the telemetry of the metric measurements may be displayed to a user in any number of ways, as described herein. For example, the metrics may be displayed on a management console, at an IoT device in a remote location, or through a proxy server, for example, having no control capability. As noted herein, the display device may include user interaction options if permitted by the system configuration and policies selected.

Figure 9:
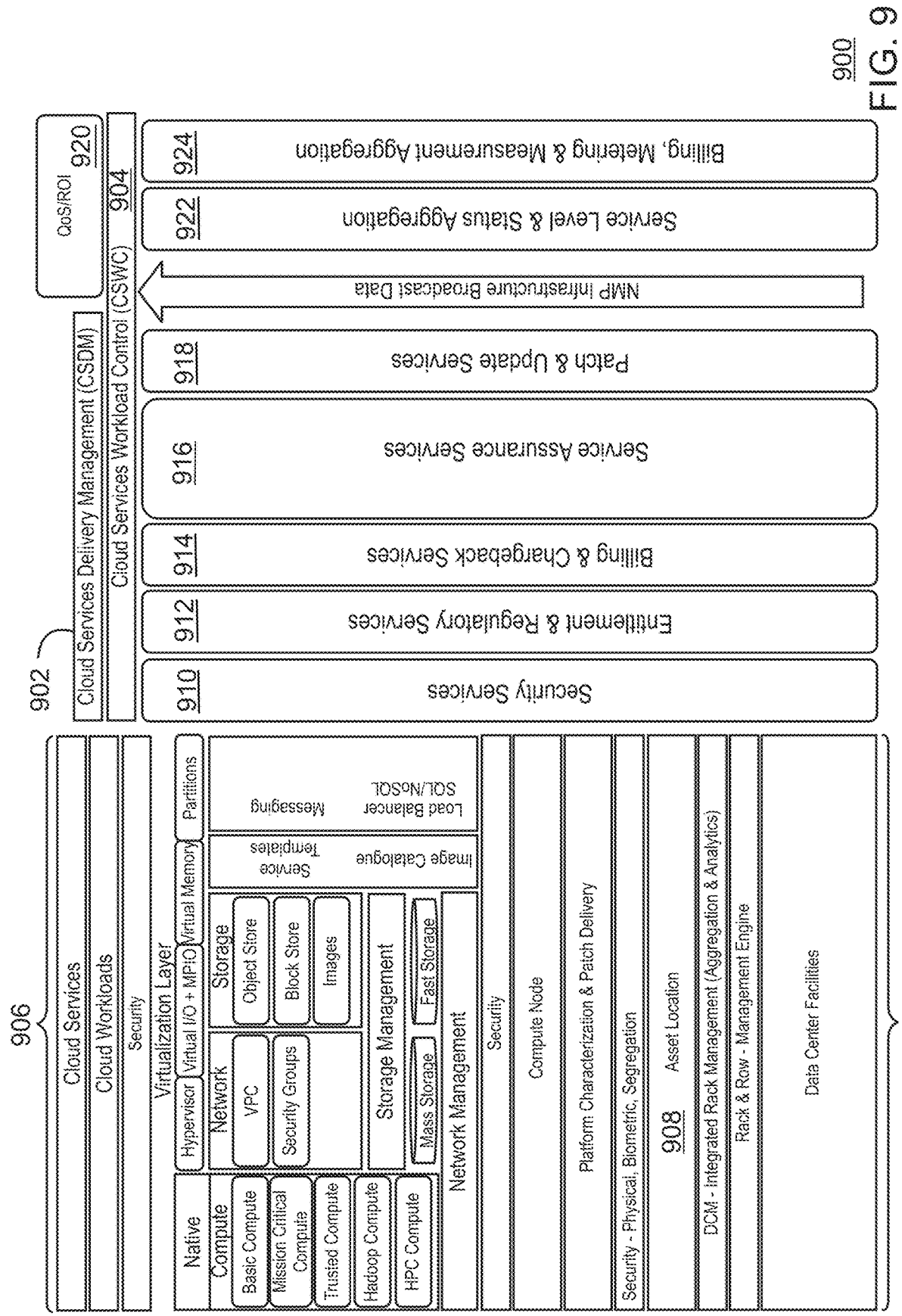
FIG. 9 is a block diagram of an example of a data center management stack for orchestration of workloads in accordance with some embodiments.

FIG. 9 is a block diagram of an example of a data center management stack 900 for orchestration of workloads in accordance with some embodiments. The data center management stack 900 may include functions to provide micro-services and other workloads to IoT networks, as well as other networks over a cloud. These may include a cloud services delivery management (CSDM) 902 and cloud services workload control (CSWC) 904. Cloud functions 906 may include any number of functions completed in the cloud, such as services and workloads performed by network servers. Virtualization functions may include compute, network, and storage functions, such as storing service templates, image catalogs, providing messaging functions, database functions, and load functions, among others. Functions specific to providing the services may include asset location services 908, such as inventory management, dynamic asset location, service catalogs, and request fulfillment. The data used to supply the functions may be displayed on devices located proximate to the use of the functions, for example, IoT devices that are requesting the micro services, or associated devices such as a management server located proximate to the IoT devices.

The cloud services delivery management functions 902 may include security services 910, entitlement and regulatory services 912, billing and chargeback services 914, and service assurance services 916, such as proactive polling of infrastructure to assure service delivery, among others. A patch and update service 918 may ensure that micro-services running on other networks, such as IoT networks, are using the latest versions of software. QoS functions 920 may be used to ensure that SLA/QoS metrics are met. These may include service level and status aggregation services 922, and billing, metering, and measurement aggregation services 924.

Figure 10:
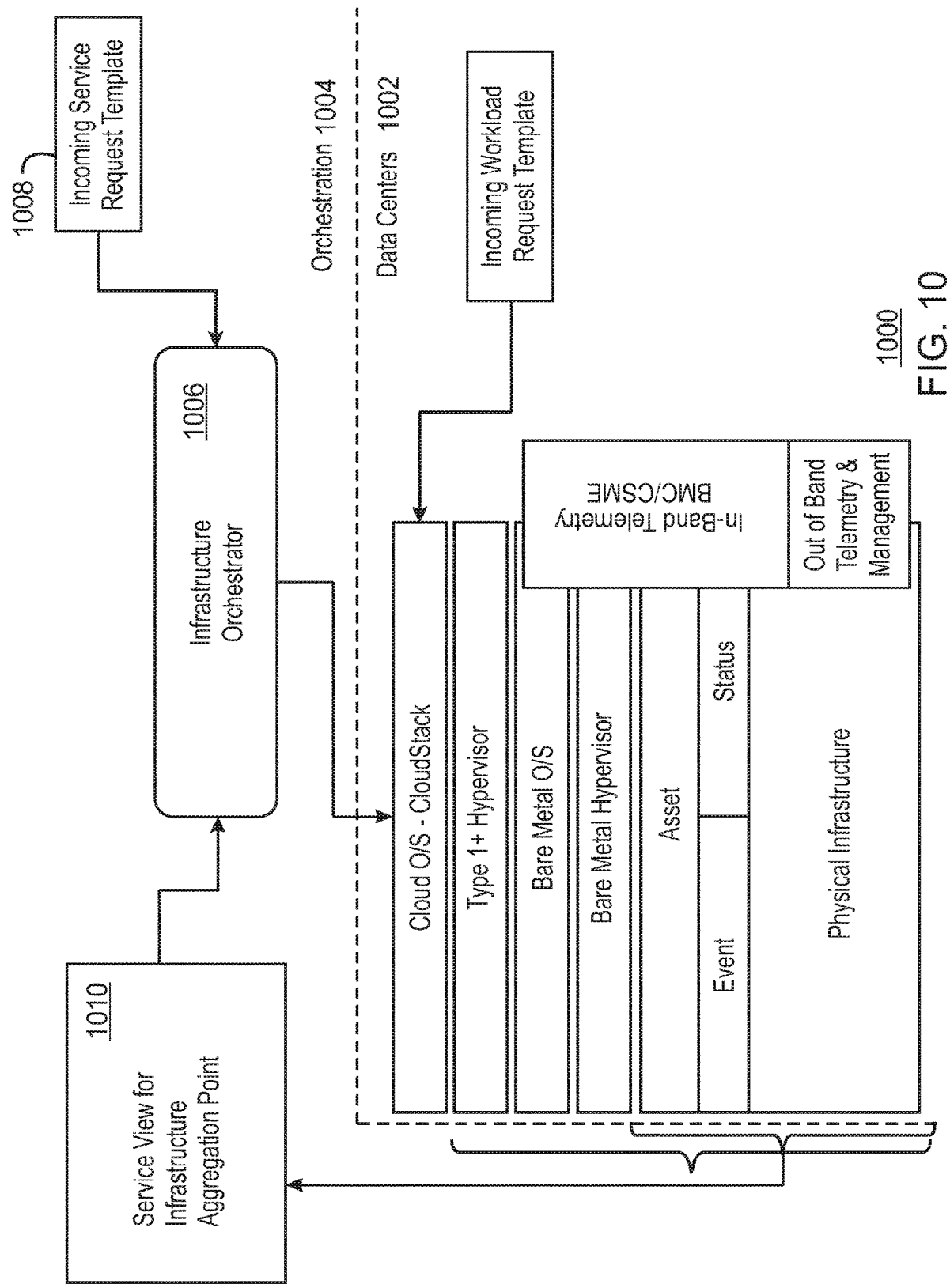
FIG. 10 is a schematic diagram of an orchestration service management structure in accordance with some embodiments.

FIG. 10 is a schematic diagram of an orchestration service management structure 1000 in accordance with some embodiments. As described herein, data centers 1002 may have an orchestration system 1004 to provide micro-services and other functions to other networks and systems, such as other data centers and IoT networks, among others. To perform these functions, an infrastructure orchestrator 1006 may work with the data centers 1002 to place workloads in appropriate places. The infrastructure orchestrator 1006 may receive an incoming service request template 1008, and determine from telemetry information 1010 the appropriate place to send a workload. The telemetry information 1010 may include a service view for the infrastructure aggregation point, including such information as the performance, availability, and service capability of the data centers 1002. The data centers 1002 are not limited to large cloud servers but may include IoT networks, or local ad-hoc IoT resource based Fog systems as well, for example as described with respect to FIG. 11.

Figure 11:
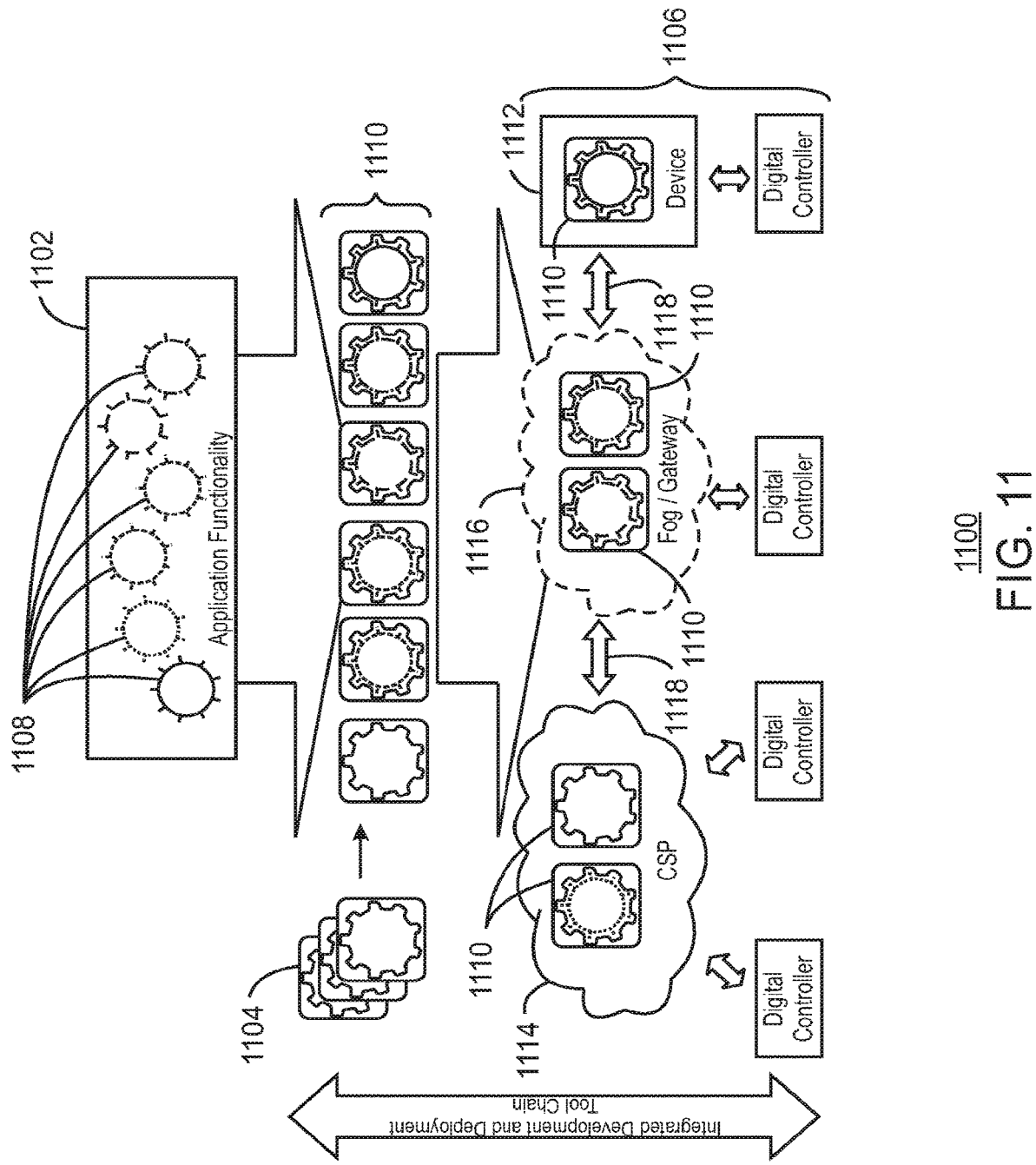
FIG. 11 is a schematic diagram of an example of an application being decomposed and packaged into containers which are then provisioned to systems in accordance with some embodiments.

FIG. 11 is a schematic diagram of an example of an application 1102 being decomposed and packaged into containers 1104 which are then provisioned to systems 1106 in accordance with some embodiments. As used herein, containers 1104 may be software wrappers that allow a code segment to run under different operating systems, hardware, and the like. The approach is to decompose the application 1102 into components, or tasks 1108, package the tasks into containers 1104, forming containerized tasks 1110, and then dynamically orchestrate the deployment of the containerized tasks 1110 onto devices, physical or virtual, in the systems 1106. As used herein, the tasks 1108 may be considered micro-services that may be provided to a network by a service provider. The containers 1104 may include containers 1104 designed for deployment to different hardware platforms and operating systems. For example, containers 1104 may be included for allowing tasks 1108 to operate in virtual machine (VMs), floating point gate arrays (FPGAs), devices with specialized hardware, such as sensors, actuators, and the like, and systems 1106 that use the Intel® security guard extensions (SGX) for secure operations, among many others.

Other types of containers 1104 may include an intelligent thing container/stack for MCU/Quark class things, running over disadvantaged wireless networks (mesh) networks, such as lighting, sensor arrays, thermostats, camera arrays, and the like. These workloads may be specific to the device and may not be migrated.

The containers 1104 may include a machine container/stack for machines that have more powerful general purpose processors, such as the Atom processors from Intel, and which may perform rich computing over high band wired or wireless networks. These machines may include HVAC controllers, health monitors, cars, locomotives, and the like.

The containers 1104 may include an operator container/stack for servers that may perform more complex functions. The more complex functions may include, for example, operations functions, streaming of big data, operation of Historian databases, provision of operational analytics, implementation of control station/room functions, implementation of autonomics, cognitive computing, and the like.

Other containers 1104 may include a local cloud container/stack. This may provide specific capabilities, for example, for running fleets of machines. Further, these may be a step-up for the operator container and to add data for at-rest/in-motion filtering, control functions, tiering of a system, fail over response, app marketplace, provisioning of a machine fleet, and the like.

Containers 1104 may include a mobile UX container/stack, for example, designed to run on Android and iOS to provide a mobile HMI console. This may allow field technicians and operators to use mobile devices to "console in" to the sensors or machines, do remote configuration, setup, process monitoring, and the like.

The use of the containers 1104 allows tasks 1108 to be repackaged into other containers 1104 for deployment to different systems 1106 without rewriting the code of the tasks 1108. Thus, the containerized tasks 1110 may be deployed and dynamically redeployed across heterogeneous networks of systems 1106. The orchestration of the deployment may include IoT devices 1112, edge computing devices 1114, such as cloud service providers (CSP) and data centers, gateways and FOG devices 1116, or cloud infrastructure. As systems and loading change, the containerized tasks 1110 may be automatically shifted, as indicated by arrows 1118, between different systems 1106. The target systems 1106 may request containerized tasks 1110 be provided by an orchestration system, or that the orchestration system build new components if needed.

Figure 12:
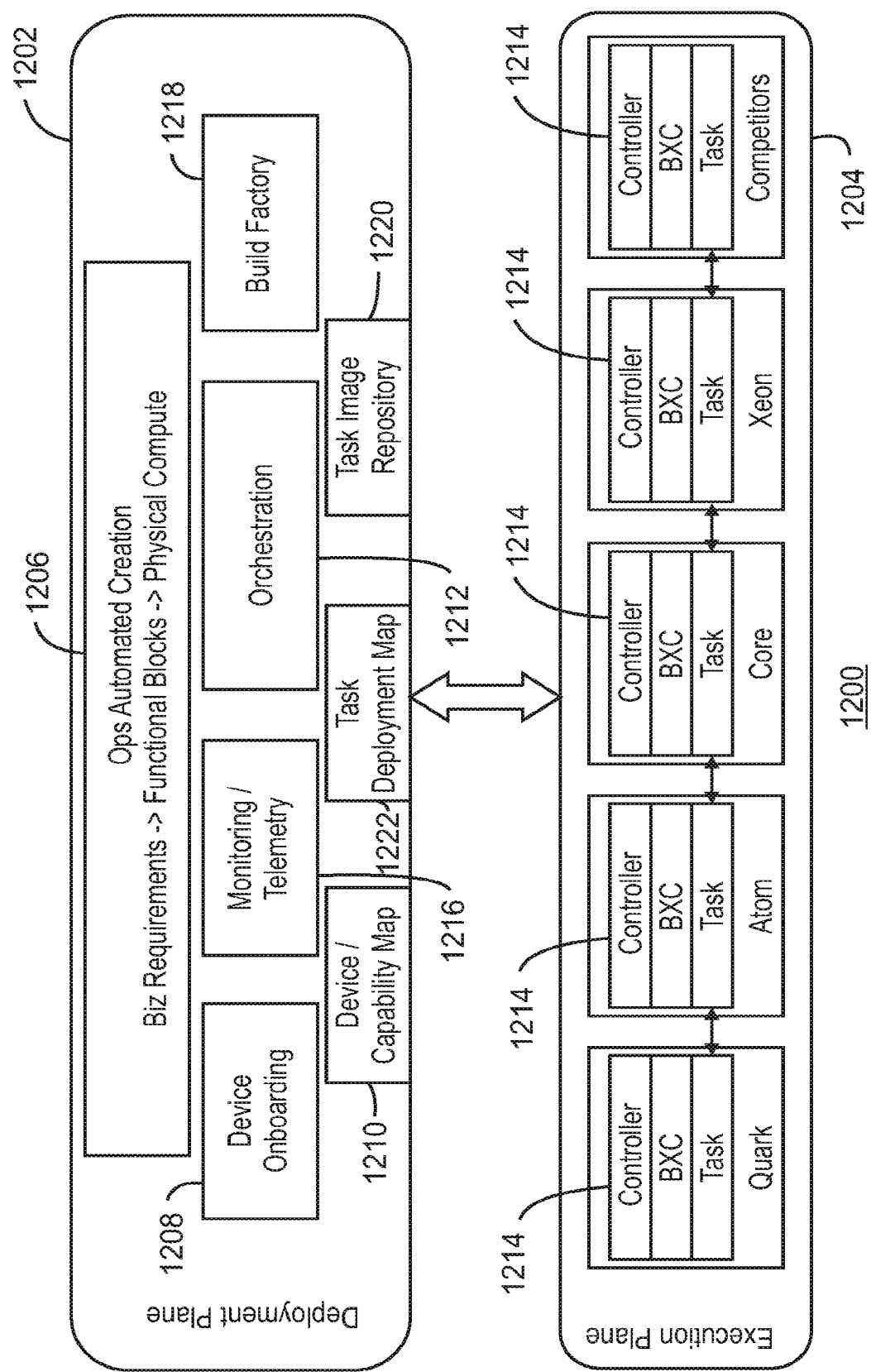
FIG. 12 is a schematic diagram showing a provisioning system including a deployment plane and execution plane in accordance with some embodiments.

FIG. 12 is a schematic diagram showing a provisioning system 1200 including a deployment plane 1202 and execution plane 1204 in accordance with some embodiments. The deployment plane 1202 may include the initial functions 1206 for providing micro-services, such as defining the business requirements, coding or obtaining the initial micro-services, and the deployment of the physical infrastructure. The deployment plane 1202 also includes a number of automated functions, such as a mechanism for on-boarding 1208 new devices in the execution plane 1204. These devices are added to the device/capability map 1210, which is used for orchestrating the deployment of applications and functions by an orchestration device 1212.

Each on-boarded device in the execution plane includes a controller functionality 1214, which manages the deployment of software components and measures available resources, such as CPU and memory utilization, network bandwidth, security status, and the like. Resource utilization measured by the devices may be sent to the device/capability map 1210 by a monitoring/telemetry tool 1216. The components may be packaged into containers by a build factory 1218. The containerized components may be stored in a task image repository 1220 for future use. In some examples, containerized components are deleted when not in use, and retrieved from a service provider over DSF when needed. A task deployment map 1222 may be used to track where the individual containerized components of an application are to be deployed.

As described herein, an application may be created to implement a workflow. The workflow may be made up of interconnected functional blocks, which may be made up of other functional blocks and tasks. The concept is to define and design a service orchestration system that is aware of the relevant resources, their capabilities, abilities, allocations, permissions, and allowances to be involved in a service.

The purpose is to integrate the technology, interfaces and capabilities to manage a service with a service level agreement for a consumer and/or service initiator. Systems described herein may enable the tracing, tracking, and management of a service through all the elements and resources delivering the service during the lifecycle of that session. Further, the systems may allow the remediation and orchestration of services to ensure that the consumer level SLA is maintained and the remediation process is transparent. The systems may also include the management of the local Service Level Objectives (SLOs) for the elements and resources, as contained in the CSI, to ensure that a proper remediation process is deployed by the orchestrator.

As an example, if a security task is running in an IoT network to provide a video feed of a location, and a degradation of network communications occurs, the security task may automatically attempt to reroute the video feed through other network connections. In this example, the video feed may normally be sent through a first wireless gateway, then through a wired network to a monitoring station. However, if the wired network connection is broken to the first wireless gateway, the first wireless gateway may attempt to reestablish communications by sending the video feed through a second wireless gateway. If the reestablishment of full communications is not possible, the security task may inform a user that the decreased bandwidth makes full video communications impossible, and determine if the user would like to continue with intermittent still pictures. Alternatively, since the SLA is a range, other remediation techniques may include the acceleration of services between the North/South side of the offending resource, or a request to reset the SLA if remediation is not possible, but the service can continue with some degradation.

The techniques described allow the capability for coordinated activities and also the ability to measure, manage, and ensure the quality of the service. This may allow the provided services to adhere to contractual service level agreements. Further, services dependent on reliability, such as medical services, insurance services, financial services, and the like may be able to implement IoT networks for further functionality.

Figure 13:
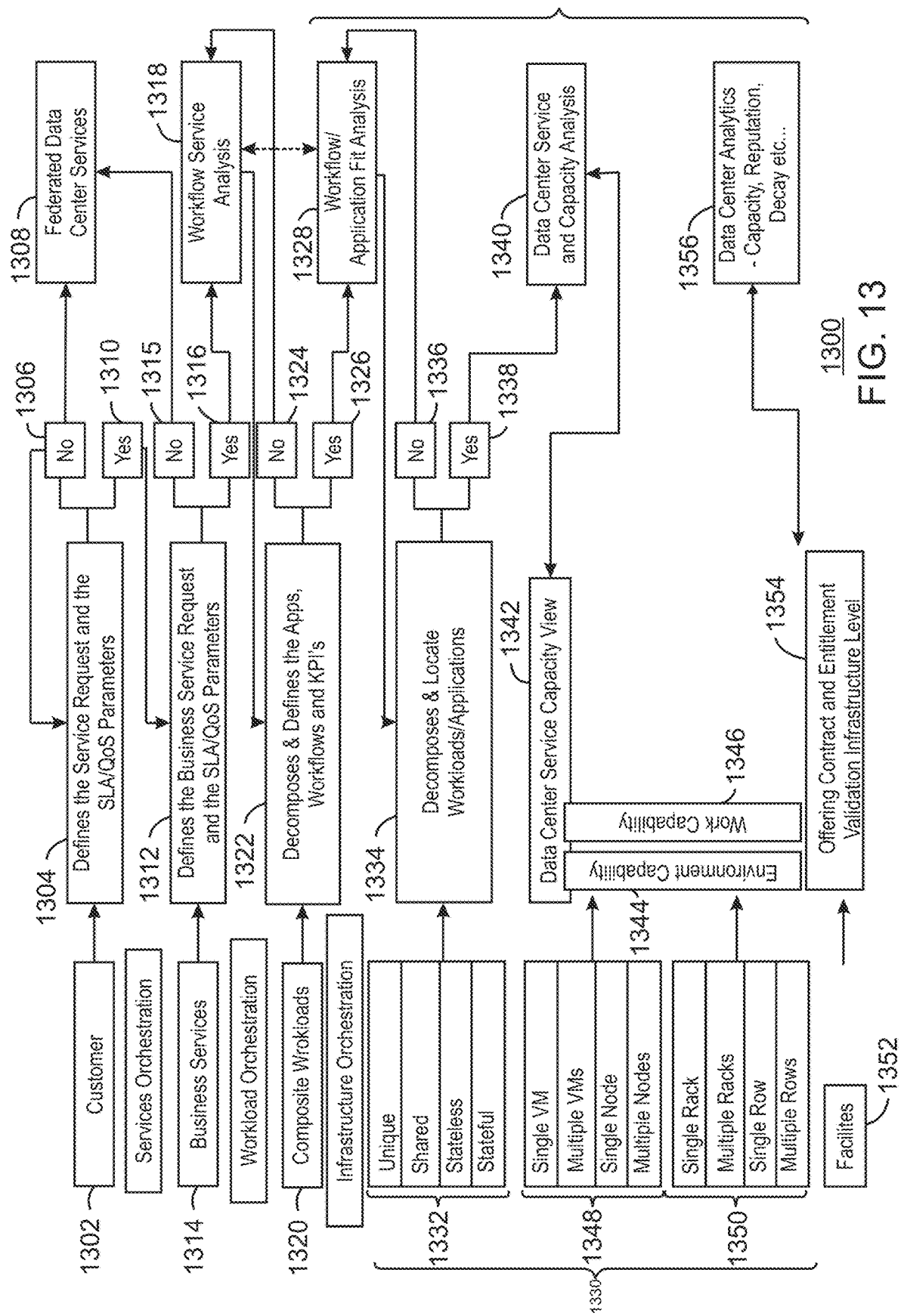
FIG. 13 is a schematic diagram of data center federation for the orchestration and management of relationships in service-level agreements in accordance with some embodiments.

FIG. 13 is a schematic diagram 1300 of data center federation for the orchestration and management of relationships in service-level agreements in accordance with some embodiments. In the schematic diagram 1300, a customer 1302 makes a service request and defines the SLA/QoS parameters at block 1304. This may be performed under an overall agreement with the service provider, or on a service by service basis. If the service request or the SLA/QoS parameters cannot be met, as determined at block 1306, process flow may return to block 1304 for re-negotiation of the agreement. Otherwise, the customer request may be sent on to a federated data center services, as indicated at block 1308, to determine if services that can meet the SLA/QoS are available.

If the negotiation is successful, as determined at block 1310 the business service request and the SLA/QoS parameters are defined at block 1312, with input from the business services 1314. If as indicated at block 1315, the business service request or the SLA/QoS parameters cannot be defined the request may be sent on to a federated data center service at block 1308.

If the business service request and the SLA/QoS parameters can be defined as indicated at block 1316, at block 1318, a workflow service analysis is performed to determine where to place the workflows. The composite workflows 1320 and the analysis results may be used at block 1322 to decompose and define the applications, workflows, and KPIs. This may be performed against the SLA/QoS parameters and the service capacity metrics for the nodes identified in the workflow service analysis. If at block 1324 it is determined that the decomposition and definition was not successful, process flow may return to block 1318 to repeat the workflow service analysis. If the decomposition and definition process in block 1322 was successful as indicated by block 1326, at block 1328, a workflow and application fit analysis may be performed to determine the locations to place the workflow.

The workflow is then fed to an infrastructure orchestration system 1330 to deploy the workloads, and micro-services, to the final locations. This may include such parameters 1332 as whether the workload is unique, shared, stateless, or stateful, among others. At block 1334, the workflow fit analysis from block 1328, and the parameters 1332, are used to decompose and determine the locations and placement of the workloads and applications. This may be done through the application characterization and the best fit parameters. If the placement is not successful, as determined at block 1336, process flow may return to block 1328 to repeat the fit analysis.

If the workflow placement is successful, as determined at block 1338, at block 1340, a data center service and capacity analysis may be performed to obtain metrics for the operations as the workload is being performed. The data center service and capacity analysis may access a data center service capacity view as shown in block 1342. The data center service capacity view may be provided by capability analysis blocks including an environmental capability as shown at block 1344 and a work capability is shown at block 1346. The capability blocks 1344 and 1346 may determine characteristic such as regulatory compliance, indemnification, fulfillment (such as of SLA/QoS metrics), security policies, and availability, among many others. These analyses may be based on metrics for virtual systems 1348 and physical systems 1350. The data center service capacity view may also be physically viewed on a management console, an IoT display, or any of the other display embodiments described herein.

A facilities 1352 analysis may validate that the infrastructure level is performing at the offering contract an entitlement level, as indicated at block 1354. This information may be used to feed a data center analysis, as indicated at block 1356, which may track data center capacity, reputation, decay, and the like. As noted herein, the term data center may include cloud-based systems, such as servers and other devices in the cloud, as well as devices located at the edge of the cloud, including fog devices, IoT networks, and individual IoT devices, among others, such as smart phones, tablets, and the like.

Figure 14:
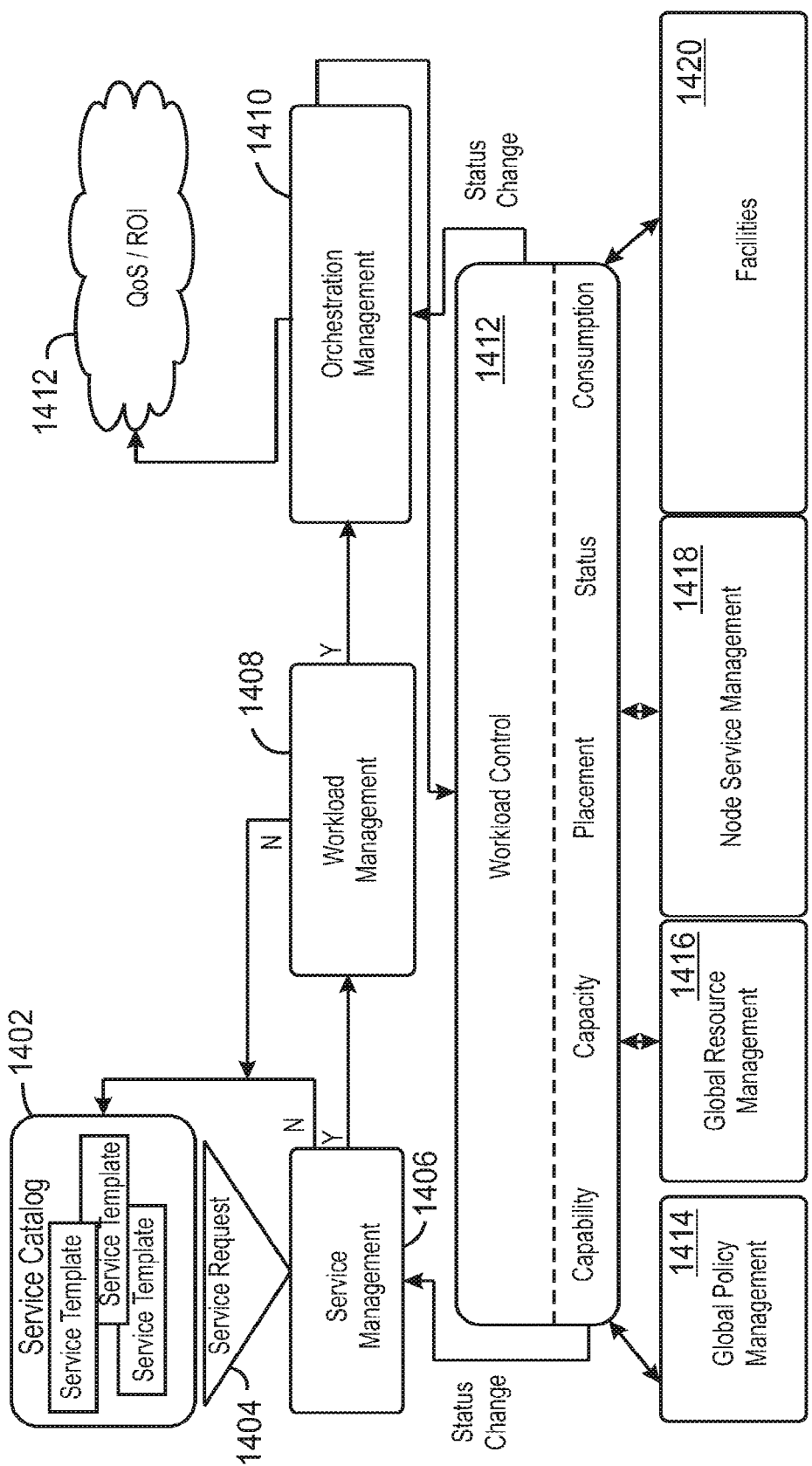
FIG. 14 is a schematic diagram of an example of a process for cloud service delivery management process in accordance with some embodiments.

FIG. 14 is a schematic diagram of an example of a process 1400 for cloud service delivery management process in accordance with some embodiments. The process 1400 may include a service catalog 1402 that can provide micro-services to devices and systems. The service catalog 1402 may provide information on the different available micro-services and a uniform resource locator (URL) to access the micro-services. The service catalog 1402 may include core micro-services that will be broadcast to most of the edge network nodes and complementary micro-services that will be routed based on request. Further, the service catalog 1402 may provide micro-services when a service request 1404 is received. The micro-services may be provided in in a sequence, for example, a face detection micro-service may be provided, followed by a face recognition micro-service, and then a micro-service to open a garage door when a vehicle arrives. This will allow the provision of micro-services to enable IoT services for newly installed devices with minimal configuration.

The requested services may be sent to a service management function 1406. The service management function 1406 captures, aggregates, and understands the infrastructure capability, availability, and status. Further the service management function 1406 provides a map to the infrastructure capability, including, for example, security, entitlement, performance, throughput, and regulatory metrics, among others.

If the service management function 1406 determines that the infrastructure reports okay and the capability reports okay, the service request 1404 may then be sent to a workload management function 1408, which may decompose the service request and understand the workload requirements. The workload management function 1408 may map workload delivery on to infrastructure elements, such as IoT devices, fog devices, data centers, and the like. The workload management function 1408 may also run workload modeling agents, if available, to model the service run on the infrastructure, for example, gathering quality of service (QoS) and service assurance data. If the workload management function 1408 determines that the infrastructure elements are insufficient, or identifies other reasons why the mapping cannot be completed, it returns to the service catalog 1402 to determine if any other services may be used to complete the service request 1404. For example, the service request 1404 may be denied or renegotiated for a new SLA if the infrastructure reports a lack of availability, stability, or resilience in the physical units. Further reasons for returning to the service catalog include an inability to meet the SLA parameters, the service request parameters, or the workload requirements.

If the workload management function 1408 determines that the QoS and service assurances reports are sufficient, the workloads from the workload management function 1408 may be provided to an orchestration management function 1410. The orchestration management function 1410 may assign infrastructure elements to workloads, including, for example, provisioning images, establishing connections, registering entitlements and use, reporting to regulatory functions, and the like. The infrastructure SLA may be aggregated to provide QoS metrics. Further service assurance feedback may be provided to QoS monitoring services. This may be performed in concert with QoS and return on investment (ROI) metrics 1412 in the cloud, that include SLA metrics and qualitative and quantitative solution benefits. The orchestration management function 1408 may reassign infrastructure elements upon receiving a notification from the infrastructure of a failure, an SLA outage, infrastructure control plane insufficiency, or a service change, among others.

The orchestration management function 1410 provides information to the workload control function 1412. The workload control function 1410 gathers and maintains data status information on all active workloads, providing usage statistics on nodes, such as cloud data centers, and other devices, including fog devices and IoT devices, among others. Further the workload control function 1412 collects utilization and capacity information for workloads running on nodes. The workload control function 1402 also gathers and maintains data infrastructure SLA metrics, and failure, diagnostics, and service status information, among others. As noted herein, the data and usage statistics may be displayed on a management console, and IoT display, or through a proxy server, for example, having no control functions. The display may include user interaction options if permitted by the system configuration and policy selected.

The data for the workload control function 1412 may be collected from a number of different sources. For example, a global policy management function 1414 may provide policies concerning configuration, bare metal provisioning, monitoring, events, and alerting, among others. Further policies may address security issues, such as authentication, authorization, and auditing, among others. The global policy management function 1414 may analyze and report policy-based actions.

A global resource management function 1416 may report and control resources including hardware management, firmware updates, fan management, and location awareness, among others. This may include the location of assets such as IoT devices, fog devices, and data centers, which may be used to federate devices based, at least in part, on the location of the devices, proximity the devices, bandwidth between devices, communications latency, and the like.

A node service management function 1418 may provide device specific functions, such as power thermal awareness, server state awareness, first failure data capture, run-time error detection, diagnostics, and the like. Further, the node service management function 1418 may provide failure prediction, dark processor and memory activation, capability inventory and configuration, and the like. The node service management function 1418 may collect performance statistics, for example, on a system or virtual machine utilization basis. The node service management function 1418 may also handle system security issues for the individual devices, such as boot time and run time integrity of code.

Facilities 1420 may report metrics to and receive commands from the workload control 1412. The data from the facilities 1420 may include sensor data on process data units, universal power supplies, cooling systems, generators, and servers. Further, the facilities 1420 may include active data collection such as information collection from active collection protocols, including BACnet, mod bus, and SNMP among others. The measurements may be continuous, with real time data having integrated IT data points, to measure daily cycle variations, event-based analysis, and the like. Analytics may be included for efficiency analysis, for example, accurate monitoring an active redirection of data center facilities, and capabilities for most efficient operations. For IoT networks, the facilities 1420 may include metrics on items such as reserve power levels, memory utilization, communications bandwidth, and the like. As noted herein, the facility parameters may be displayed on a control console, and IoT display, or through a proxy server, for example, having no control functions. The display may include user interaction options if permitted by the system configuration and policy selected.

If the workload control function 1412 determines that there is a change in the status or structure of the infrastructure, it may return control to the service management function 1406 to repeat the configuration. Similarly, if the work control function 1412 determines that there is a change in the status of the workload or the workload requirements, control may be returned to the orchestration management function 1410 to reassign elements.

Figure 15:
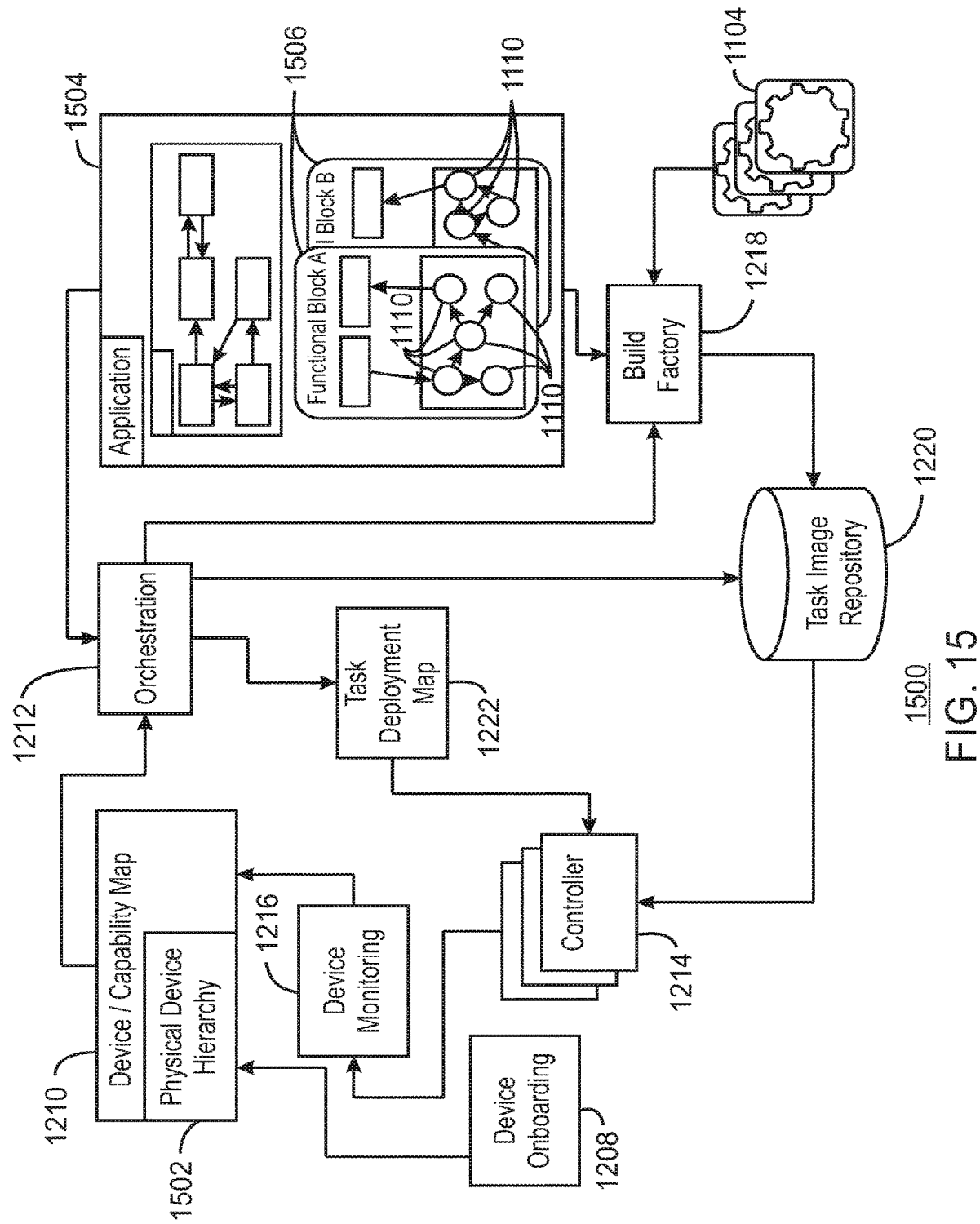
FIG. 15 is a schematic diagram of a simplified example of an orchestration process in accordance with some embodiments.

FIG. 15 is a schematic diagram of a simplified example of an orchestration process 1500 in accordance with some embodiments. Like numbered items are as described with respect to FIGS. 11 and 12. This example, which uses nodes in an IoT network, is only one example of how the techniques described herein may be used. During deployment, the modules may be deployed in clusters, each managing a coherent set of physical devices. In other examples, nodes may include any number of devices, such as IoT devices, smart phones, computers, tablets, fog devices, virtual machines, and data centers, among others.

When new IoT devices are introduced to the IoT system, a device onboarding tool 1208 may identify the IoT devices and their capabilities, and provides that information to the device/capability map 1210. The onboarding tool 1208 may be an inherent part of each IoT device, for example, included in a CSI. A physical device hierarchy 1502 may be generated.

At runtime, an orchestration device 1212 may be used to determine locations for workloads and to deploy the micro-services the makeup an application 1504. Each device in the constellation of on boarded devices may include a controller 1214, which reports the current device state and metrics, such as CPU utilization, networking, and the like, to the monitoring/telemetry tool 1216 for inclusion in the device/capability map 1210.

The device capability including a device map and metrics are provided from the device/capability map 1210 to the orchestration device 1212. The orchestration device 1212 also obtains the application structure and quality of service requirements for the application 1504. When deployment of the application 1504 is requested, the orchestration device 1212 may use the application definition, including resource and SLA requirements, and the device/capability map 1210 to produce a task deployment map 1222. The task deployment map 1222 includes a mapping of containerized tasks 1110 tasks to individual nodes, as well as specifying the interconnections between those tasks.

The controller 1214 on each node may request an appropriate micro-service from the micro-service repository 1220. If the micro-service is not available, for example, it has not been built yet, a task image, or containerized micro-service may be built in real time by the build factory 1218, using services containers 1104.

Once the task image is deployed and started, the controller 1214 connects the inputs and outputs of the containerized micro-services 1110 to other containerized micro-services 1110 according to the task deployment map 1222, and the application 1504 starts.

The device monitoring system 1216 may continue to monitor telemetry data from the controllers 1214, and feed that data to the device/capability map 1210. The orchestration device 1212 may determine that SLA metrics are not being met by the current devices as measured by the SLO. If so, the orchestration device 1212 may regenerate the task deployment map 1222 to change tasks to different devices to improve performance and see if the SLA metrics can be met. If the SLA metrics cannot be met, the orchestration device 1212 may alert a user to the deficiency. The orchestration device 1212 may provide choices to the user for alternate configurations or functionality levels to maintain some level of functionality. The orchestration device 1212 may continue to try to restore full functionality to meet SLA metrics as the system is changed. As noted herein, the alert may be displayed on a control console, and IoT display, or through a proxy server, for example, having no control functions. The display may include user interaction options if permitted by the system configuration and policy selected.

A number of considerations for moving to a services defined data center may be taken into account. For example, multi-tenancy concepts may be built into all layers of the service delivery, starting with the application, including the user interface, and through the business layer decomposition and infrastructure services. Multi-tenancy and noisy-neighbor considerations may also included in the CSI, to understand the impact of a new service on existing services on the same resource. This may assist in providing service assurance, security, transaction integrity, and a reduced potential for data leakage. Subscriptions may be implemented to track details such as specific add-ons and features the customers purchase, and meter for transactions and functionalities that are used.

Flexibility in monetization strategies may be considered and designed into the system to account for updates and modifications. Automated provisioning, billing, and on boarding systems may be used to enhance the scaling of the techniques. The offering of services may include a significant amount of auxiliary infrastructure to maintain high levels of uptime, for example, as determined by SLAs with customers. The techniques may provide a foundation for software as a service (SaaS) and business process as a service (BPaaS) offerings along with the supporting business systems to function as a service provider.

A cloud services delivery manager (CSDM) may be built using a layered approach. This may avoid the need to develop an entire architecture at once. Further, the CSDM may allow data on a per-deployed layer using a reference stack, such as OSI, TCP/IP, and the like. The CSDM may enable an enhanced testing process, for example, by tapping into each of the layers with parameter stubs, and reporting on them. This may use an "expected versus actual" difference engine, which may use graphics to enhance the presentation. The graphics may be displayed on a management server, or on an IoT device in an IoT network.

The CSDM may work in concert with integrated development environments, but may be used during system test activities. This may allow the CSDM to highlight gaps and two characterize performance, such as to capture issues and create inference engines when introducing faults into the system. Further it may allow the CSDM to test alerts, alarms, SLA violations, assist with threshold setting, use load generators to "dope" environments, and capture performance landscapes, among others.

During deployment, the CSDM may then be used to manage rollouts and rollbacks of applications. For example, the CSDM may be used to control scheduling to prevent downstream deployments without going through all upstream steps, such as using authenticated work orders. Further, the CSDM may ensure layered provisioning with burn-in periods into the test, production, and operational environments.

During operations, the CSDM may provide self-service interfaces and reporting tools, that may be accessed from a management server, or from control panels on IoT devices. The CSDM may also be an integral part of the network operation control (NOC). For example, the CSDM learns from anomalies, captures workarounds, and creates scripted versions for automation updates, including workflow updates in the change management system, among others. The CSDM has visibility across scaled up and scaled out resource groupings, and may suggest affinity and non-affinity workloads based upon the thresholds defined and captured during the development phase and refined during the deployment phase.

Figure 16:
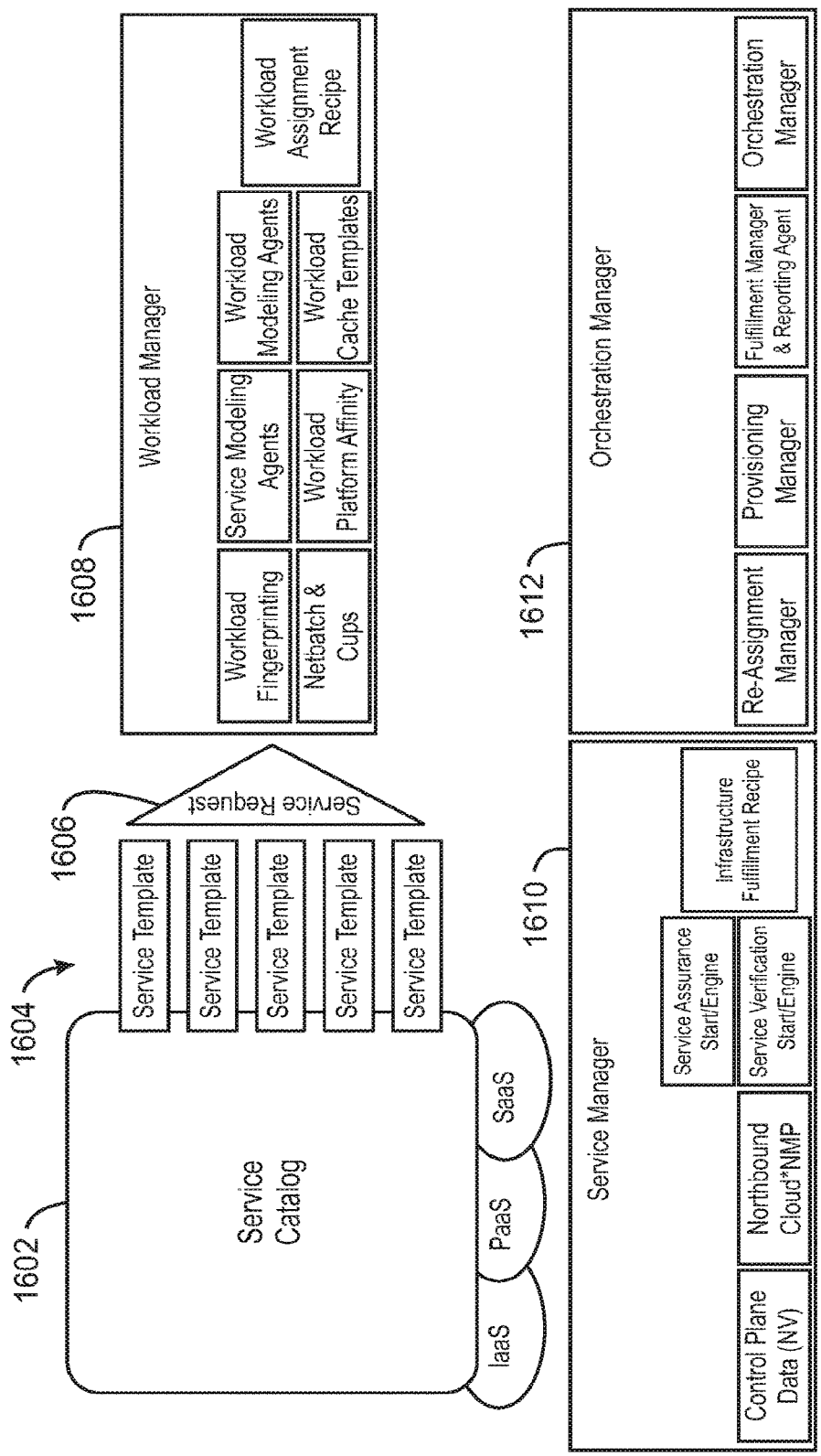
FIG. 16 is a schematic diagram of another example of the use of a service catalog to provide micro-services in accordance with some embodiments.

FIG. 16 is a schematic diagram of another example 1600 of the use of a service catalog 1602 to provide micro-services in accordance with some embodiments. The service catalog 1602 may include a comprehensive list of available cloud services and service templates 1604, which, as used herein, are descriptions of cloud services, their functions, and the technologies used to provide the services. The service catalog 1602 may also include the service level options for SLAs and the associated cost of the services at each of the SLA levels. The service catalog may also include a self-service portal for self-provision of cloud services based on consumer, business, or organization entitlement and requirements. The service catalog 1602 may provide the basis for infrastructure as a service (IaaS), platform as a service (PaaS), and software as a service (SaaS).

The service templates 1604 selected to fulfill the service request 1606 may be passed to a workload manager 1608. The workload manager 1608 may take the service template request, decompose and understand the workload requirements, and the associated QoS and SLA requirements. As used herein the workload is an abstraction of the actual work that an instance or a set of instances are going to perform, including, for example, computing, networking, and storage. If available, the workload manager 1608 will run a workload modeling agent to identify the most effective platforms for hosting the workload. The workload manager 1608 may define how work in each workload gets mapped to resources offered by a given cloud. A service modeling agent, if available, may be run to identify and verify the service against global SLA and ROI metrics of measurement. The workload manager 1608 may then collect SLA and ROI metrics as they occur.

A service manager 1610 may then be used to capture and request the status and state information from a cloud infrastructure, for example, using out of band (OOB) management information and polling of services. The service manager 1610 may track horizontal services, including, for example, facilities, nodes, group, policies, workloads, control planes, management functions, agents, and the like. The service manager may also be a service running on the DSF to coordinate activities for resources managed by the CSI. The parameters collected may be aggregated into an infrastructure service assurance. The service management system may also track vertical services, including, for example, security, entitlement and regulatory, performance, throughput, timing, resilience, capability, and the like. The parameters collected may be aggregated into an infrastructure services verification for tracking.

An orchestration manager 1612 may orchestrate the service delivery by correlating the requirements for the workload assignment and infrastructure fulfillment recipes (such as the task deployment map 1222 described with respect to FIG. 12) to deliver the most effective service at the best infrastructure capability to meet the QoS and ROI requirements. Accordingly, the orchestration manager 1612 may assign infrastructure elements, including, for example, provisioning images, establishing connections, registering entitlements, registering use, reporting to regulatory authorities, and the like. The orchestration manager 1612 may aggregate infrastructure SLA to provide QoS metrics and provide service assurance feedback to QoS monitoring services. Further, as described herein, the orchestration manager 1612 may reassign infrastructure elements upon notification of a failure or SLA outage, notification of a control plane is efficiency, or a service change. Infrastructure elements may also be reassigned upon service request changes or the determination of a possible failure event. Workload balance request from higher level services may also force the reassignment of infrastructure elements to maintain SLAs for higher priority or cost services.

Figure 17:
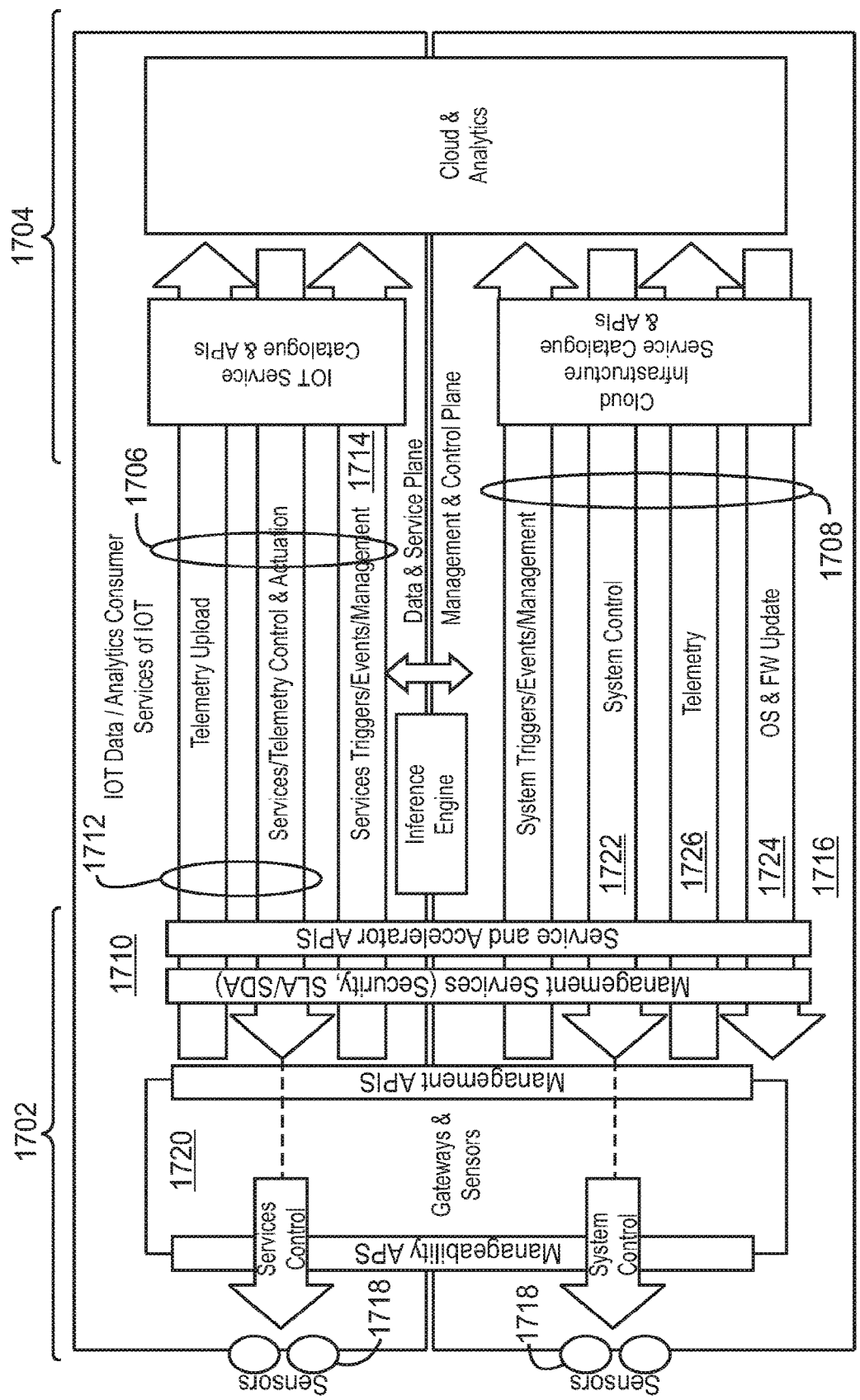
FIG. 17 is a schematic diagram of an example of a provision of IoT data/analytics consumer services in accordance with some embodiments.

FIG. 17 is a schematic diagram of an example 1700 of a provision of IoT data/analytics consumer services in accordance with some embodiments. In the example 1700, IoT networks 1702 are in communication with cloud and analytics services 1704 through operations and usage channels 1706 and system management channels 1708.

The operations and usage channels 1706 may operate in an operational data and service plane 1710. These channels provide access to device services and device data, for example, through data and telemetry channels 1712. Control channels 1714 may enable control of services, actuation of resources, triggering of events, and event management.

The system management channels 1708 operate in a management and control plane 1716 and may allow for management of the system, including, for example, the operating system, firmware, BIOS, management channels, interfaces, and child devices, such as sensors 1718 in communication through a gateway 1720. A system control channel 1722 may allow control of the system such as initiating operations and activating service primitives, such as accelerators, hardware enabled functions, or operating system enabled functions, among others. An update channel 1724 may allow for the update of the operating system or firmware of the gateway 1720, or its child devices, such as the sensors 1718. A telemetry channel 1726 may allow for the communication of SLA information and health information from the IoT network 1702, including, for example, device health, diagnostics, reputation information, rate of decay, and operational goodness indicators, among others.

Figure 18:
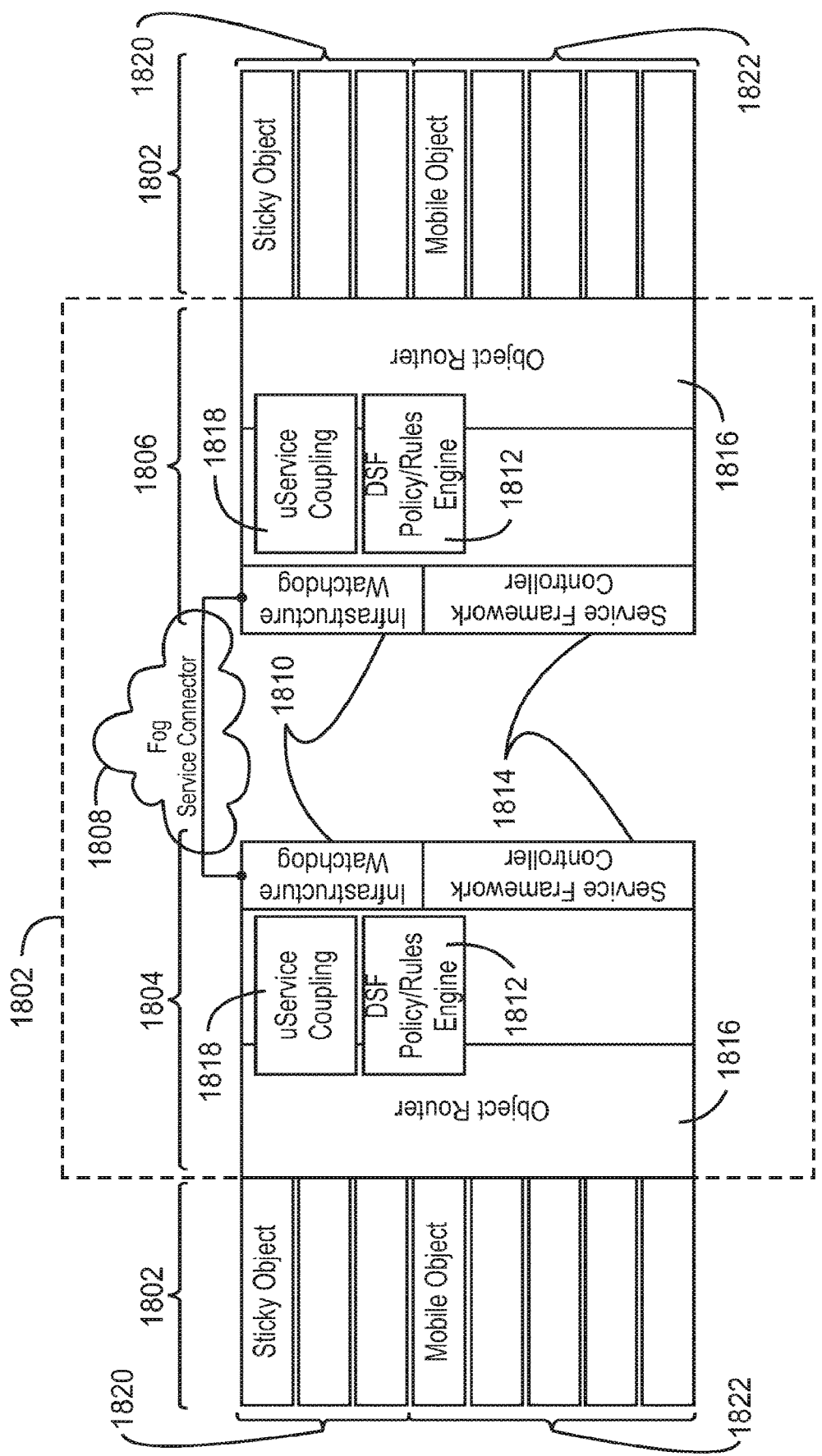
FIG. 18 is a schematic diagram of a distributed service framework in which micro-service objects may be placed in various locations for operations in accordance with some embodiments.

FIG. 18 is a schematic diagram of a distributed service framework 1800 in which micro-service objects may be placed in various locations for operations in accordance with some embodiments. The distributed service framework 1800 has a controller 1802 that is shared between domains, including, for example, an edge or fog side 1804 and a cloud side 1806. The domains may be coupled by a fog service connector 1808, which may include gateways, routers, and wireless or wired network connections.

A watchdog 1810 inspects the infrastructure to ensure that the physical resources, and interfaces, are available. The watchdog may alert upon a change in state of the interfaces or networks. It may work with a policy and rules engine 1812 to enable new operating conditions based on the guidance provided by the policy and rules manager 1812.

A service framework controller 1814 manages the entire framework for the services to ensure that physical and logical connections are active. It may ensure proper operation of the service mesh network and may manage the interprocess communications (IPC).

An object router 1816 may provide the routing function for the objects for service delivery. The object router 1816 may also allow for discovery of objects and mapping of objects on the service mesh network. It may also control the placement or access to objects in the management domain. There are several object types, including resource object, leader object, service object, container object, workflow object, and connection object, among others.

The micro-service coupling 1818 may include the service delivery recipes, for example, a task deployment map. It may ensure that the pre-requirements and post-requirements are enabled for service delivery. The micro-service coupling 1818 may also perform service stitching, for example, coupling the inputs and outputs of particular services together, among other functions.

In addition to working with the watchdog 1810, the policy and rules manager 1812 may include the policies and rules for operations. These may include the rules and methods for interface switching based on watchdog inputs. The policy and rules manager may manage activities to be initiated by the disruption of service in the fog service connector 1808.

The micro-service objects 1802 may be placed or moved depending on operational capabilities, SLAs, and the like. Two classes of micro-service objects 1802 may be identified, sticky objects 1820 and mobile objects 1822.

A sticky object 1820 is a micro-service object 1802 that is generally not moved from the service side, e.g., the edge or fog side 1804 or the cloud side 1806, that it has been placed on. This may be due to the purpose of the sticky object 1820, for example, a micro-service object 1802 intended to access a database may be kept in the proximity of that database. Further, micro-service object 1802 that is used by a sensor for specific sensor operations, such as temperature detection on a temperature sensor, will generally be a sticky object 1820. Sticky objects can be compressed and decompressed according to use. They are used when the single-purpose function is specifically assigned to a resource. Furthermore, they may be used when the resource cannot run all the micro-services at once due to execution space limitations. Prior to decompression and load, the system determines the current execution space and evaluates the ability to load the new single-purpose function as well as the impact on the resource operations and the SLO's associated with the other micro-services.

A mobile object 1822 is a micro-service object 1802 which can be moved on the service framework 1800 between the edge or fog side 1804 and the cloud side 1806, depending on the use case, implementation specifics, and optimization requirements. For example, a micro-service object 1802 that performs a calculation may be run on either side, depending on where the results of the calculation and input data for the calculation are located.

Figure 19:
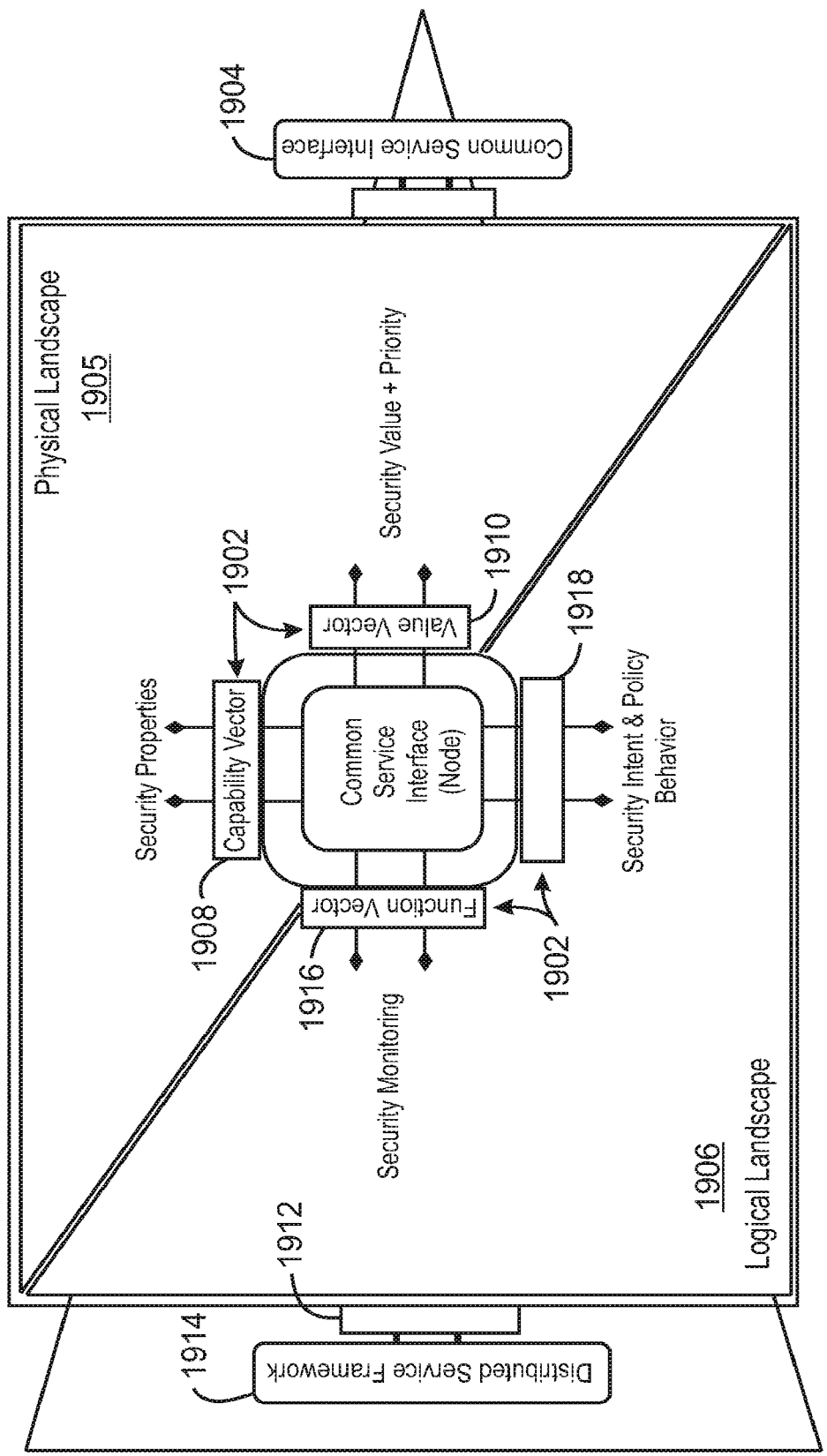
FIG. 19 is a schematic diagram of a common service interface (CSI) node for discovery and resource identification in accordance with some embodiments.

FIG. 19 is a schematic diagram of a common service interface (CSI) node 1900 for discovery and resource identification in accordance with some embodiments. The CSI node 1900 may function as the lowest common denominator for a workload in terms of service composition for delivery. It may include any service aware device, from consumer devices, such as smart phones and tablets, to edge components for delivery. It may also include IoT resources, such as IoT devices and fog devices, data center elements, and RSA components, among other things.

The CSI node 1900 may include compute, storage, and network elements, as well as non-composable components, such as systems on a chip (SoCs), FPGAs, and infrastructure devices, among others. The CSI node 1900 may feature static, run-time, and real-time asset vectors 1902 that describe capability, value, allocation, and function via a common service interface 1904, utilizing standard service level and service delivery nomenclature via an application programming interface (API), Pub/Sub, DDS, and RSS feeds, among others.

The CSI node 1900 may define a new interface and manageability engine, processor, and software system that provides autonomous manageability and resource self-awareness. The CSI node 1900 may be empowered to make decisions, enact the decisions, and be aware of the environment and other intelligent resources around it. This may reduce latency and a reliance on a data center to make and validate decisions on situations that are remote from the data center or localized to an IoT network. A new IP block comprising a services protocol may be used to provide a system integration solution for active service manageability and a smart manageability interface. Further, a new manageability interface may be used for sideband management.

Resources that are enabled with CSI nodes 1900 may form ad hoc organized groups using the interface to compose resources into tightly or loosely coupled service delivery systems, such as fog devices described herein. These systems may use various homogenous or heterogeneous network and infrastructure or interface elements to adhere to or be most capable to deliver the consumer or session service common service interface.

The CSI nodes 1900 may include onboarding and peering as well as association with a management domain. A CSI node 1900 may exist both in a physical landscape 1905 and the logical landscape 1906. The physical landscape 1905 describes the advertised capability for the infrastructure component in terms of services. Two of the vectors 1902 exist in the physical landscape 1905. The data from the vectors 1902 in the physical landscape 1905 may be used to build a view of the physical landscape 1905 for the service realm. A capability vector 1908 describes the asset capability, identity, location, capacity, and features. It provides analytics for actionable intelligence. A value vector 1910 describes the asset value, in terms of cost for billing, metering, and measurement. As noted herein, the use of the physical landscape 1905 and logical landscape 1906 may be displayed on a control console, and IoT display, or through a proxy server, for example, having no control functions. The display may include user interaction options if permitted by the system configuration and policy selected.

The other two vectors 1902 exist in the logical landscape 1906. The logical landscape 1906 describes the actual, real-time, capabilities for the infrastructure component in terms of services. The logical landscape 1906 also has an interface 1912 coupled to a distributed service framework (DSF) 1914. The DSF 1914 may provide an IoT dialtone, for example, coupling the CSI node 1900 to micro-services providers in the cloud. As used herein, an IoT dialtone is a continuously accessible and identified service for the provision of code segments and other micro-services from providers. The IoT dialtone may provide the initial policies and engagement paradigms for joining a DSF management network.

The information provided by the vectors 1902 in the logical landscape 1906 may be used to build a view of the logical landscape 1906 for the service realm. A function vector 1916 describes the asset function, reputation, and actual capability based on age, use, and other factors. An allocation vector 1918 may describe the asset reservation, allocation, lock, and run time status.

The CSI node 1900 may communicate with other CSI nodes over the common service interface (CSI) 1904. The CSI 1904 may use a peering system for on-boarding and may self-association with a management domain that includes the DSF 1914. The architecture which includes the DSF/CSI combination is flattened and distributed, and does not require a central management system to maintain an inventory of resources and the description, service association, or perform session management of those resources. The peering notification happens as the CSI node 1900 joins the DSF 1914, for example, by appearing on the network and engaging with the IoT dialtone. A CSI node 1900 may access and manage and arbitrate between several DSFs to ensure that the services and sessions it is part of or delivering are performing against SLAs. This may be performed by measuring against the resources' session association and service level objectives and specifications.

The CSI node 1900 may include a multi-DSF arbitrator. The multi-DSF arbitrator may arbitrate, balance, and resolve or prioritize the requirements for multiple DSF connections and session interfaces with the CSI node 1900. Further, multiple CSI nodes may be associated with a single DSF, and multiple DSFs may be associated with a single CSI node. The CSI node 1900 may manage the relationship with the single or multiple DSFs associated with the CSI node 1900. This may help to ensure that the behavior of the CSI node 1900 can be managed by the CSI node 1900 by its primary owner, while the service delivery, management and supply-chain, defined by the DSF dialtone, engages with the CSI.

The CSI node 1900 may include a multi-DSF service orchestrator. The orchestrator may identify the capability of the CSI node 1900 to provide services with a measureable service level specification (SLS) and service level objectives (SLO) from the CSI node 1900 to the overall service orchestrator, which is usually running on the service or session requester. The multi-DSF service orchestrator may also measure the SLS/SLO to help ensure that the CSI node 1900 is providing the portion of the service as requested, and provide events/logging and alerts if the SLS/SLO is not being met. The multi-DSF service orchestrator may provide remediation at the level of the CSI node 1900, if that functionality is enabled by the primary owner of the CSI node 1900 and is feasible to achieve. The multi-DSF service orchestrator may also work with the service originator orchestrator to provide metrics which may assist in SLA reset or remediation at a service blockchain level.

The CSI 1904 may include a number of functions to facilitate interactions between CSI nodes. For example, the CSI 1904 may include a confidence index and a machine learning technique to provide an insight into the CSI node's self-measured and community measured calculations of reliability, quality of service delivery, and ability to deliver features and functions against past, present, and real time or current session requirements. This function may determine, ensure, and provide feedback on parameters related to in-session impairment, capability, ability, trust, reliability. This function may also provide feedback on changes that may negatively affect the SLO/SLS metrics, or which may have a measureable impact on the end-to-end service session SLA. Some of these metrics may be temporary impairments due to external factors such as temperature, pressure, resonance, and the like, acting on the CSI node 1900.

The CSI 1904 may also include a predictable service interface forecasting function. This function may predict the next best network or interface availability based on location or strength of signal.

The CSI 1904 may also include a service attenuation function to determine the rate of service delivery and an associated service attenuation or signal improvement. It may be used to maintain service characteristics for assurance or insurance for an SLA. It may be used to determine if the infrastructure is good or bad and the trend of the service attenuation rate is degrading or improving in a dynamic environment. The function may help to ensure that the service may complete, or if other actions may be needed for the service, such as a pause, restart, abort, notify, continue, buffer, distribute, and coalesce using other resources, among others.

Figure 20:
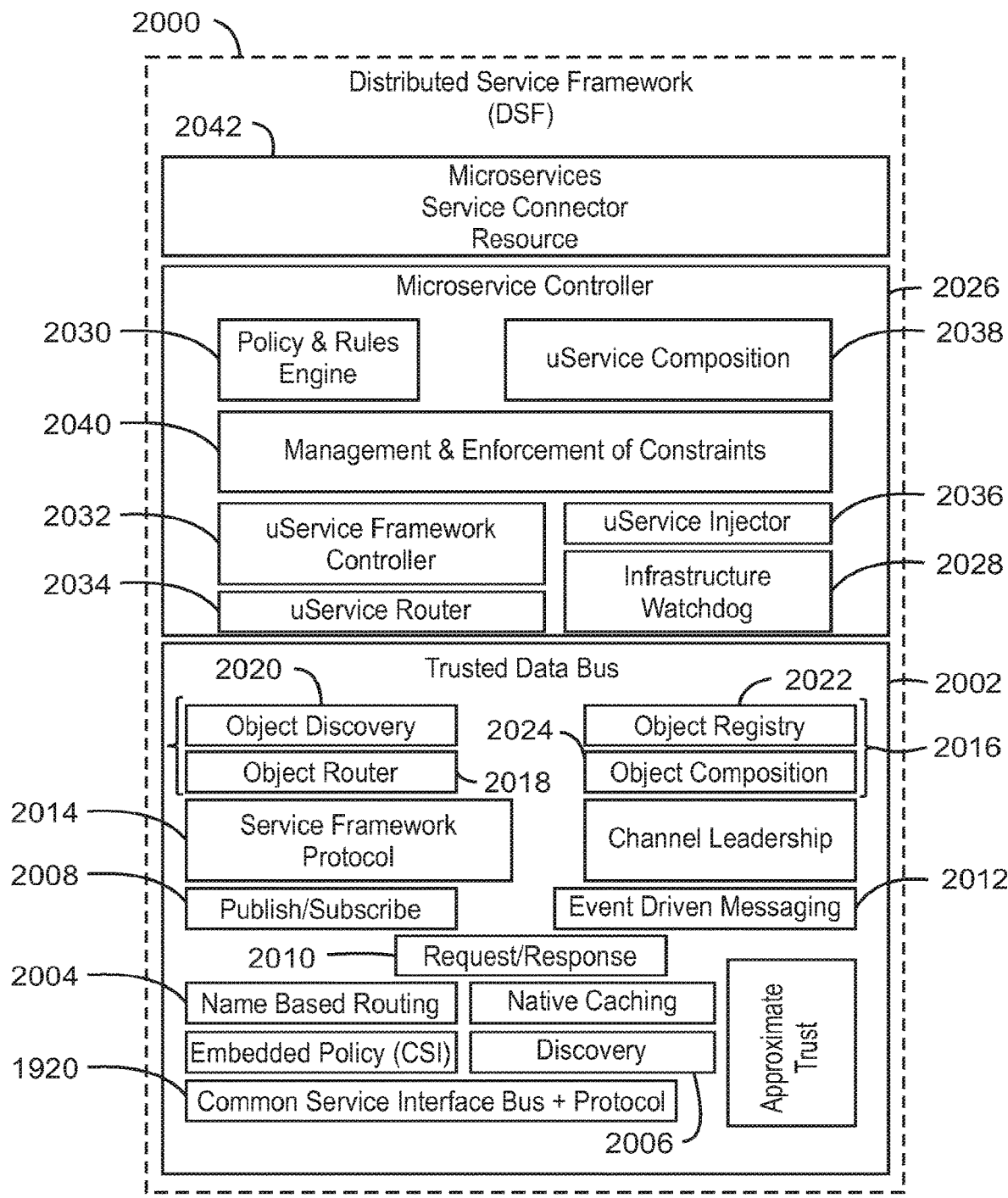
FIG. 20 is a block diagram of a distributed service framework (DSF) in accordance with some embodiments.

FIG. 20 is a block diagram of a distributed service framework (DSF) 2000 in accordance with some embodiments. Like numbered items are as described with respect to FIG. 19. As described herein, the DSF 2000 includes an interface, protocol, and network service that may provide the ability for intelligent, self-aware, and autonomous devices to register, discover, and manage their interactions with a service provider without needing a central management system in the cloud.

The DSF 2000 may flatten the management system for IoT devices and networks. This may simplify the management services, including peering, discovery, registration, identification, and the like, for the millions of devices under control. Further, the DSF 2000 may allow intelligent resources to collaborate, cooperate and create ad-hoc mesh collectives to achieve the requirements for a service as close to the origination of the service request as possible.

The DSF 2000 may enable the ability to identify events that are actively occurring. It may allow all resources already involved, or about to be involved, with an event to make decisions and coordinate activities. As an example, implementing the DSF 2000 in the fog controlled traffic light described with respect to FIG. 2 may allow the traffic lights and an approaching emergency vehicle to coordinate the functions needed to block traffic to allow the emergency vehicle to pass through all intersections unimpeded. In another example, traffic traveling on highway may have an ambulance approaching from behind. An interconnected DSF 2000 between the vehicles may provide micro-services for the coordination for the traffic to move aside and allow the ambulance to pass.

The DSF 2000 provides two main interfaces, including a common interface infrastructure that may communicate with resources coming on board, already accessible, or changing state via the interface. Another interface may provide the ability to manage the micro-services which are interacting with or running on the available resources.

The DSF 2000 may work in conjunction with a trusted data bus (TDS) 2002 to define the management services for the resources. The services begin with a Common Service Interface (CSI) 1904, as described with respect to the CSI node 1900 of FIG. 19. As described herein, the CSI 1904 bus and protocol provides constant and dynamic management and access for resources on four vectors, including static, run-time and real-time vectors. The CSI 1904 describes the resource's capability, financial value, user and policy allocation and functionality, utilizing standard service level and service delivery nomenclature via API's or DDS subscription models. Additionally, the CSI 1904 may include embedded policies, which tightly couple the management, control and invocation of resources to the resource interface itself, thus reducing the latency of response.

The trusted data bus 2002 includes a name based routing function 2004. The DSF 2000 uses the digital object architecture (DOA) convention, in which it provides a view onto the physical resources as objects with descriptors. Using the name based routing function 2004, the resources and things within IoT networks can be addressed, accessed and manipulated directly even without specific knowledge of the location or a full description of the thing.

Discovery 2006 is one of the core architecture elements for the DSF 2000. The discovery 2006 presents a lightweight service delivery structure that provides services such as locate, find, address, trace, track, identify and register, to identify a resources arrival on the framework. This way the manager or owner of the resource domain may use specific management rules and service aware policies to ensure orderly resource discovery, registration, and certification.

The DSF 2000 may provide several access and interface solutions. For example, publish/subscribe 2008 and request/response 2010 solutions provide simple and effective ways to gain access to the resource data provided by the CSI 1904. Furthermore, events occurring on the distributed service interface 1912 may be relayed via an event driven messaging 2012 interface.

A service framework protocol 2014 manages the complete framework for services. The reconciliation of SLOs, from the top level, against combinations of physical resource elements requires that, at some level in the management stack, there is a consistent representation of physical and logical resource elements. This is an issue for emerging heterogeneous environments and in highly scaled scenarios, where static allocation may be operationally unfeasible. One approach to mapping service-resource dependencies and relationships regardless of abstraction level is as layered and interconnected graphs. Maintaining such a representation of the landscape may be valuable when modelling configuration options, or inspecting the runtime system for optimal performance, efficiency, dependability or any other metric. Looking at correlations from telemetry may indicate causalities. Overall, the service framework protocol 2014 may be responsible for ensuring that the resources can be accessed, controlled, and managed as physical elements as well as logical connections.

A physical resource object management model 2016 may be included to manage physical resources as objects. However, it may be useful to retain the connection to the physical resources for control and management. For other purposes, such as modeling and optimization, the architecture provides an allocation or logical layer which provides a filtered perspective. There are two layers available within the physical resource object management model 2016. A physical layer tracks resource components based on the data provided through the CSI 1904. A logical or allocation layer tracks a composition of service objects based on the physical resources within the IoT resource management domain. Further, it captures the current running resources which are defined and managed by the micro-services routing and composition mechanisms.

The physical resource object management model 2016 may include four core components for managing the physical resources as objects. These components may include an object router 2018, object discovery 2020, and object registry 2022, and an object composition 2024.

The object router 2018 provides the routing function for the objects for service delivery. This information may be available through the logical or allocation layer descriptions. Furthermore, it manages the initial identification and object discovery 2020 as well as the location, mapping and object registry 2022 on the DSF 2000.

The object composition 2024 includes the description of the composite objects and their relationships. It may ensure that the pre-requirements and post-requirements are enabled for service delivery and may perform service stitching.

The DSF 2000 architecture may also include a micro-service controller 2026. Since the DSF 2000 is agnostic towards all resources, it provides equal ability to connect IoT devices and cloud resources and provide consistent resource management access across the management domain. Because of this ubiquitous capability, the micro-services can be placed in the most effective location based on the service delivery constraints or requirements, and then dynamically re-provisioned based on the changes in implementation or use cases. The same micro-services may be deployed on the cloud for analytics in one implementation and on an edge based clustered analytics solution in another. The micro-service controller 2026 contains software elements to ensure the proper placement and interconnection of micro-services to ensure continuous service delivery.

An infrastructure watchdog 2028 inspects the infrastructure to ensure that physical resources and interfaces are available. It provides alerts upon changes in state and works in conjunction with a policy and rules engine to provide alternative service delivery mechanisms within the constraints, ensure a proper operating condition, and infrastructure based on the guidance.

The DSF 2000 may include a policy engine 2030 to create, manage, distribute, and revoke the policies which describe the management structure of resources. The policy engine 2030 includes the policies and rules for operation, the rules and methods for interface switching based on watchdog input, and manages activities triggered by disruption of service in the service connector.

The micro-service framework controller (MFC) 2032 is the mechanism that manages and controls the micro-services running across the DSF 2000. The MFC 2032 is responsible for the operation of the services running across the DSF 2000, the connections between the resource objects and their services, and the continuity of the user analytics services. The MFC 2032 may utilize a micro-service router 2034, a micro-service injector 2036, and a micro-service composition 2038 element to properly route, grab and transmit and compose the service primitives into an end-to-end solution within the constraints of the environment and the physical resources and conditions. The MFC 2032 also includes a management and enforcement function 2040 to enforce the policies and rules.

The DSF 2000 may include a service connector 2042, which is a logical structure that acts as a path for inter-process communication (IPC) between the edge and the cloud. It provides the service delivery assurance and maintains and manages the metrics and measurements for proper service assurance.

As described herein, the DSF 2000 functions with an IoT dialtone to define how resources initially peer and onboard a management domain. The IoT dialtone is used to begin the conversation to establish a supply chain for micro-services.

The DSF 2000 may include a micro-service companion agent or service that describes how the micro-service objects, which have been enabled, placed, and activated to run a session service, may be traced, tracked, and managed. This may help to ensure that a contractual SLA is delivered, maintained, and orchestrated. Further, the micro-service companion agent or service may help to ensure that the SLA is measured and billed.

A multi-DSF policy or program architecture may define the architecture for how a DSF functions including how the policies and rules are structures. The program architecture may include an interface specification, a structure specification, an object specification, and an onboarding/request management function, among others.

Figure 21:
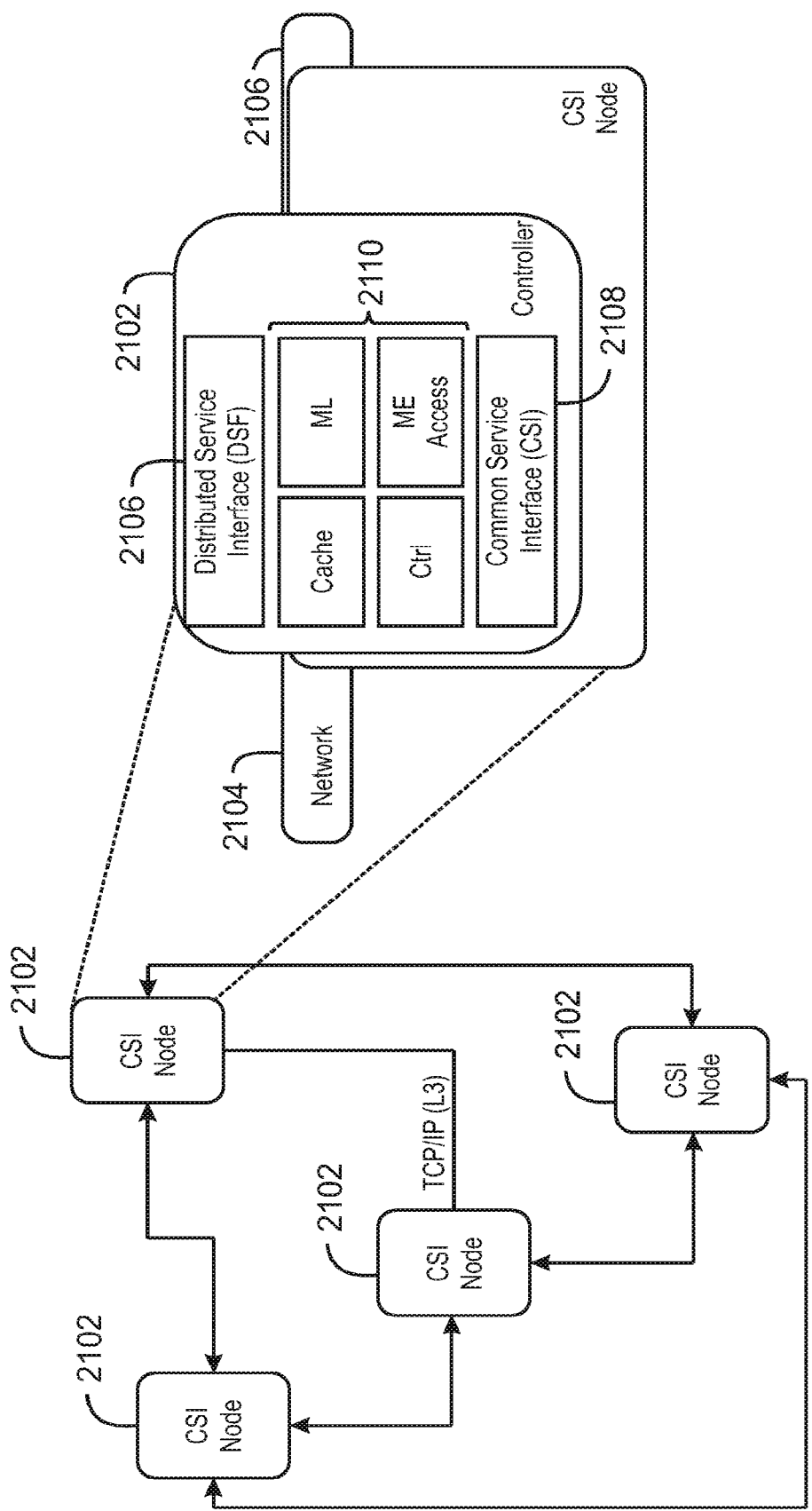
FIG. 21 is a schematic diagram of an example of a IoT network that uses nodes enabled for a distributed service framework in accordance with some embodiments.

FIG. 21 is a schematic diagram of an example of a IoT network 2100 that uses nodes 2102 enabled for a distributed service framework in accordance with some embodiments. The nodes 2102 may be as described with respect to the CSI node 1900 of FIG. 19. Each of the nodes 2102 may be coupled to other nodes 2102, for example, over a TCP/IP wired network, a wireless network, a mesh network, or any combinations thereof. Each node may also include a physical network interface 2104. In addition to the physical network interface 2104, each node 2102 may include compute and storage resources.

A distributed service interface 2106 included in the node 2102 is a logical interface for handling communications with a distributed service framework (DSF), for example, to interface with the IoT dialtone, as described herein. A common service interface (CSI) 2108 is a logical interface that may be used for communicating with other IoT devices over the network interface 2104.

The nodes 2102 may establish a network topology and interconnect with other nodes 2102. Peer relations may be established through the common service interface 2108. Each node 2102 may advertise its state, identification, location, and the like. Each node may discover common service managed assets and advertise assets managed by the node 2102. This may establish a knowledge framework for the nodes 2102 in the IoT network 2100.

As described herein, a number of control blocks 2110 may be included in each node 2102 to implement the CSI, the DSF, and other functions. These control blocks 2110 are described in greater detail in FIG. 22.

Figure 22:
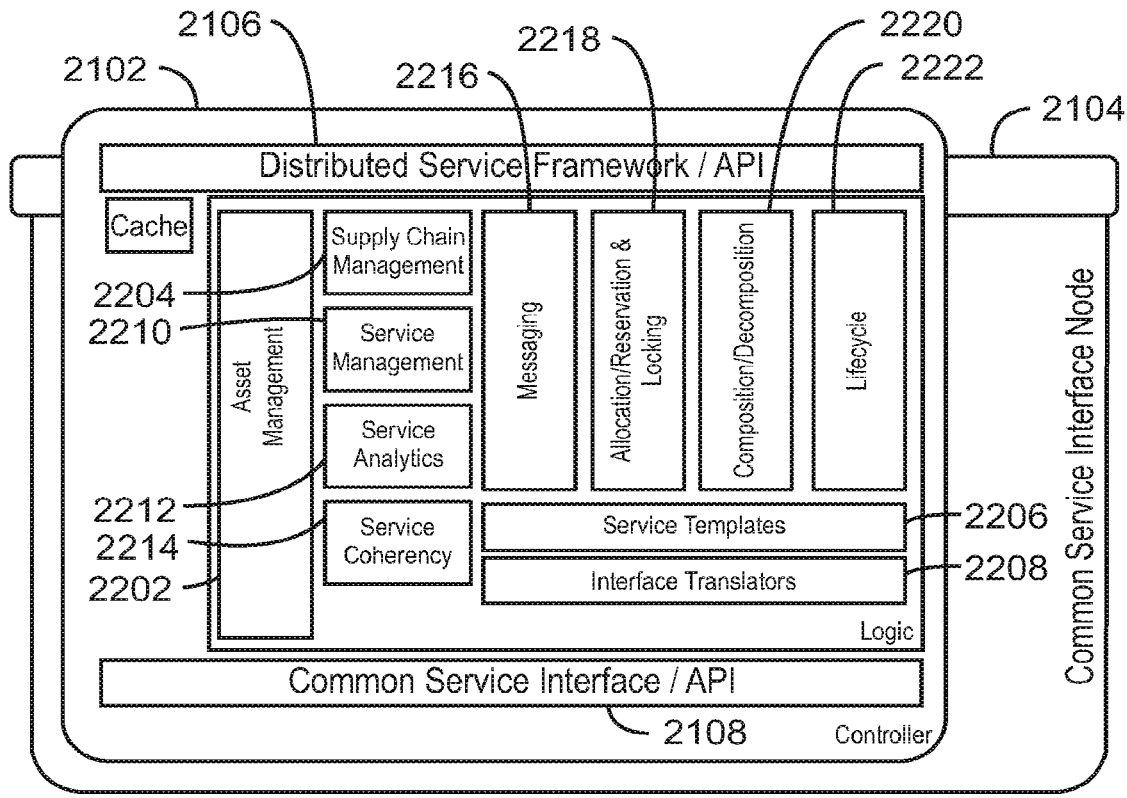
FIG. 22 is a block diagram of a common service interface architecture for a node in accordance with some embodiments.

FIG. 22 is a block diagram of a common service interface architecture for a node 2102 in accordance with some embodiments. Like numbers are as described with respect to FIG. 21. The node 2102 may include an asset management function 2202 to manage assets that are attached to the node 2102, and assets that may be in communication with the node 2102 from other nodes. A supply chain management function 2204 may handle service requests, for example, obtaining service templates 2206 from a micro-service provider coupled through the distributed service interface 2106. Similarly, interface translators 2208 may be obtained from the distributed service framework over the distributed service interface 2106. A service management function 2210 may be included to obtain micro-services, and implement the micro-services in the node 2202. Service analytics 2212 may be included to help ensure that SLAs are being met. A service coherency function 2214 may coordinate with other nodes to implement services for applications. A messaging function 2216 may be used to send messages between the node 2102, and other systems, such as a device owner or a service requester. An allocation/reservation and locking function 2218 may be used to allocate resources to particular services and to prevent lower priority services from taking allocated services. The composition/decomposition function 2220 may be used to decompose workloads into individual micro-services that may be requested, or to aggregate results from different micro-services for presentation to a device owner or service requester. A lifecycle function 2222 may be used to track the remaining lifecycle for the node 2102, including, for example, remaining reads/writes to a nonvolatile memory, remaining battery cycles, and the like.

Figure 23:
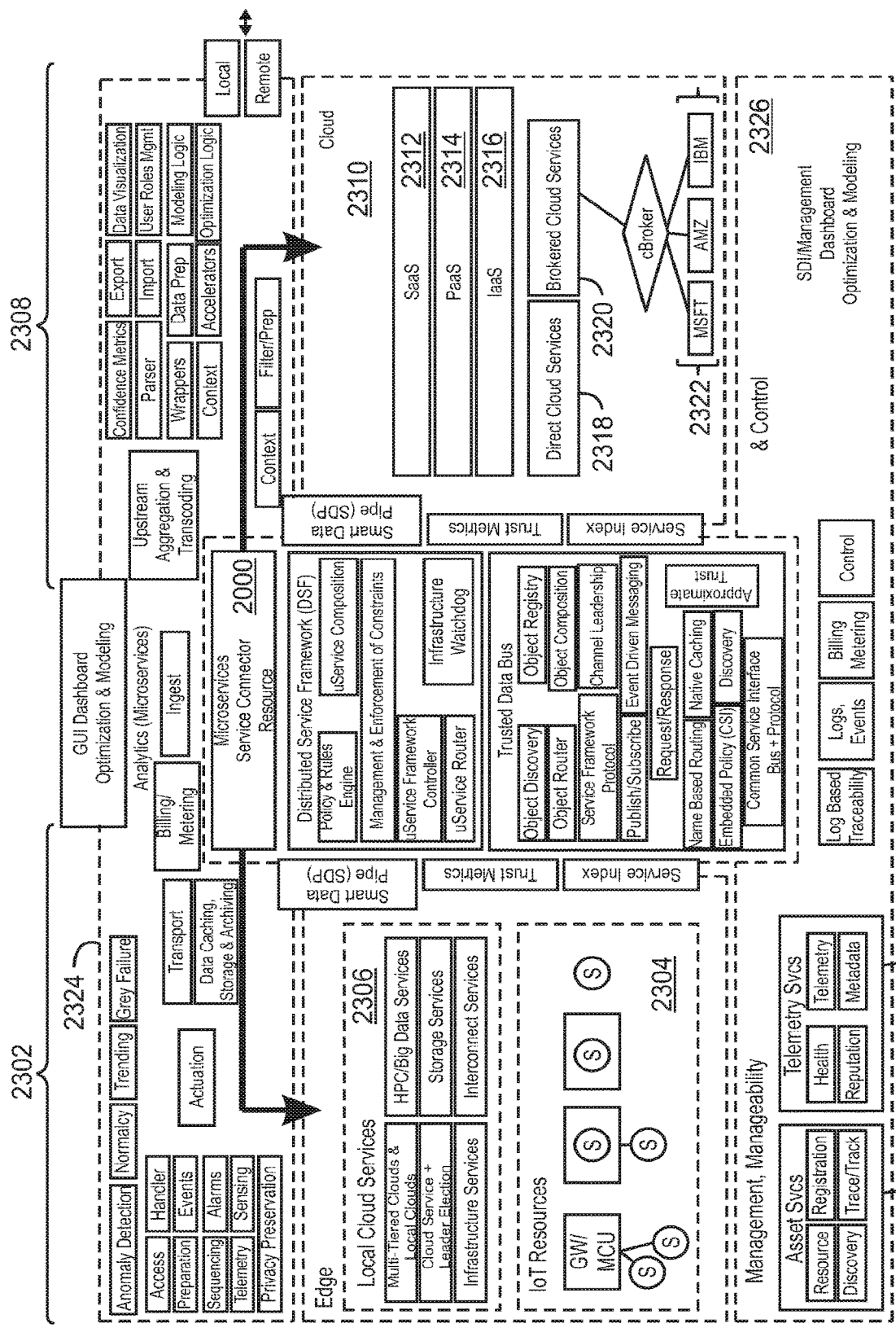
FIG. 23 is a block diagram of a software management system for IoT and micro-services orchestration in accordance with some embodiments.

FIG. 23 is a block diagram of a software management system 2300 for IoT and micro-services orchestration in accordance with some embodiments. Like numbered items are as described with respect to FIG. 20. The software management system 2300 may incorporate the elements described herein to provide a distributed service framework system using a common services interface. The software management system may include edge devices 2302, such as IoT resources 2304 and local cloud services 2306, among others. The software management system 2300 may also include cloud-based devices 2308, such as a service provider cloud 2310 that may include other possible services, such as software as a service (SaaS) 2312, platform as a service (PaaS) 2314, and infrastructure as a service (IaaS) 2316. Other services that may be offered by the cloud provider include direct cloud services 2318, which may be run in virtual machines in the cloud, and brokered cloud services 2320, which may be run in clouds owned by other providers 2322.

In addition to the distributed services framework 2000, the software management system 2300 may include tools for the implementation of management functions. These may include analytics and micro-services 2324, and management, manageability, and control functions (MMC) 2326. The MMC functions 2326 may include asset services 2328, for example, as described with respect to the common services interface 1900 of FIG. 19. The MMC 2326 may also include telemetry services 2330 for tracking the health, reputation, and metadata for devices.

It may be noted that in the software management system 2300, edge devices 2302 and cloud devices 2308 are not distinguished by type, but merely by function. Accordingly, workloads may be assigned to edge devices 2302, cloud devices 2308, or any combinations thereof, through the distributed service framework 2000. The workloads, or micro-services, may be aggregated in any number of patterns for implementation on the systems.

Figure 24:
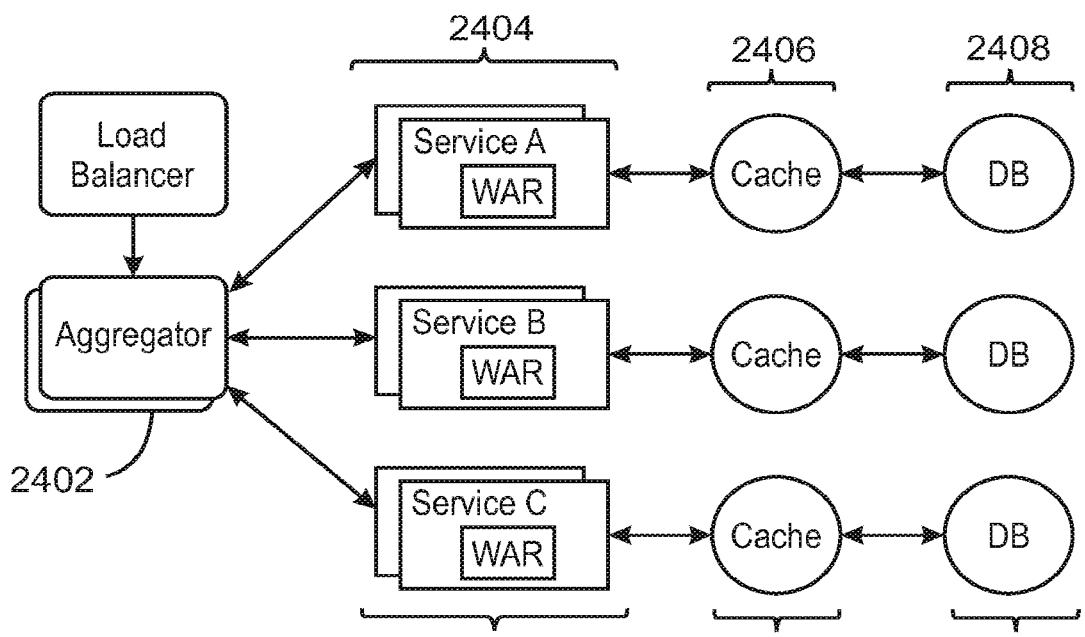
FIG. 24 is a schematic diagram of an aggregator micro-service design pattern in accordance with some embodiments.

FIG. 24 is a schematic diagram of an aggregator micro-service design pattern 2400 in accordance with some embodiments. The aggregator micro-service design pattern 2400 may use a simple webpage as the aggregator 2402 that invokes multiple services 2404 to achieve the functionality required by the application. Since each service 2404, A, B, and C may be exposed using a lightweight representational state transfer (REST) mechanism, the webpage can retrieve the data and process or display it accordingly, for example, on a management server, or control screen for an IoT device, among others. The display may include user interaction options if permitted by the system configuration and policies. If processing is required, for example, applying business logic to the data received from the individual services, a CDI bean may be used to transform the data so can be displayed by the webpage. As used herein, a CDI bean is a Java code segment that has been packaged using the context and dependencies injection standard in JAVA.

If no display of data is desired, and the micro-server is a higher level composite that may be consumed by other services, the aggregator 2402 may collect the data from each of the individual micro-services, apply business logic to it, and publish it as a REST endpoint. The data may then be consumed by other services that need it. If multiple services wish to access the services 2404, the logic may be abstracted into a composite micro-service and then aggregated into a single service. An advantage of abstracting at this level is that the individual services 2404 may be allowed to evolve independently, and the aggregation is provided by the composite micro-service.

Each of the individual services 2404 may have its own caching 2406 and database 2408. If the aggregator 2402 is a composite micro-service, it may also have its own caching and database layer as well. The aggregator 2402 can scale independently, accordingly if it is a webpage, additional Web servers may be activated.

Figure 25:
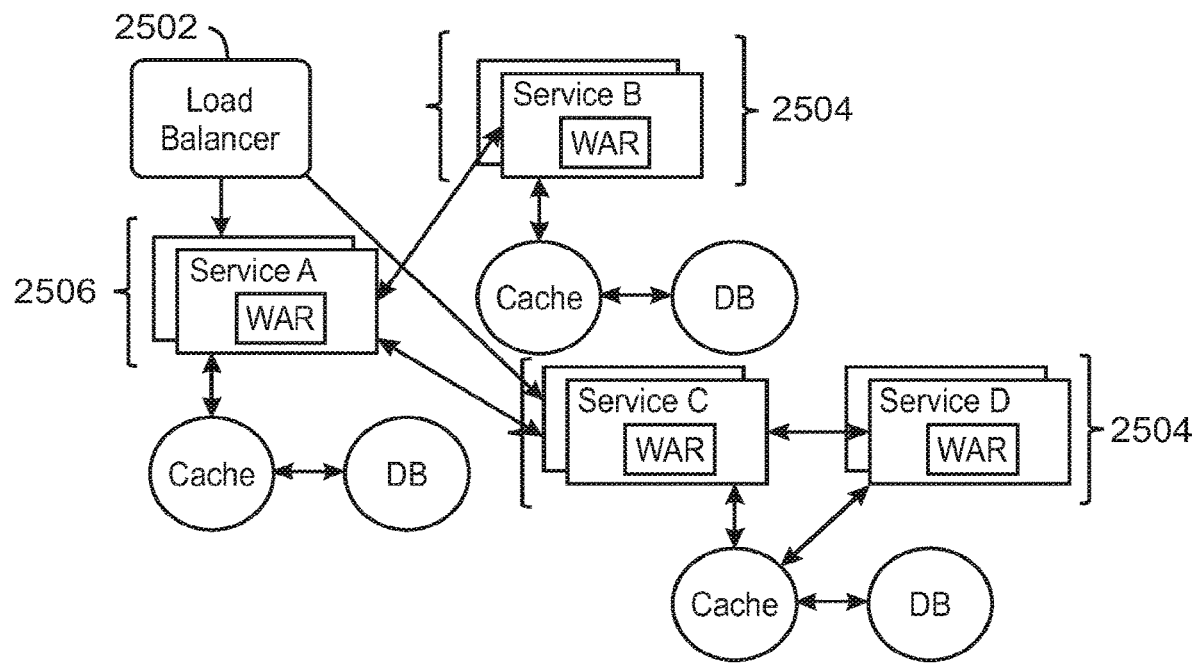
FIG. 25 is a schematic diagram of a branch micro-service design pattern in accordance with some embodiments.

FIG. 25 is a schematic diagram of a branch micro-service design pattern 2500 in accordance with some embodiments. In the branch micro-service design pattern 2500, the aggregator design is extended to allow simultaneous response processing from two, or more, chains of services 2504. In this arrangement, the aggregator or load balancer 2502 may call different chains, or a single chain, based upon the business needs. Further, services, such as service A 2506, may invoke different chains concurrently, in which case this will resemble the aggregator design pattern. Alternatively, service A 2506 may invoke only one chain based upon the request received from the client.

Figure 26:
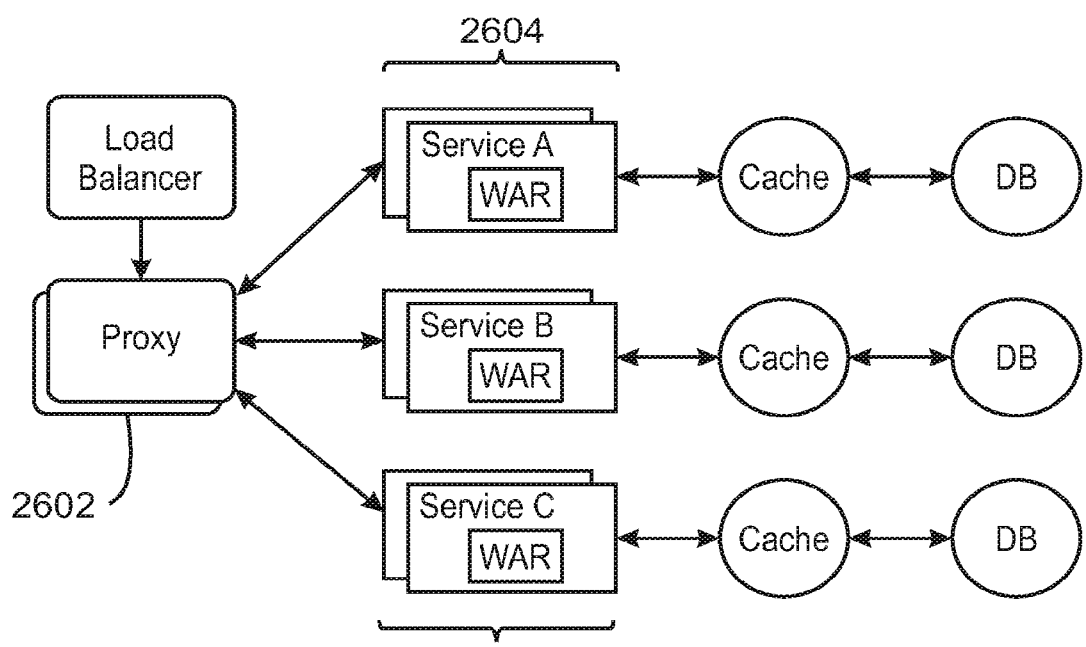
FIG. 26 is a schematic diagram of a proxy micro-service design pattern in accordance with some embodiments.

FIG. 26 is a schematic diagram of a proxy micro-service design pattern 2600 in accordance with some embodiments. The proxy micro-service design pattern 2600 may be considered as a variation of the aggregator discussed with respect to FIG. 24. In this example, no aggregation needs to happen on the client, but a different micro-service may be invoked based upon the business need. Like the aggregator, the proxy 2602 may scale independently. Accordingly, each individual service 2604 may not be exposed to the consumer and may instead go through the proxy 2602. As noted herein, the data from the proxy may be displayed through a proxy server, for example, having no control functions.

The proxy 2602 may be a dumb proxy, in which it delegates the request to one of the services 2604. In other examples, it may be a smart proxy, for example, with some data transformation applied before the responses serve to the client. An example of this would occur when the presentation layer to different devices is encapsulated in the smart proxy.

Figure 27:
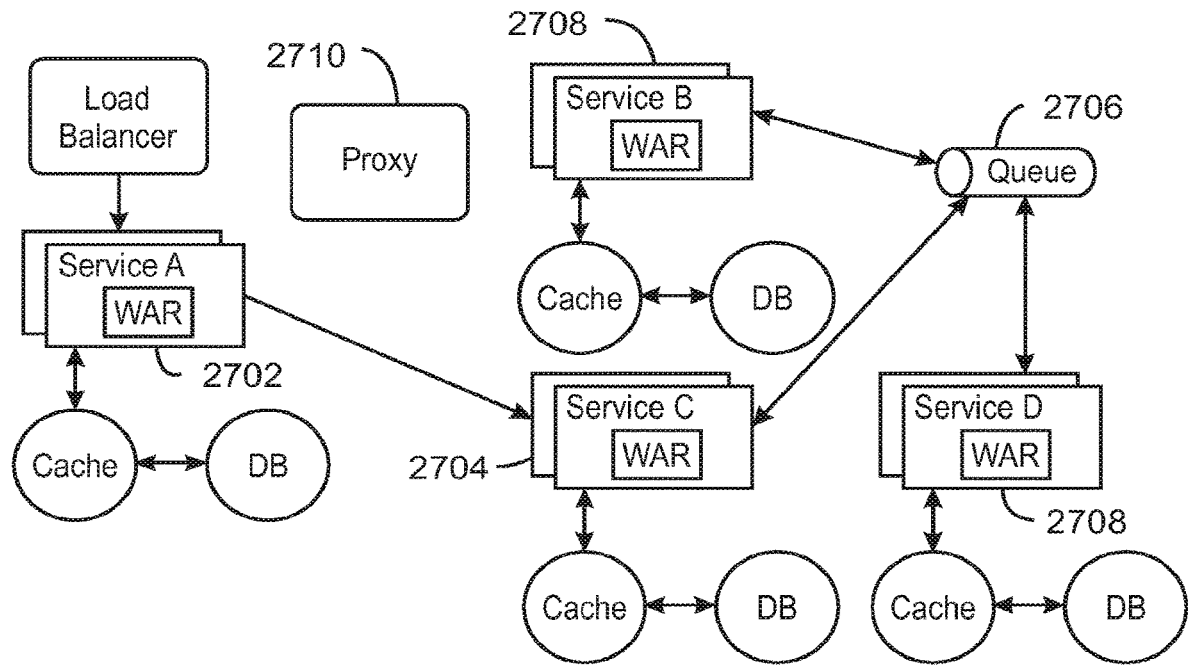
FIG. 27 is a schematic diagram of a combined micro-service design pattern in accordance with some embodiments.

FIG. 27 is a schematic diagram of a combined micro-service design pattern 2700 in accordance with some embodiments. Any combinations of the proxy patterns may be used. For example, a first service 2702 may call a second service 2704 which may place service requests on a queue 2706. Other services 2708 may access the request from the queue 2706, and place results back into the queue 2706. In this case the second service 2704 may retrieve the data from the queue 2706 and either provided back to the initial service 2702 or to a proxy 2710.

Figure 28:
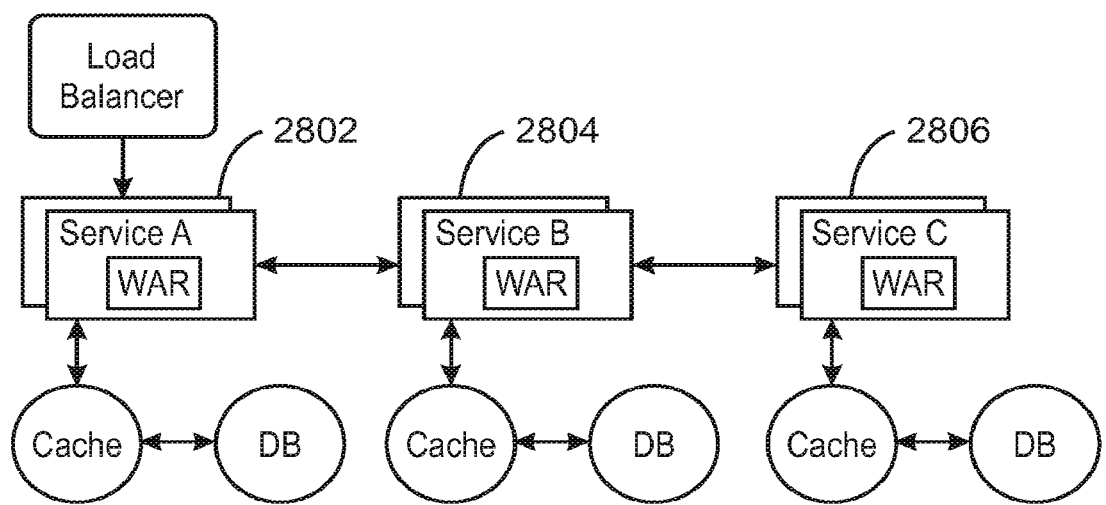
FIG. 28 is a schematic diagram of a chained micro-service design pattern in accordance with some embodiments.

FIG. 28 is a schematic diagram of a chained micro-service design pattern 2800 in accordance with some embodiments. A chained micro-service design pattern 2800 may produce a single consolidated response to the request. In this example, the request from the client is received by service A 2802, which then communicates with service B 2804, which may be in turn communicating with service C 2806. For example, all of the services may be using asynchronous HTTP request/response messaging.

The client may be blocked from intermediate results until a complete chain of request/response, for example, communications between service A 2802 to service B 2804 and service B 2804 to service C 2806 are completed. The request from service B 2804 to service C 2806 may look completely different from the request from service A 2802 to service B 2804. Similarly, the response from service B 2804 to service A 2802 may look completely different from the response from service C 2806 to service B 2804.

It may be useful to keep the chain of services short. The synchronous nature of the chain may appear as a long wait on the client-side, especially if it is a webpage that is waiting for the response to be shown. A chain with a single micro-service is called a singleton chain. This may allow the chain to be expanded at a later point in time.

Figure 29:
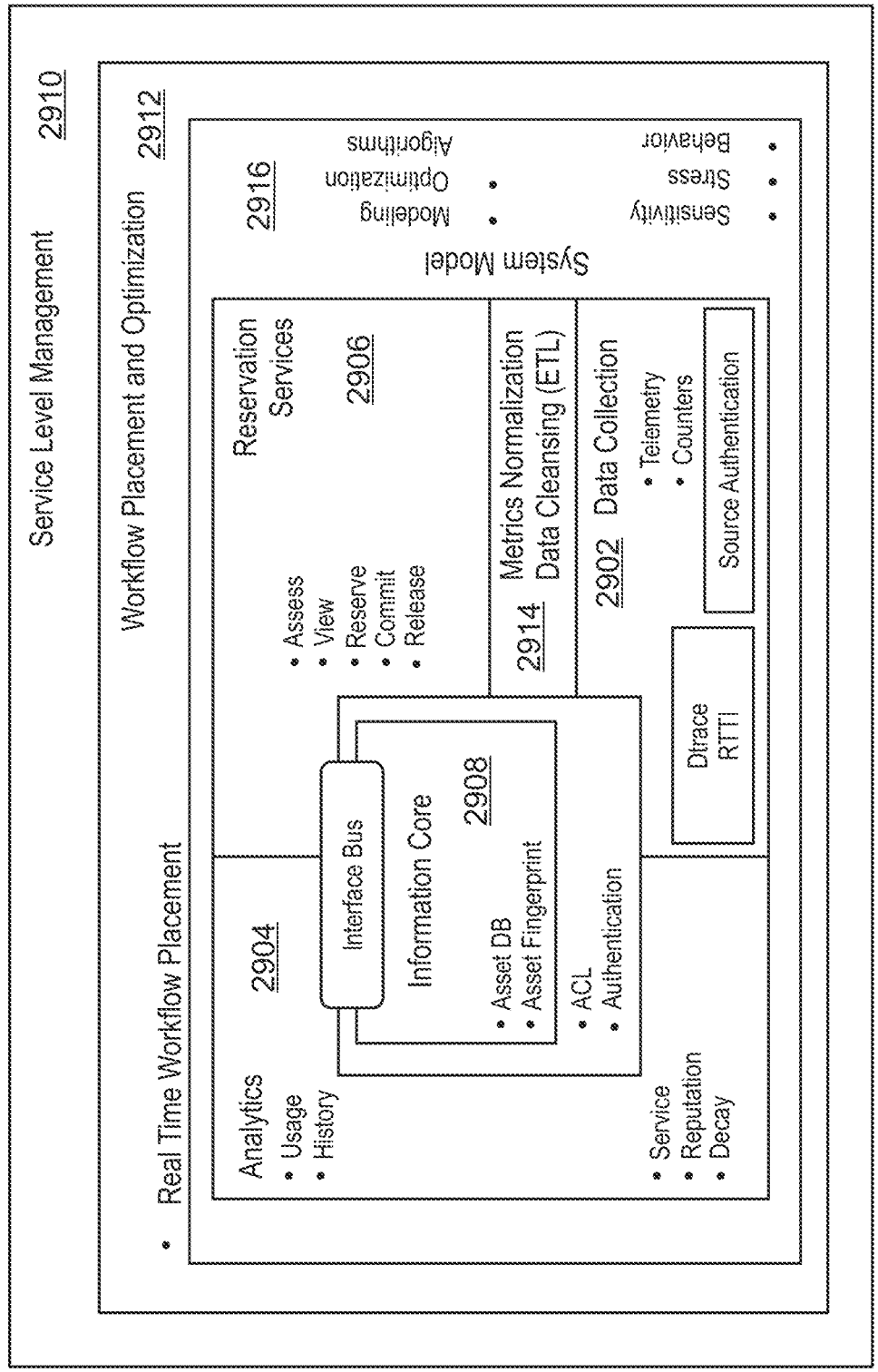
FIG. 29 is a schematic diagram of a software stack for a cloud service data center manager (CSDM) in accordance with some embodiments.

FIG. 29 is a schematic diagram of a software stack for a cloud service data center manager (CSDM) 2900 in accordance with some embodiments. The CSDM 2900 may create and maintain a fine-grained view of data center assets, capacity, and context. It may be used to improve the infrastructure reservation schemas and placement optimization. The CSDM 2900 may comprehend dependencies in context and provides a dynamic service landscape. It may provide real time and run time as a capacitive used to improve orchestration and provisioning solutions. Further, the CSDM 2900 may provide a virtual data center model based on real assets for service modeling, customer on boarding, SLA, and financial behavior evaluations, among others. As noted herein, the modeling results may be displayed on a control console, and IoT display, or through a proxy server, for example, having no control functions. The display may include user interaction options if permitted by the system configuration and policy selected.

To perform these tasks, the CSDM 2900 may implement several core functions. For example, a data collection function 2902 may provide telemetry and metrics for the platform. An analytics function 2904 may provide usage, history, service, reputation, and delay analysis, among other functions. A reservation services function 2906 may allow resources to be assessed, viewed, reserved, committed, or released, among others. An information core 2908 may hold a fine-grained resource asset list that includes asset states, dependencies, fingerprints, and the like. A service level management function 2910 may correlate resources with service requirements. A workflow placement and optimization function 2912 may then use this information for real time workflow placement. A metrics normalization and data cleansing function 2914 may be used to periodically clean up the metrics collected, for example, removing information after a preselected or calculated period, or re-normalizing values when much higher or much lower values are received. The information collected by the CSDM 2900 may be used to create a system model 2916. The system model 2916 may allow a determination of sensitivity, stress, and behavior of workload placements by modeling the workload placements using optimization algorithms.

Figure 30:
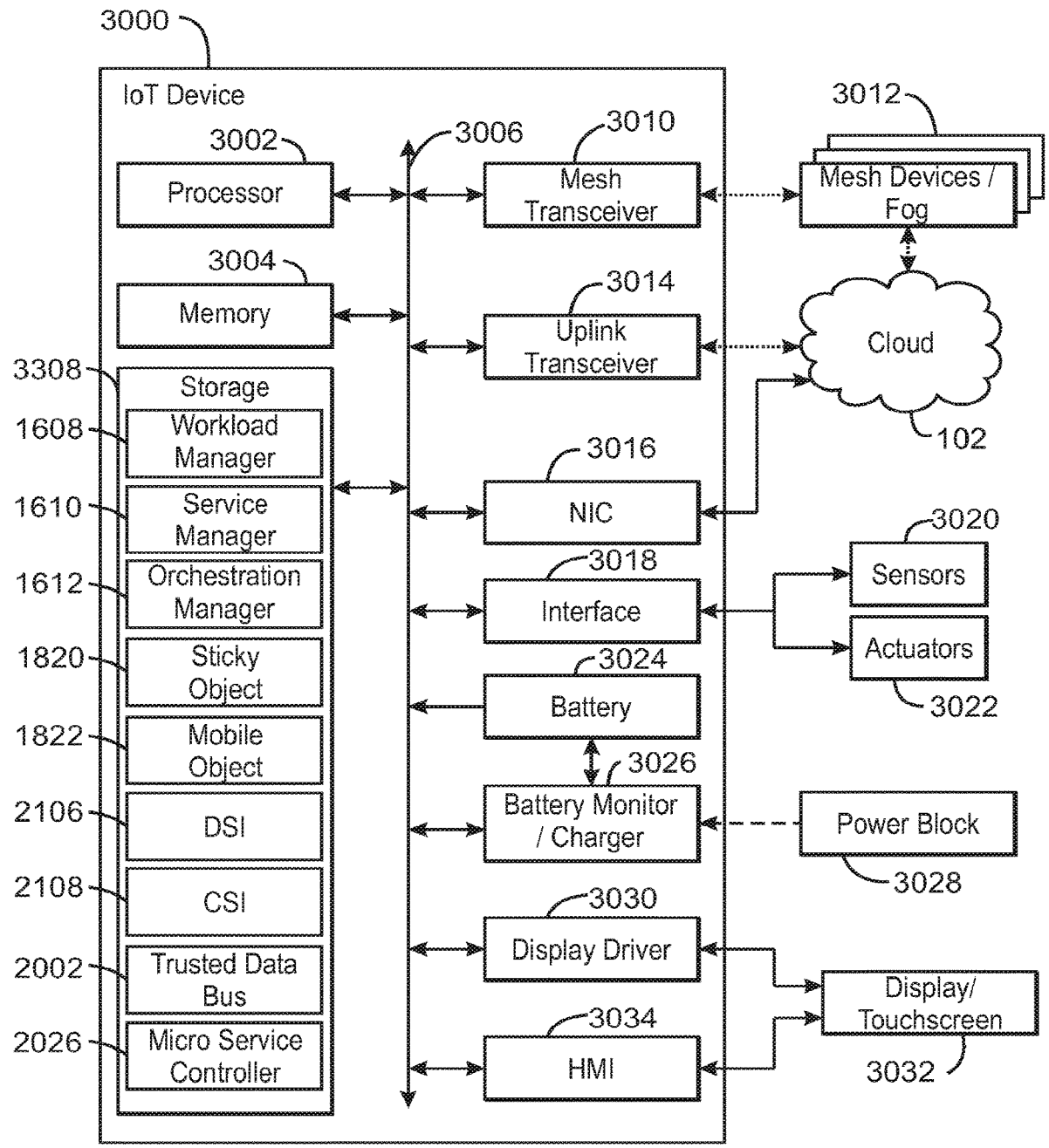
FIG. 30 is a block diagram of an example of components that may be present in an IoT device for participating in the DSF/CSI network in accordance with some embodiments.

FIG. 30 is a block diagram of an example of components that may be present in an IoT device 3000 for participating in the DSF/CSI network in accordance with some embodiments. Like numbered items are as described with respect to FIGS. 16, 18, 20, and 21. The IoT device 3000 may include any combinations of the components shown in the example. The components may be implemented as ICs, portions thereof, discrete electronic devices, or other modules, logic, hardware, software, firmware, or a combination thereof adapted in the IoT device 3000, or as components otherwise incorporated within a chassis of a larger system. The block diagram of FIG. 30 is intended to show a high level view of components of the IoT device 3000. However, some of the components shown may be omitted, additional components may be present, and different arrangement of the components shown may occur in other implementations. Although shown as an IoT device 3000, it may be noted that any number of other devices may participate in the DSF/CSI network, including, for example, data center devices, personal computing devices, tablets, mobile phones, gateways, and many others.

Further, the IoT device 3000 may not include all of the blocks used to orchestrate an application. For example, the IoT device 3000 may include only the micro-services, such as the sticky object 1820 or the mobile object 1822, used to implement an application or a portion of an application. In other examples, the IoT device 3000 may include all of the tools used to build, deploy, and orchestrate tasks for applications.

The IoT device 3000 may include a processor 3002, which may be a microprocessor, a multi-core processor, a multithreaded processor, an ultra-low voltage processor, an embedded processor, or other known processing element. The processor 3002 may be a part of a system on a chip (SoC) in which the processor 3002 and other components are formed into a single integrated circuit, or a single package, such as the Edison™ or Galileo™ SoC boards from Intel. As an example, the processor 3002 may include an Intel® Architecture Core™ based processor, such as a Quark™, an Atom™, an i3, an i5, an i7, or an MCU-class processor, or another such processor available from Intel® Corporation, Santa Clara, CA. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc. The processor 3002 may include a graphics processing unit (GPU) or a floating-point gate array (FPGA) in addition to, or instead of, the processors described herein.

The processor 3002 may communicate with a system memory 3004 over a bus 3006. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 3008 may also be coupled to the processor 3002 via the bus 3006. To enable a thinner and lighter system design, the mass storage 3008 may be implemented via a solid state drive (SSD). Other devices that may be used for the mass storage 3008 include flash memory cards, such as SD cards, microSD cards, xD picture cards, and the like, and USB flash drives.

In low power implementations, the mass storage 3008 may be on-die memory or registers associated with the processor 3002. However, in some examples, the mass storage 3008 may be implemented using a solid state drive (SSD) or a hard disk drive (HDD). Further, any number of new technologies may be used for the mass storage 3008 in addition to, or instead of, the technologies described, such resistance change memories, phase change memories, holographic memories, or chemical memories, among others. For example, the IoT device 3000 may incorporate the 3D XPOINT memories from Intel® and Micron®.

The components may communicate over the bus 3006. The bus 3006 may include any number of technologies, including industry standard architecture (ISA), extended ISA (EISA), peripheral component interconnect (PCI), peripheral component interconnect extended (PCIx), PCI express (PCIe), or any number of other technologies. The bus 3006 may be a proprietary bus, for example, used in a SoC based system. Other bus systems may be included, such as an $I^2C$ interface, $I^3C$ interface, an SPI interface, point to point interfaces, and a power bus, among others.

The bus 3006 may couple the processor 3002 to a mesh transceiver 3010, for communications with other mesh devices 3012. The mesh transceiver 3010 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 3012. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 3010 may communicate using multiple standards or radios for communications at different range. For example, the IoT device 3000 may communicate with geographically proximate devices, e.g., within about 10 meters, using a local transceiver based on BLE, or another low power radio, to save power. More distant mesh devices 3012, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 3010 may be incorporated into an MCU as an address directly accessible by the chip, such as in the Curie® units available from Intel.

An uplink transceiver 3014 may be included to communicate with devices in the cloud 102. The uplink transceiver 3014 may be LPWA transceiver that follows the IEEE 802.15.4, IEEE 802.15.4g, IEEE 802.15.4e, IEEE 802.15.4k, or NB-IoT standards, among others. The IoT device 3000 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 3010 and uplink transceiver 3014, as described herein. For example, the radio transceivers 3010 and 3012 may include an LTE or other cellular transceiver that uses spread spectrum (SPA/SAS) communications, such as for implementing high-speed communications, such as for video transfers. Further, any number of other protocols may be used, such as Wi-Fi® networks for medium speed communications, such as still pictures, sensor readings, and provision of network communications.

The radio transceivers 3010 and 3012 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), or Narrow Band IoT (NB-IoT), among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+ (High-speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11 ad, IEEE 802.1 lay, and the like. In addition to the standards listed above, any number of satellite uplink technologies may be used for the uplink transceiver 3014, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The mesh transceiver 3010 and the uplink transceiver 3014 may be part of a single radio unit that provides both type of communications. Further, depending on the environment the IoT device 3000 is implemented within, either, or both, transceivers 3010 or 3012 may be eliminated. For example, the IoT device may perform all communications with other units in a mesh 3012 or a cloud 102 through a wired connection provided by a network interface controller (NIC) 3016.

The NIC 3016 may be included to provide a wired communication to the cloud 102 or to other devices, such as the mesh devices 3012. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC may be included to allow connect to a second network, for example, a NIC 3016 providing communications to the cloud over Ethernet, and a second NIC providing communications to other devices over another type of network.

The bus 3006 may couple the processor 3002 to an interface 3018 that is used to connect external devices. The external devices may include sensors 3020, such as accelerometers, level sensors, flow sensors, temperature sensors, pressure sensors, barometric pressure sensors, and the like. The interface 3018 may be used to connect the IoT device 3000 to actuators 3022, such as power switches, valve actuators, an audible sound generator, a visual warning device, and the like.

A battery 3024 may power the IoT device 3000, although in examples in which the IoT device 3000 is mounted in a fixed location, it may have a power supply coupled to an electrical grid. The battery 3024 may be a lithium ion battery, a metal-air battery, such as a zinc-air battery, an aluminum-air battery, a lithium-air battery, a hybrid supercapacitor, and the like.

A battery monitor/charger 3026 may be included in the IoT device 3000 to track the state of charge (SoCh) of the battery 3020. The battery monitor/charger 3026 may be used to monitor other parameters of the battery 3024 to provide failure predictions, such as the state of health (SoH) and the state of function (SoF) of the battery 3024. The battery monitor/charger 3026 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/ charger 3026 may communicate the information on the battery 3024 to the processor 3002 over the bus 3006. The battery monitor/charger 3026 may also include an analog-to-digital (ADC) convertor that allows the processor 3002 to directly monitor the voltage of the battery 3026 or the current flow from the battery 3024. The battery parameters may be used to determine actions that the IoT device 3000 may perform, such as transmission frequency, mesh network operation, sensing frequency, and the like.

A power block 3028, or other power supply coupled to a grid, may be coupled with the battery monitor/charger 3026 to charge the battery 3024. In some examples, the power block 3028 may be replaced with a wireless power receiver to obtain the power wirelessly, for example, through a loop antenna in the IoT device 3000. A wireless battery charging circuit, such as an LTC4020 chip from Linear Technologies of Milpitas, CA, among others, may be included in the battery monitor/charger 3026. The specific charging circuits chosen depend on the size of the battery 3024, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 3028 may be augmented or replaced with solar panels, a wind generator, a water generator, or other natural power systems.

Various input/output (I/O) devices may be present within, or connected to, the IoT device 3000. For example, a display driver 3030 may be coupled to the processor 3002 through the bus 3006. The display driver 3030 may power a display, for example, as part of a display/touchscreen 3032. A human machine interface 3034 may interface with the touchscreen portion of the display/touchscreen 3032 to obtain input.

Any number of other display devices may be used including monitors, flat screen displays, LEDs, CRTs, and the like. Similarly, any number of other input devices may be used including keyboards, mice, trackballs, and the like. The display may be included to show information, such as sensor readings, actuator positions, configuration and troubleshooting data, and the like. The input devices may allow the entry of setpoints, configuration information, and other information that be useful for the deployment. Further, data may be displayed on devices or systems that are not part of the systems network or the trusted network. Data of any kind may be displayed on the IoT display, management displays attached to the IoT system, or other displays after appropriate credentials are entered. These may include, for example, user data, system operator data, intermediate data, stored data, and the like. A display the data to support deployment or user interaction to verify or confirm data entry may be provided.

The mass storage 3008 may include a number of modules to implement the group creation functions described herein. Although shown as code blocks in the mass storage 3008, it may be understood that any of the modules may be fully or partially replaced with hardwired circuits, for example, built into an application specific integrated circuit (ASIC). The mass storage 3008 may include an orchestration manager 1608, a service manager (CSDM) 1610, and a workload manager 1612, to place workloads, as described herein. A sticky object 1820, a mobile object 1822, or both, may be included to implement portions of applications, as described herein. A trusted data bus 2002 and a micro-service controller 2026 may be included to access a DSF dialtone and obtain services. A distributed service interface (DSI) 2106 and a common services interface (CSI) 2108 may be included to join IoT networks.

Figure 31:
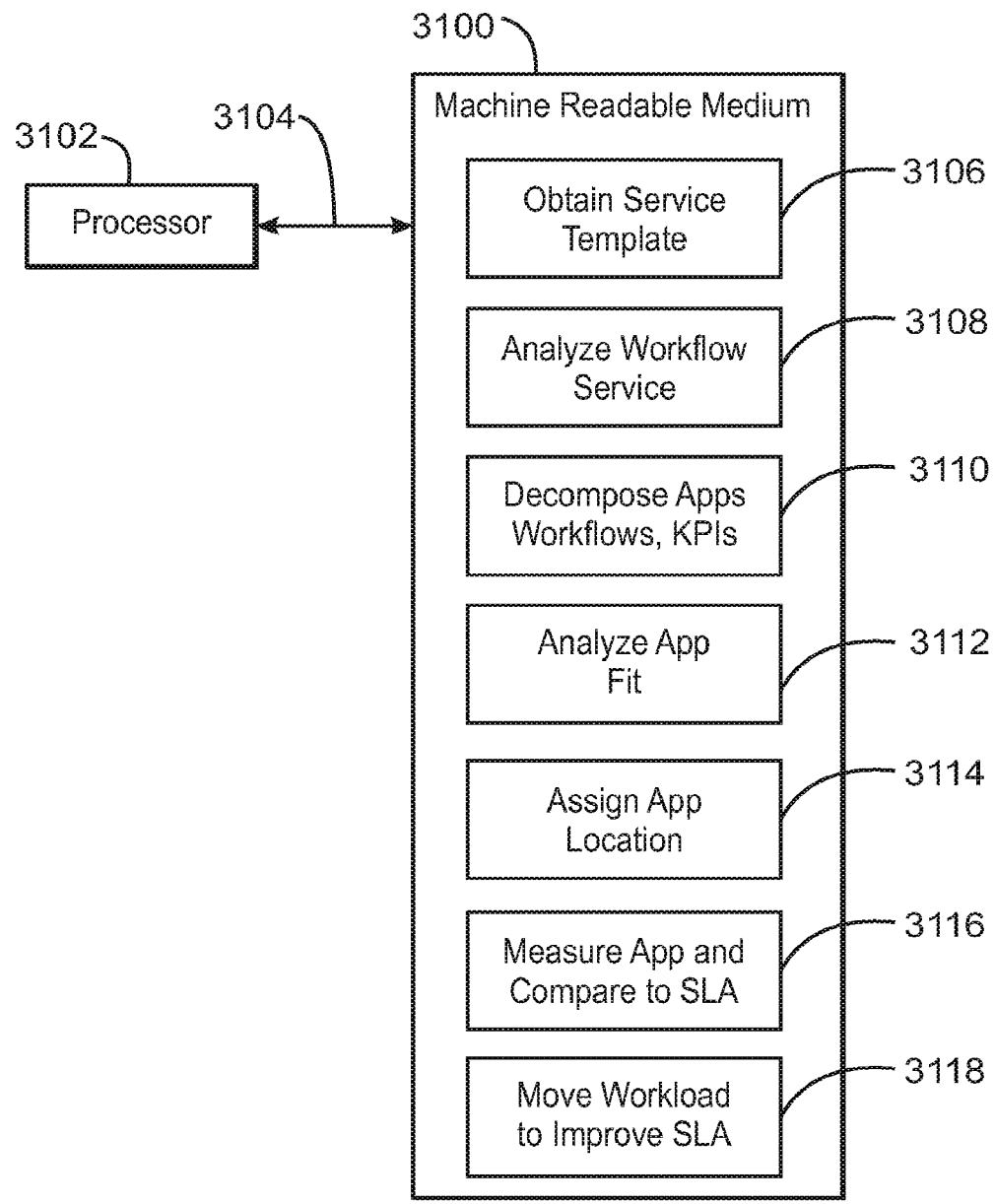
FIG. 31 is a block diagram of an exemplary non-transitory, machine readable medium including code to direct a processor to place workloads in accordance with some embodiments.

FIG. 31 is a block diagram of an exemplary non-transitory, machine readable medium 3100 including code to direct a processor 3102 to place workloads in accordance with some embodiments. The processor 3102 may access the non-transitory, machine readable medium 3100 over a bus 3104. The processor 3102 and bus 3104 may be selected as described with respect to the processor 3002 and bus 3006 of FIG. 30. The non-transitory, machine readable medium 3100 may include devices described for the mass storage 3008 of FIG. 30 or may include optical disks, thumb drives, or any number of other hardware devices.

As described herein, the non-transitory, machine readable medium 3100 may include code 3106 to direct the processor 3102 to obtain service templates from a DSF. Code 3108 may be included to direct the processor 3102 to analyze a workflow to determine services. Code 3110 may be included to direct the processor 3102 to decompose applications, workflows, and KPIs.

The machine readable medium 3100 may include code 3112 to direct the processor 3102 to analyze applications to determine application fit in physical systems. Code 3114 may be included to direct the processor 3102 to determine application locations. Code 3116 may be included to direct the processor 3102 to measure application functionality with respect to SLAs. Code 3118 may be included to direct the processor 3102 to move a workload, for example to improve and SLA.

EXAMPLES

Example 1 includes a compute system that includes an Internet of things (IoT) device that includes a common services interface (CSI) to create a self-managing network of devices with other nodes including the CSI.

Example 2 includes the subject matter of example 1. In this example, the CSI is to interface to another device and provide a description of the IoT device and a capability of the IoT device, and to obtain from the other device a description of the other device and a capability of the other device.

Example 3 includes the subject matter of either of examples 1 or 2. In this example, the CSI is to interface to another device through an application programming interface (API).

Example 4 includes the subject matter of any of examples 1 to 3. In this example, the CSI is to interface to another device through a data distribution service (DDS).

Example 5 includes the subject matter of any of examples 1 to 4. In this example, a DDS in the CSI may include a publish/subscribe (Pub/Sub) subscription model.

Example 6 includes the subject matter of any of examples 1 to 5. In this example, the CSI includes a virtual interface for communicating over a network.

Example 7 includes the subject matter of any of examples 1 to 6. In this example, the CSI includes a communications protocol.

Example 8 includes the subject matter of any of examples 1 to 7. In this example, the CSI includes an Internet protocol (IP) block that includes a services protocol to provide a system integration and active service management.

Example 9 includes the subject matter of any of examples 1 to 8. In this example, the CSI includes a peering system for on boarding of new devices.

Example 10 includes the subject matter of any of examples 1 to 9. In this example, the IoT device includes a workload manager to receive a service template, decompose the service template and determine requirements for the workload and QoS and SLA. The IoT device includes a service manager to obtain status information from a number of infrastructure devices, and an orchestration manager to correlate the requirements from the workload manager and the status information from the service manager and assign a service to an infrastructure device.

Example 11 includes the subject matter of any of examples 1 to 10. In this example, the IoT device includes a distributed service interface (DSI) to obtain micro-services from a distributed services framework (DSF).

Example 12 includes the subject matter of any of examples 1 to 11. In this example, a distributed services framework (DSF) is to provide an IoT dialtone to couple the IoT device to a micro service provider.

Example 13 includes the subject matter of any of examples 1 to 12. In this example, an IoT dialtone from a distributed services framework (DSF) is to provide a policy in an engagement paradigm for joining a DSF management network.

Example 14 includes the subject matter of any of examples 1 to 13 in this example, a distributed services framework (DSF) includes a service catalog that includes service templates.

Example 15 includes the subject matter of any of examples 1 to 15. In this example, the IoT device includes a multi-distributed services framework (DSF) arbitrator to connect to multiple DSF sessions.

Example 16 includes a method for orchestrating the deployment of applications to an Internet of things (IoT) device. The method includes accessing an IoT dialtone on a distributed services framework (DSF), wherein the IoT dialtone provides policies and engagement paradigms for joining a DSF management network.

Example 17 includes the subject matter of example 16. In this example, the method includes sending a service request to a service catalog that lists micro-services, and receiving a service template from the service catalog.

Example 18 includes the subject matter of either of examples 16 or 17. In this example, the method includes analyzing the infrastructure capability, availability, and status to form an infrastructure map.

Example 19 includes the subject matter of any of examples 16 to 18. In this example, the method includes decomposing a service template to determine the workload elements, and mapping the workload elements to infrastructure elements in an infrastructure map.

Example 20 includes the subject matter of any of examples 16 to 19. In this example, the method includes assigning workload elements to infrastructure elements, and collecting quality of service metrics on the operation of the workload elements.

Example 21 includes the subject matter of any of examples 16 to 20. In this example, the method includes reassigning workload elements to different infrastructure elements if a determination of a failure to meet an SLA is made.

Example 22 includes the subject matter of any of examples 16 to 21. In this example, the method includes sending a service request to a service catalog. A business services obtained from the service catalog. The business service is analyzed to determine the workflow. The workflow is decomposed to define micro-services and KPIs. The micro services and KPIs are analyzed to determine a location in a physical infrastructure for assignment. The micro services are assigned to infrastructure elements.

Example 23 includes a non-transitory, machine readable medium including code that, when executed, directs a processor to obtain a service template from a service catalog in a distributed services framework, and analyze the workflow of the service template to determine applications, workflows, and key performance indicators. Code is included to direct the processor to analyze the application, workflows, and key performance indicators to determine assignment locations, and assign the application locations to infrastructure elements.

Example 24 includes the subject matter of example 23. In this example, the non-transitory, machine readable medium includes code that, when executed, directs the processor to measure the operation of the applications, workflows, and key performance indicators to determine that the operation is meeting service level agreement.

Example 25 includes the subject matter of either of examples 23 or 24. In this example, the non-transitory, machine readable medium includes code that, when executed, directs the processor to move an application, a workflow, or a key performance indicator if a service level agreement is not being met.

Example 26 includes the subject matter of any of examples 23 to 25. In this example, the non-transitory, machine readable medium includes code that, when executed, directs the processor to obtain a micro-service to complete a task.

Example 27 includes a non-transitory, machine-readable medium including instructions to direct a processor in a node to perform any one of the methods of claims 16 to 22.

Example 28 includes an apparatus that includes means to perform any one of the methods of claims 16 to 22.

Example 29 includes a compute system that includes an Internet of things (IoT) device that includes a common services interface (CSI) that includes means to create a self-managing network of devices with other nodes including the CSI.

Example 30 includes the subject matter of example 29. In this example, the CSI is to interface to another device and provide a description of the IoT device and a capability of the IoT device, wherein the CSI includes means to obtain from the other device a description of the other device and a capability of the other device.

Example 31 includes the subject matter of either of examples 29 or 30. In this example, the CSI including means to interface to another device through an application programming interface (API).

Example 32 includes the subject matter of any of examples 29 to 31. In this example, the CSI including means to interface to another device through a data distribution service (DDS).

Example 33 includes the subject matter of any of examples 29 to 32. In this example, the CSI including means for on boarding of new devices.

Example 34 includes the subject matter of any of examples 29 to 33. In this example, the IoT device includes a workload manager to receive a service template, decompose the service template and determine requirements for the workload and QoS and SLA. A service manager is to obtain status information from a number of infrastructure devices. The IoT device includes means to correlate the requirements from the workload manager and the status information from the service manager and assign a service to an infrastructure device.

Example 35 includes the subject matter of any of examples 29 to 34. In this example, the IoT device includes a distributed service interface (DSI) that includes means to obtain micro-services from a distributed services framework (DSF).

Example 36 includes the subject matter of any of examples 29 to 36. In this example, a distributed services framework (DSF) includes means to provide an IoT dialtone to couple the IoT device to a micro service provider. Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. Distributed computing system configurable for use in association with providing at least one cloud service associated with Internet of Things (IoT) resources, the distributed computing system comprising:
   computing hardware; and
   machine-readable memory storing instructions for being executed by the computing hardware, the instructions, when executed by the computing hardware, resulting in the distributed computing system being configured for performance of operations comprising:
      associating the IoT resources with IoT-related objects;
      receiving telemetry data associated, at least in part, with the IoT-related objects;
      generating, based upon the telemetry data, at least one of IoT resource health-related data and event management-related data; and
      based upon determination, based upon the telemetry data and associated metrics data, that at least one condition is present, determining at least one action to be taken in response to the determination that the at least one condition is present;
   wherein:
      the IoT-related objects are configurable to comprise object data to indicate at least one of behaviors, states, and interactions that are in association with the IoT resources;
      the distributed computing system is configurable to utilize machine-learning in association with the determination that the at least one condition is present; and
      the distributed server system is configurable to monitor central processing unit (CPU) usage and memory usage in association with the telemetry data.

2. The distributed computing system of claim 1, wherein:
   the operations also comprise generating modeling data for use in association with the IoT-related objects; and
   the modeling data is for use in association with failure event data.

3. The distributed computing system of claim 2, wherein:
   the modeling data is for use in association with behavior modeling.

4. The distributed computing system of claim 3, wherein:
   the distributed computing system is to execute at least one of a container workload and a virtual machine workload for use in association with the IoT resources and the providing of the at least one cloud service; and
   the at least one action is configurable to comprise generating at least one of alert data and taking at least one other action.

5. The distributed computing system of claim 1, wherein:
   one or more of the IoT resources are associated with one or more of:
      at least one vehicle;
      at least one emergency vehicle;
      at least one temperature sensor;
      at least one weather sensor;
      at least one alarm system;
      at least one camera;
      at least one traffic monitor; and/or at least one traffic light.

6. A method implemented using a distributed computing system, the distributed computing system being configurable for use in association with providing at least one cloud service associated with Internet of Things (IoT) resources, the method comprising:
  associating the IoT resources with IoT-related objects;
  receiving telemetry data associated, at least in part, with the IoT-related objects;
  generating, based upon the telemetry data, at least one of IoT resource health-related data and event management-related data; and
  based upon determination, based upon the telemetry data and associated metrics data, that at least one condition is present, determining at least one action to be taken in response to the determination that the at least one condition is present;
  wherein:
    the IoT-related objects are configurable to comprise object data to indicate at least one of behaviors, states, and interactions that are in association with the IoT resources;
    the distributed computing system is configurable to utilize machine-learning in association with the determination that the at least one condition is present; and
    the distributed server system is configurable to monitor central processing unit (CPU) usage and memory usage in association with the telemetry data.

7. The method of claim 6, wherein:
the method further comprises generating modeling data for use in association with the IoT-related objects; and
the modeling data is for use in association with failure event data.

8. The method of claim 7, wherein:
the modeling data is for use in association with behavior modeling.

9. The method of claim 8, wherein:
the distributed computing system is to execute at least one of a container workload and a virtual machine workload for use in association with the IoT resources and the providing of the at least one cloud service; and
the at least one action is configurable to comprise generating at least one of alert data and taking at least one other action.

10. The method of claim 6, wherein:
one or more of the IoT resources are associated with one or more of:
  at least one vehicle;
  at least one emergency vehicle;
  at least one temperature sensor;
  at least one weather sensor;
  at least one alarm system;
  at least one camera;
  at least one traffic monitor; and/or
  at least one traffic light.

11. At least one non-transitory machine-readable storage medium storing instructions for execution by at least one machine to be associated with a distributed computing system, the distributed computing system being configurable for use in association with providing at least one cloud service associated with Internet of Things (IoT) resources, the instructions, when executed by the at least one machine, resulting in the distributed computing system being configured for performance of operations comprising:
  associating the IoT resources with IoT-related objects;
  receiving telemetry data associated, at least in part, with the IoT-related objects;
  generating, based upon the telemetry data, at least one of IoT resource health-related data and event management-related data; and
  based upon determination, based upon the telemetry data and associated metrics data, that at least one condition is present, determining at least one action to be taken in response to the determination that the at least one condition is present;
  wherein:
    the IoT-related objects are configurable to comprise object data to indicate at least one of behaviors, states, and interactions that are in association with the IoT resources;
    the distributed computing system is configurable to utilize machine-learning in association with the determination that the at least one condition is present; and
    the distributed server system is configurable to monitor central processing unit (CPU) usage and memory usage in association with the telemetry data.

12. The non-transitory machine-readable storage medium of claim 11, wherein:
the method further comprises generating modeling data for use in association with the IoT-related objects; and
the modeling data is for use in association with failure event data.

13. The non-transitory machine-readable storage medium of claim 12, wherein:
the modeling data is for use in association with behavior modeling.

14. The non-transitory machine-readable storage medium of claim 13, wherein:
the distributed computing system is to execute at least one of a container workload and a virtual machine workload for use in association with the IoT resources and the providing of the at least one cloud service; and
the at least one action is configurable to comprise generating at least one of alert data and taking at least one other action.

15. The non-transitory machine-readable storage medium of claim 11, wherein:
one or more of the IoT resources are associated with at least one of:
  at least one vehicle;
  at least one emergency vehicle;
  at least one temperature sensor;
  at least one weather sensor;
  at least one alarm system;
  at least one camera;
  at least one traffic monitor; and/or
  at least one traffic light.

* * * * *